United States Patent
Johnson

(10) Patent No.: US 12,030,612 B2
(45) Date of Patent: Jul. 9, 2024

(54) VARIABLE POSITION AIRFOIL

(71) Applicant: THE BOEING COMPANY, Chicago, IL (US)

(72) Inventor: John Emil Johnson, Andover, KS (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/498,088

(22) Filed: Oct. 11, 2021

(65) Prior Publication Data
US 2023/0109822 A1     Apr. 13, 2023

(51) Int. Cl.
*B64C 1/26*       (2006.01)
*B64C 3/54*       (2006.01)
*B64C 5/16*       (2006.01)

(52) U.S. Cl.
CPC ............... *B64C 1/26* (2013.01); *B64C 3/546* (2013.01); *B64C 5/16* (2013.01)

(58) Field of Classification Search
CPC .... B64C 5/10; B64C 5/12; B64C 3/42; B64C 3/54; B64C 3/546; B64C 3/56
See application file for complete search history.

(56) References Cited

U.S. PATENT DOCUMENTS

| | | | | |
|---|---|---|---|---|
| 4,354,646 A * | 10/1982 | Raymer | ..................... | B64C 5/10 244/47 |
| 4,542,866 A * | 9/1985 | Caldwell | ................... | B64C 5/12 244/49 |
| 5,096,143 A * | 3/1992 | Nash | ......................... | B64C 5/10 D12/345 |
| 5,582,364 A * | 12/1996 | Trulin | ..................... | F42B 10/14 244/3.29 |
| 6,227,487 B1 | 5/2001 | Clark | | |
| 6,547,181 B1 * | 4/2003 | Hoisington | ........... | B64C 23/072 244/46 |
| 6,695,252 B1 * | 2/2004 | Dryer | ..................... | F42B 10/14 244/3.28 |
| 9,903,425 B2 * | 2/2018 | Larson | ................... | F16D 23/14 |

(Continued)

FOREIGN PATENT DOCUMENTS

| | | | |
|---|---|---|---|
| EP | 3348472 A1 | 7/2018 | |
| EP | 3668786 A1 | 6/2020 | |

(Continued)

OTHER PUBLICATIONS

Extended European Search Report for Application 22187265.8 dated Jan. 18, 2023, pp. 1-7.

*Primary Examiner* — Richard Green
*Assistant Examiner* — Colin Zohoori
(74) *Attorney, Agent, or Firm* — Moore IP Law

(57) ABSTRACT

An aircraft includes an airfoil and a hinge member to rotatably couple the airfoil to a structure of an aircraft. The hinge member defines at least a portion of a rotational axis. The aircraft also includes an indexing mechanism coupled to the airfoil and configured to, in a first state, inhibit rotation of the airfoil about the rotational axis, and in a second state, to permit rotation of the airfoil about the rotational axis between a first position and a second position that is angularly indexed relative to the first position. The aircraft further includes an actuator to selectively change a state of the indexing mechanism from the first state to the second state, from the second state to the first state, or both.

25 Claims, 39 Drawing Sheets

(56) References Cited

U.S. PATENT DOCUMENTS

| | | | |
|---|---|---|---|
| 10,472,045 B2* | 11/2019 | Winkelmann | B64C 3/56 |
| 10,759,514 B2* | 9/2020 | Wildman | B64C 3/56 |
| 2005/0051666 A1 | 3/2005 | Lee et al. | |
| 2012/0085858 A1* | 4/2012 | Seifert | B64C 3/16 |
| | | | 244/46 |
| 2012/0267473 A1* | 10/2012 | Tao | B64C 13/34 |
| | | | 244/46 |
| 2013/0266444 A1* | 10/2013 | Friedel | B64C 9/16 |
| | | | 416/147 |
| 2014/0117151 A1* | 5/2014 | Fox | B64C 23/072 |
| | | | 244/49 |
| 2017/0291686 A1* | 10/2017 | Alley | B64C 39/024 |
| 2019/0185137 A1* | 6/2019 | Orchard | B64C 3/42 |
| 2020/0148329 A1* | 5/2020 | White | B64C 15/02 |
| 2020/0208687 A1* | 7/2020 | Dussart | B64C 3/56 |
| 2023/0067713 A1* | 3/2023 | Burns | B64U 10/20 |

FOREIGN PATENT DOCUMENTS

| | | |
|---|---|---|
| EP | 4163202 A1 | 4/2023 |
| GB | 722842 A | 2/1955 |

* cited by examiner

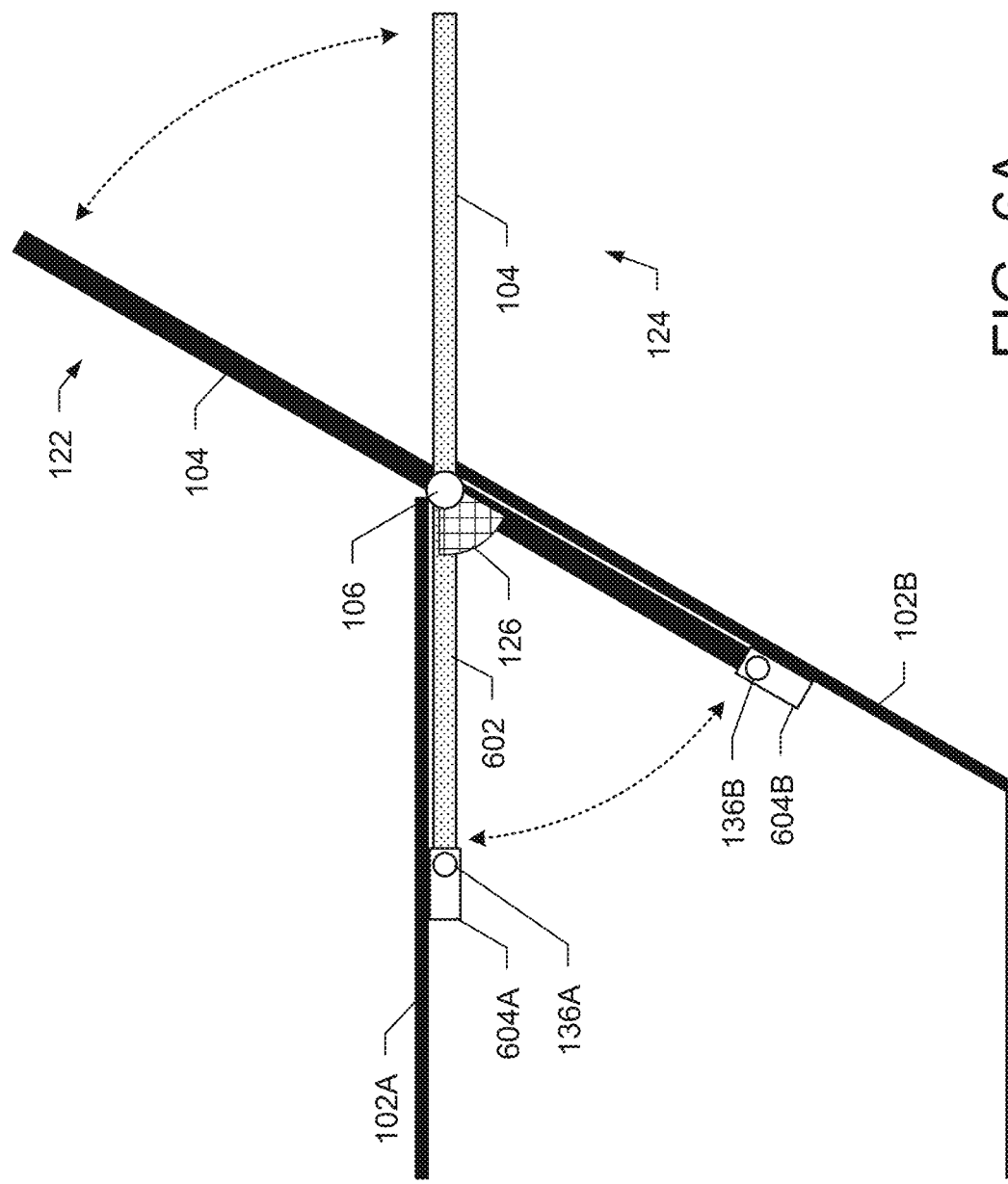

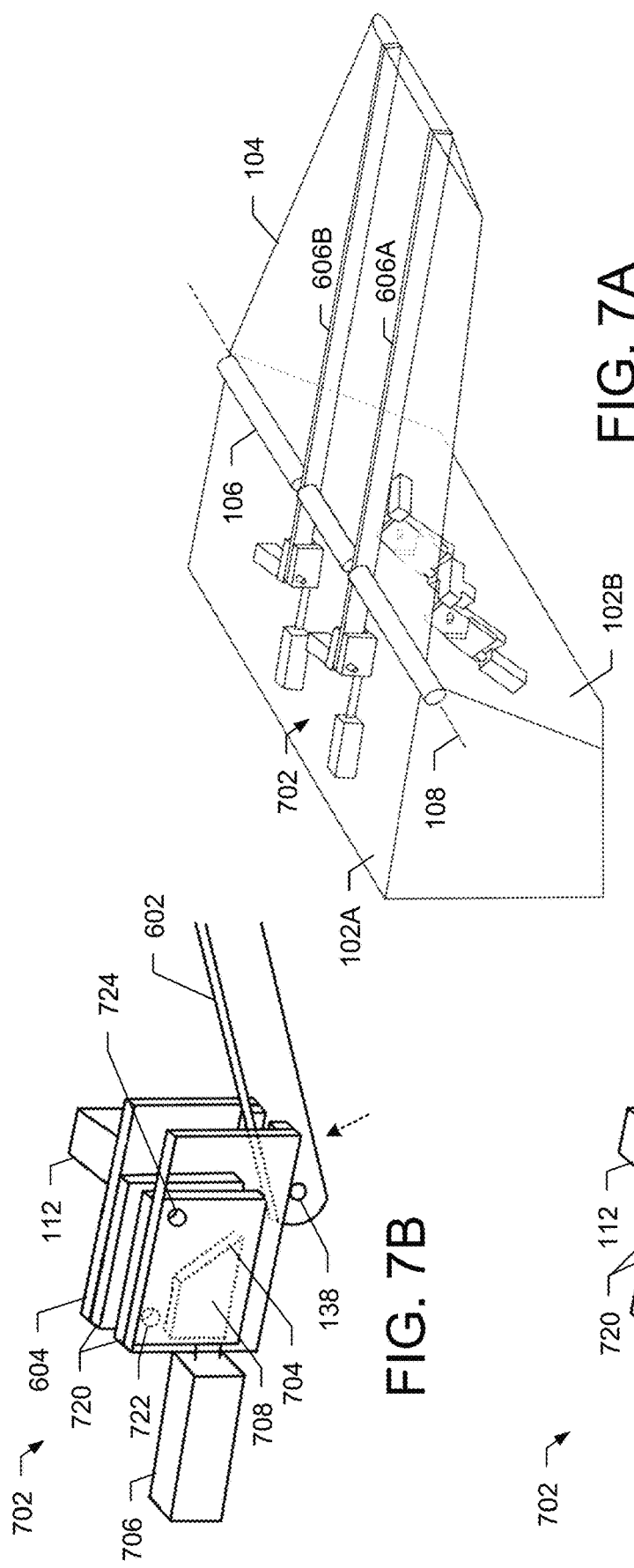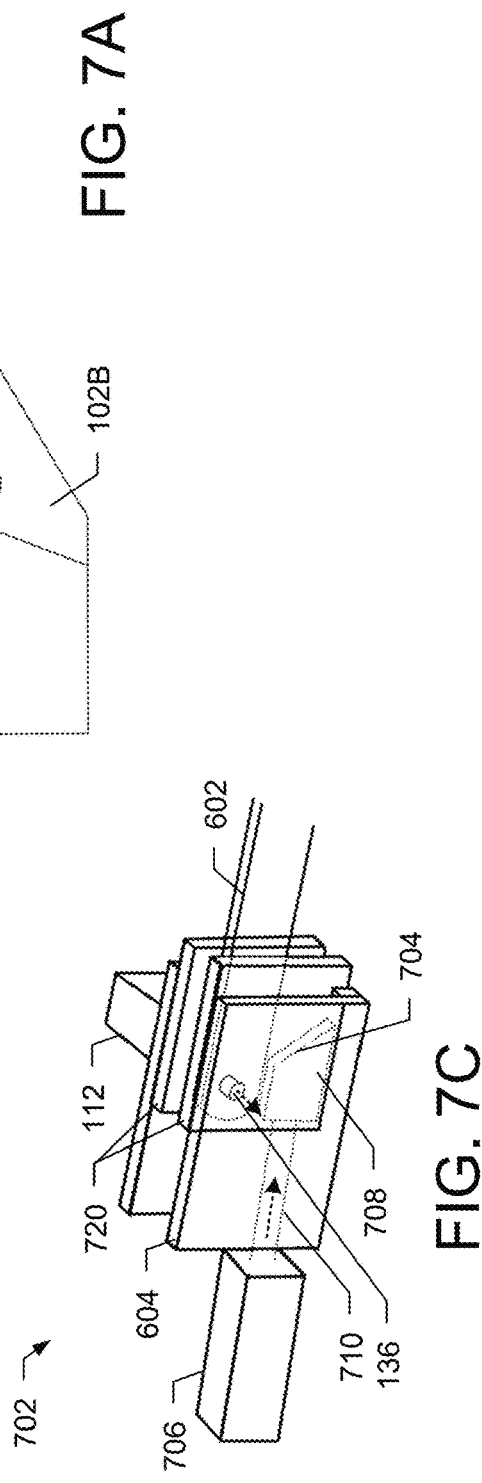
FIG. 7A
FIG. 7B
FIG. 7C

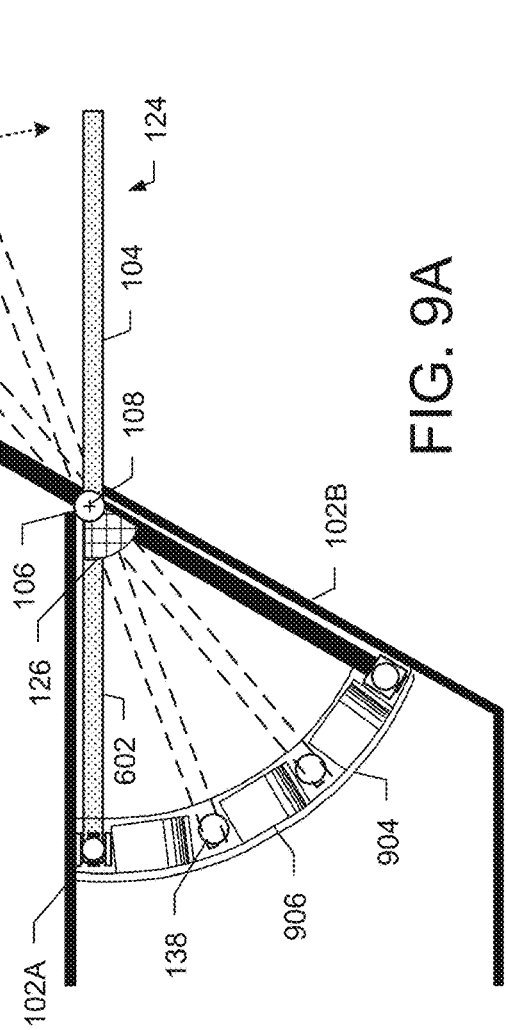
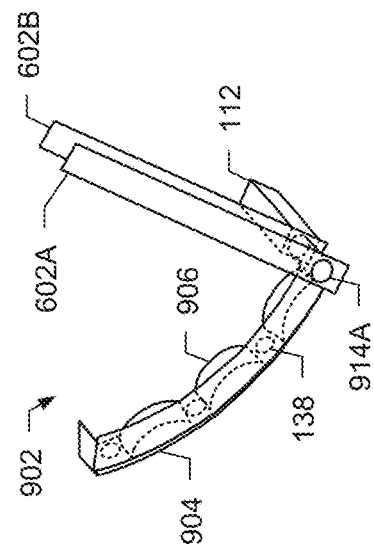
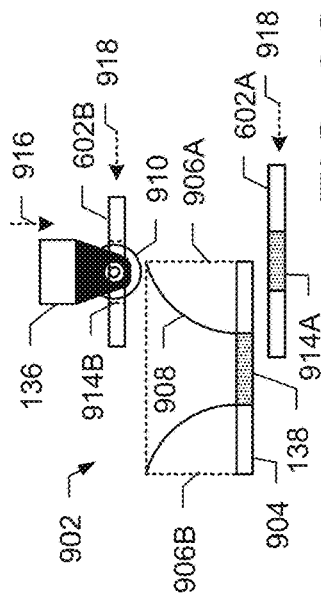
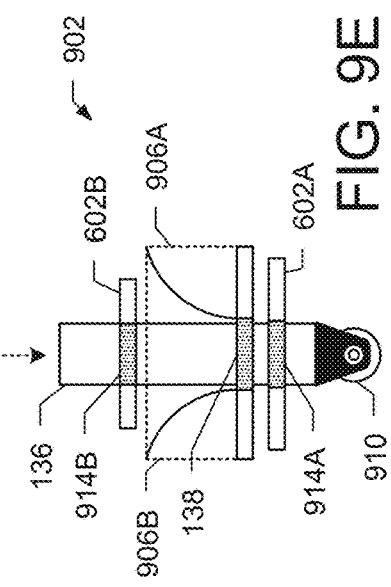

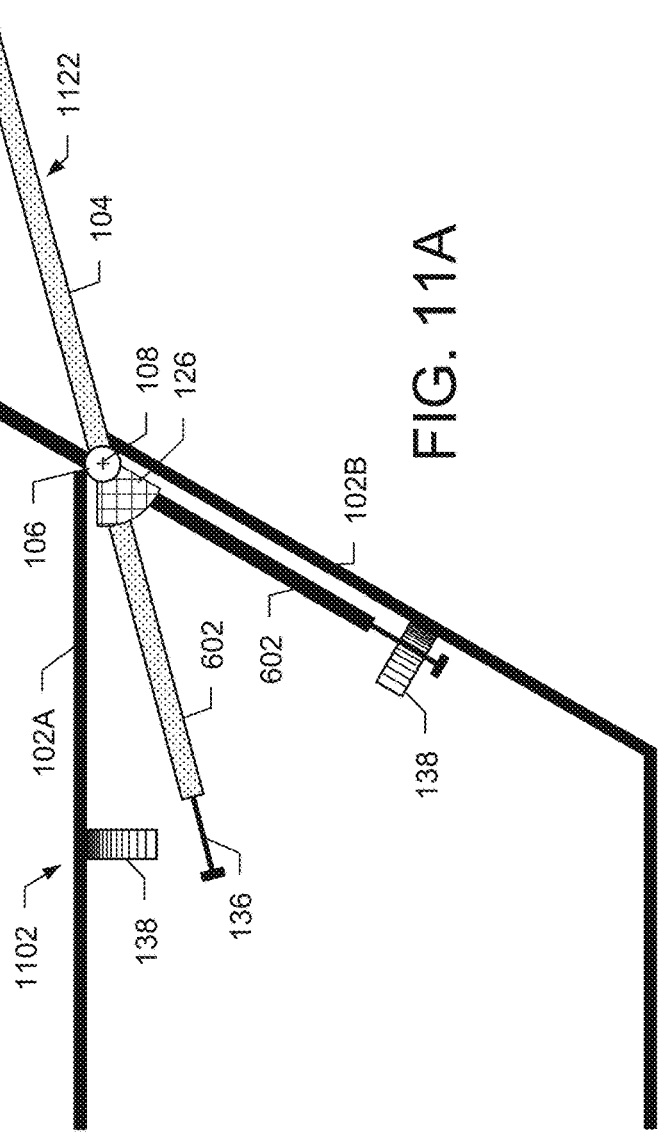
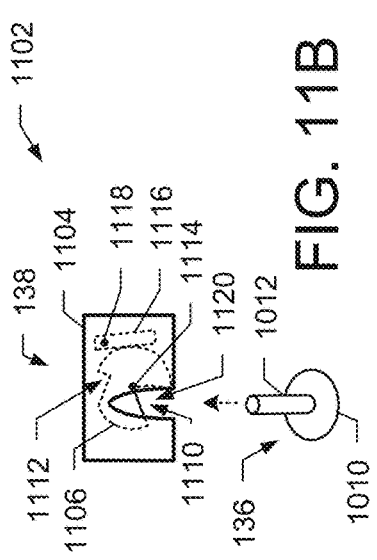
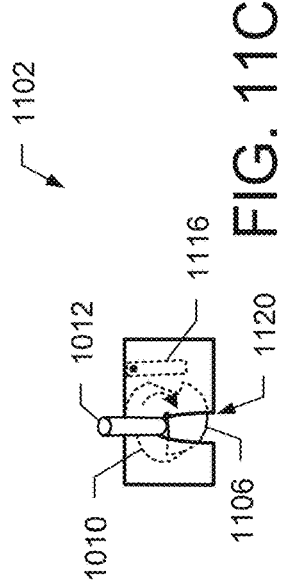
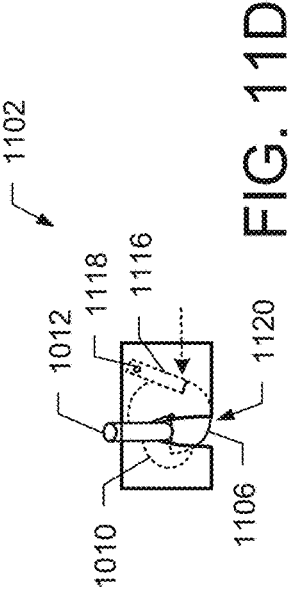
FIG. 11A
FIG. 11B
FIG. 11C
FIG. 11D

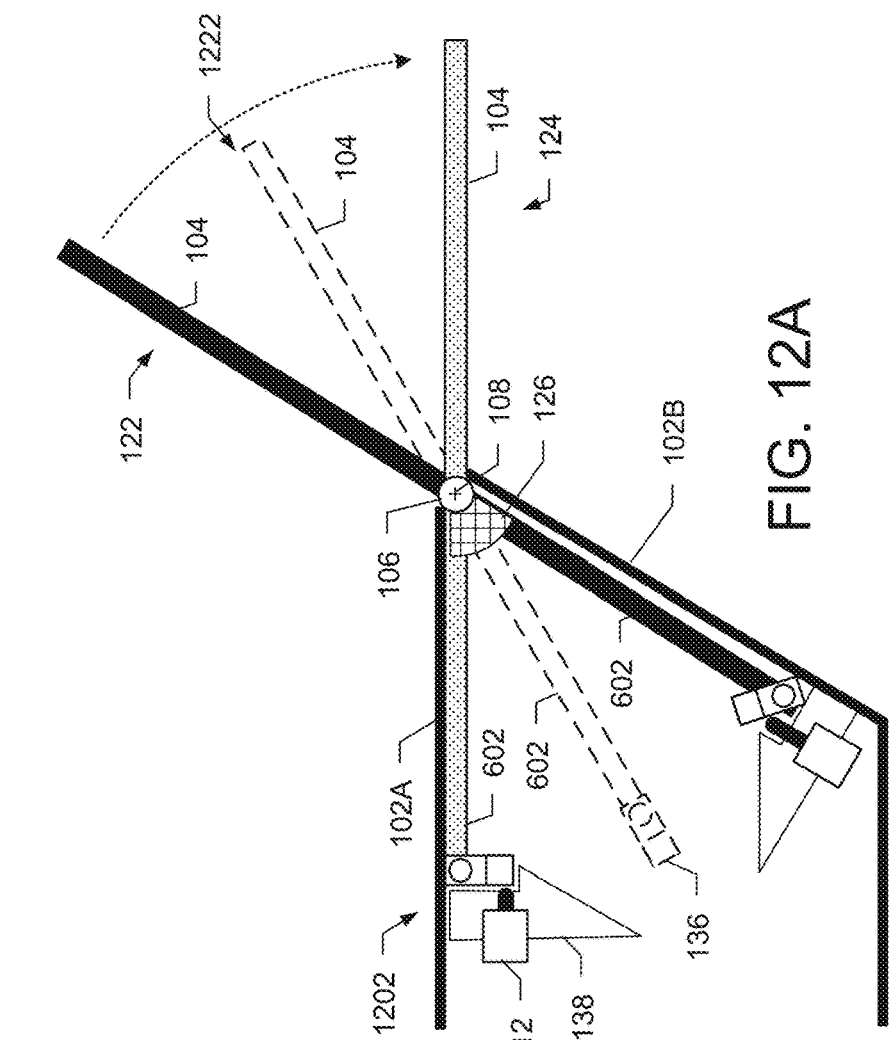
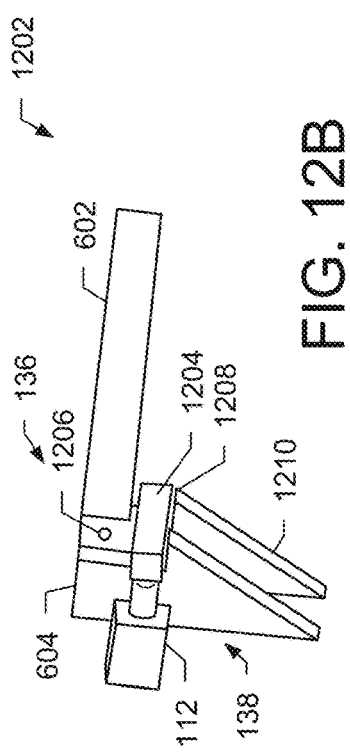
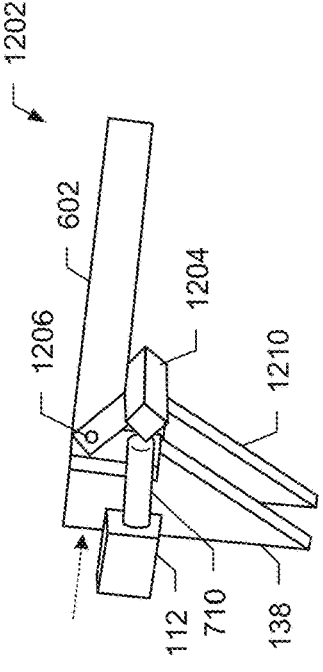
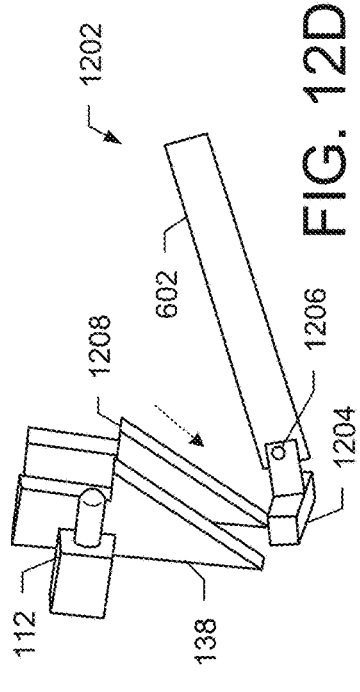
FIG. 12A
FIG. 12B
FIG. 12C
FIG. 12D

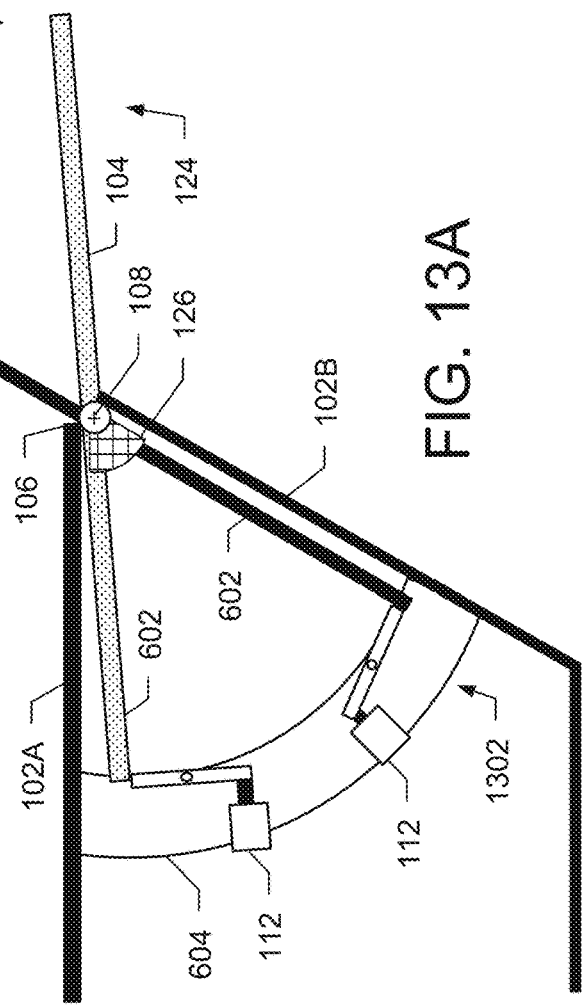
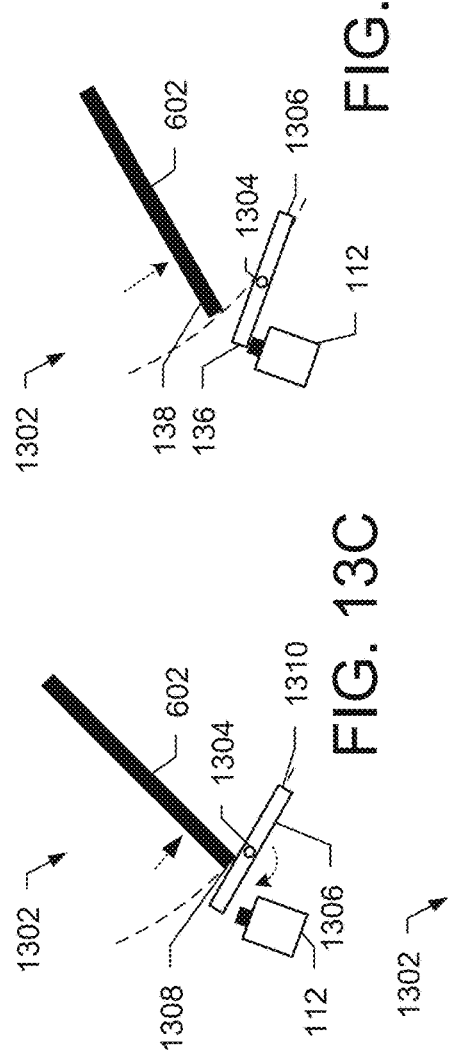
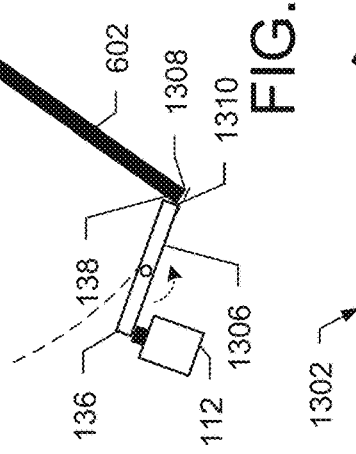
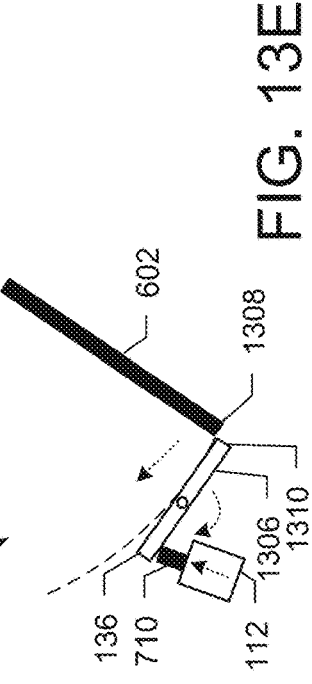
FIG. 13A
FIG. 13B
FIG. 13C
FIG. 13D
FIG. 13E

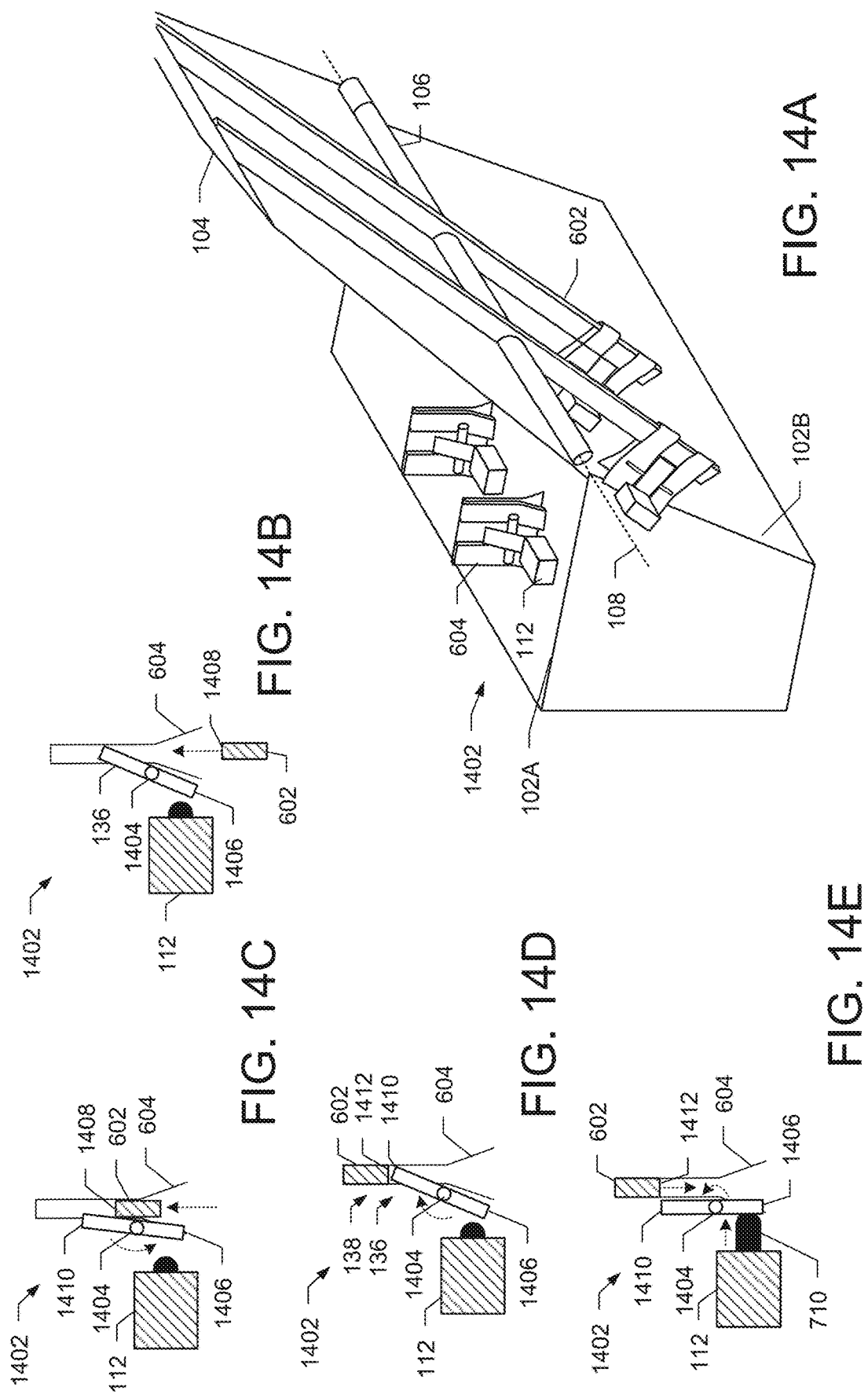

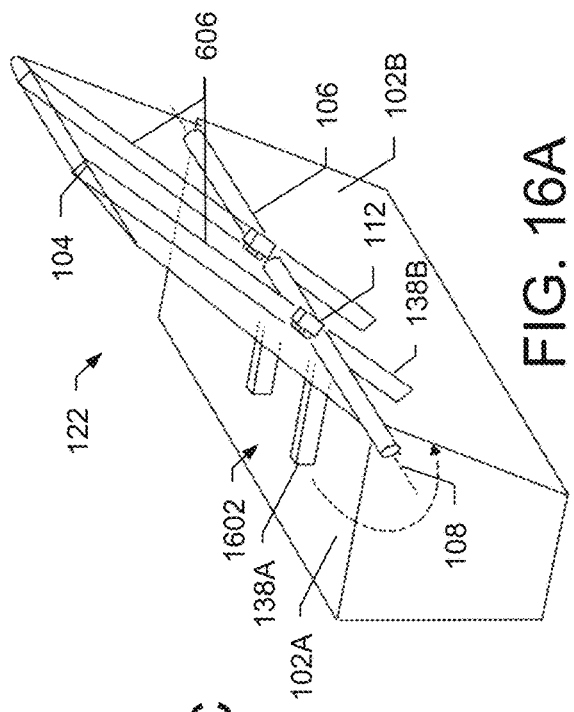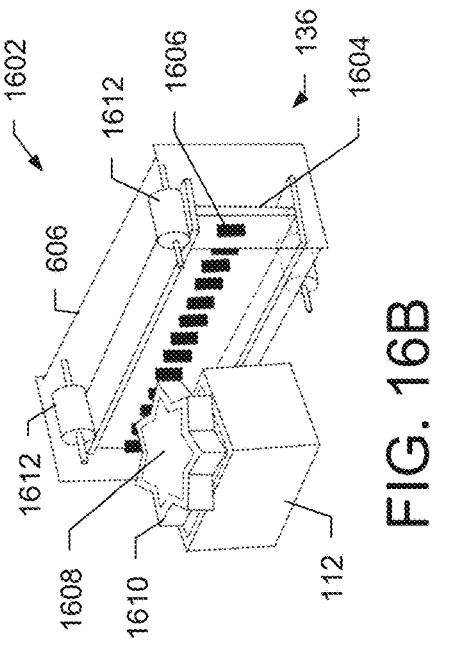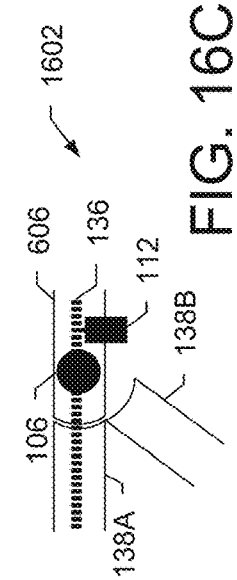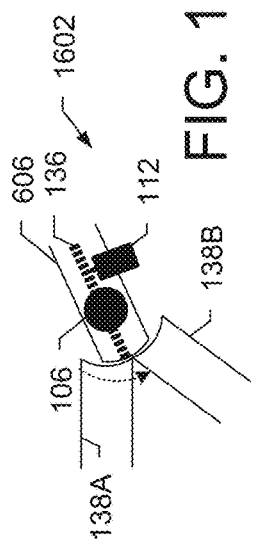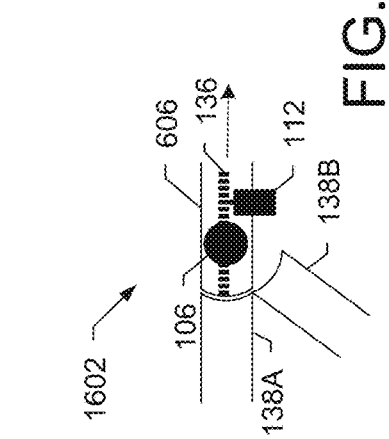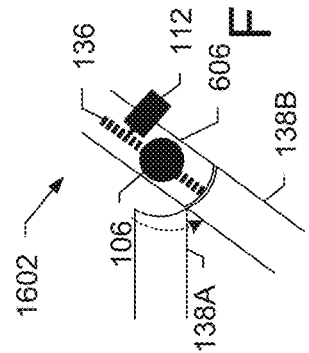

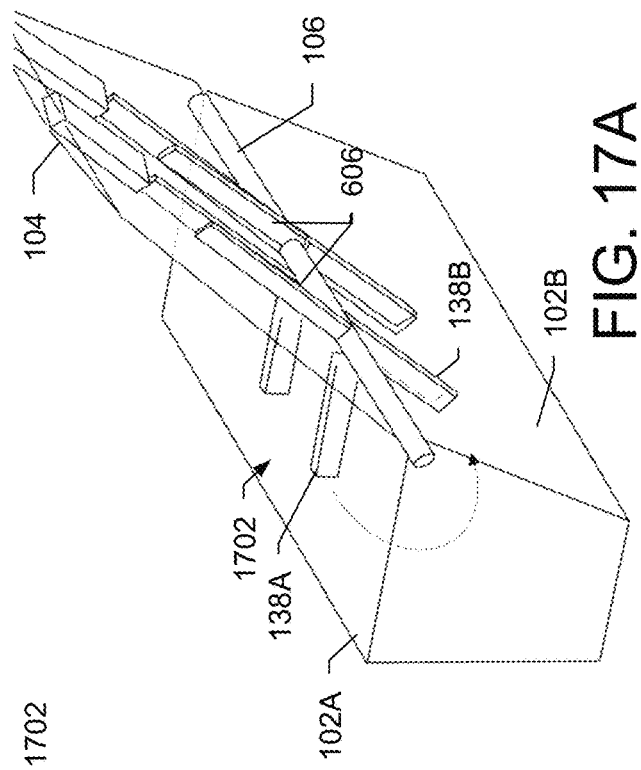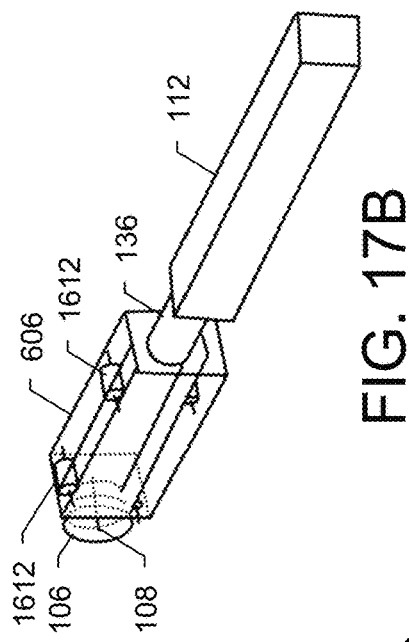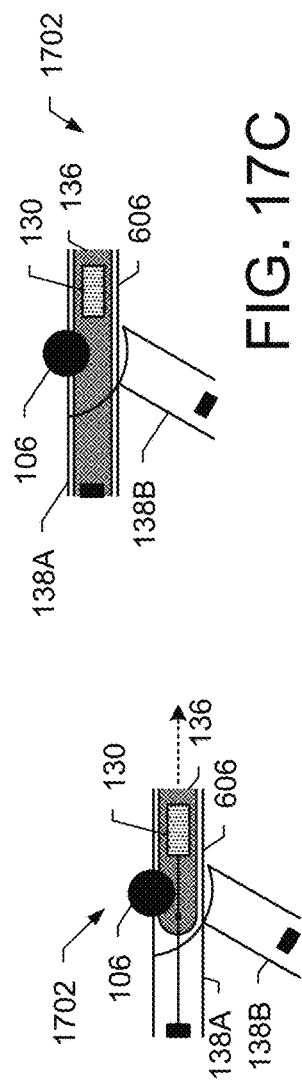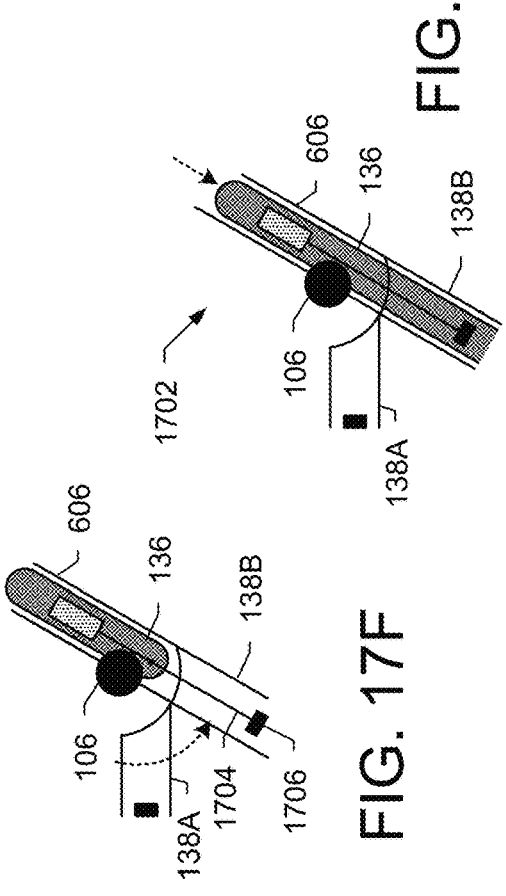

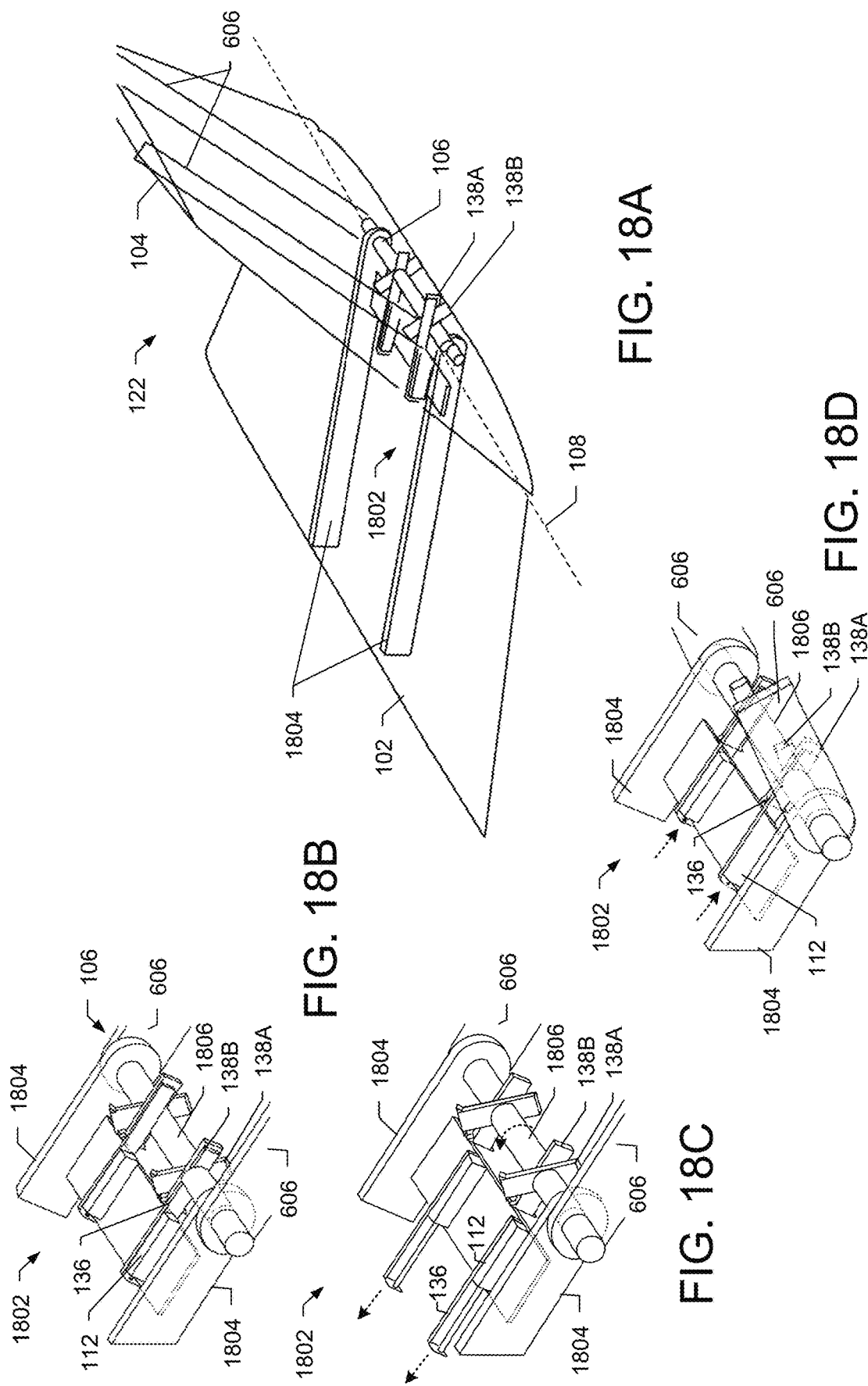

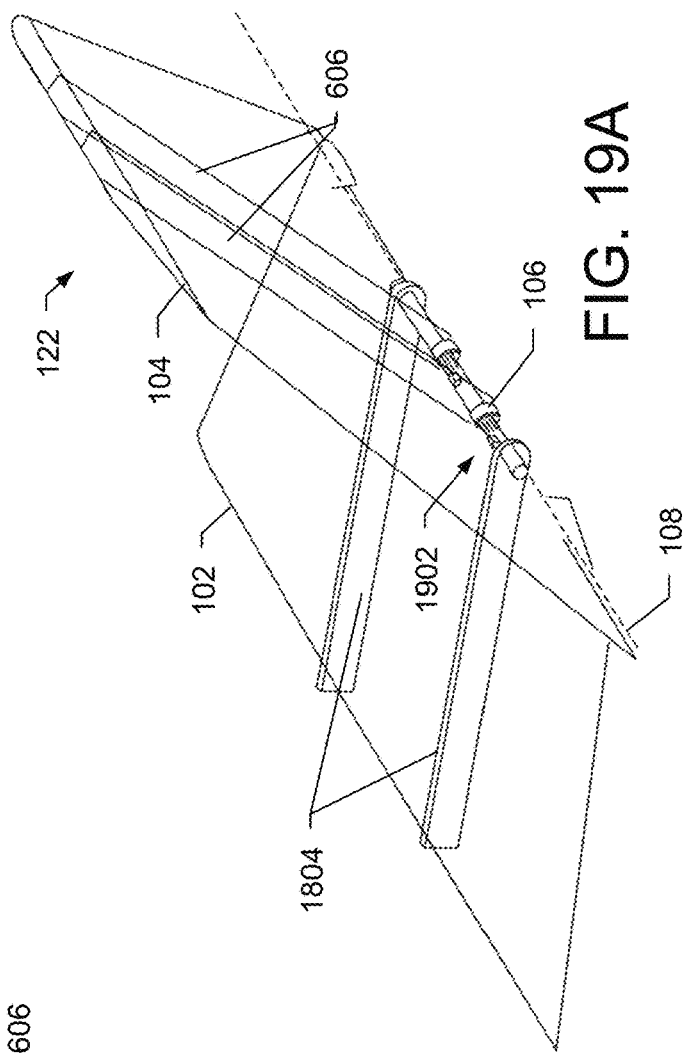
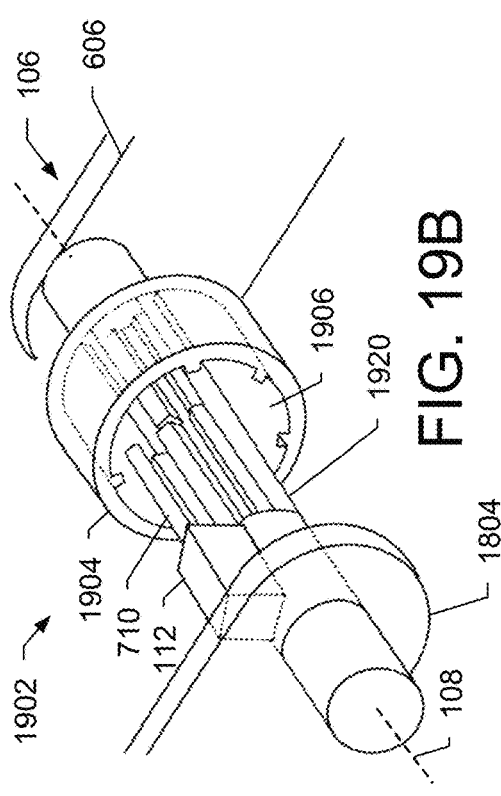
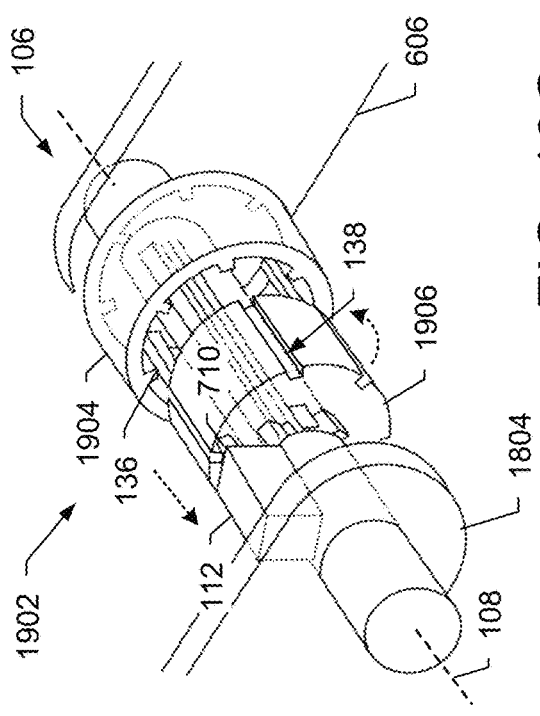

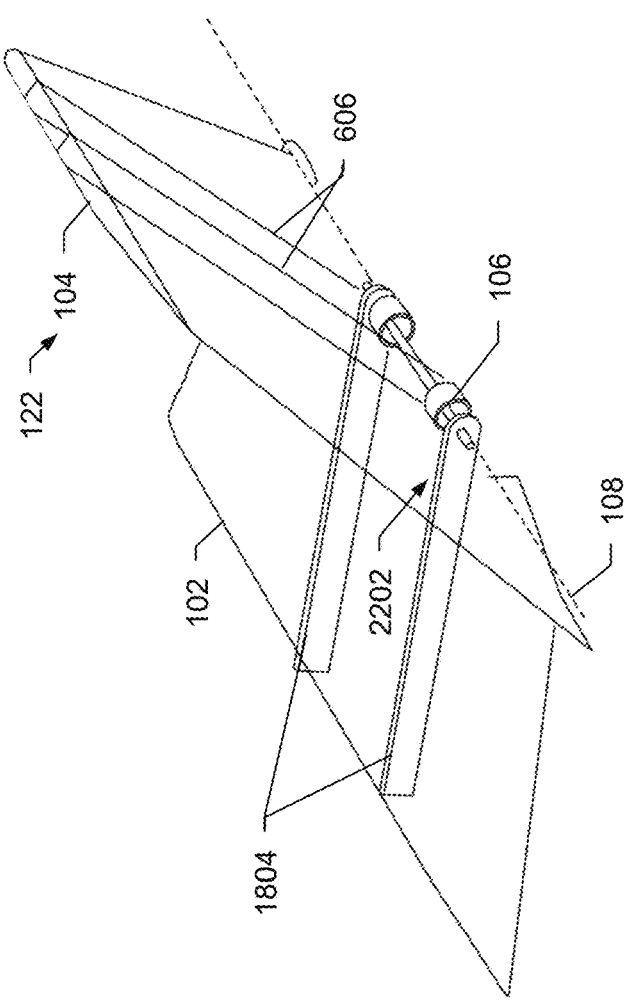
FIG. 22A
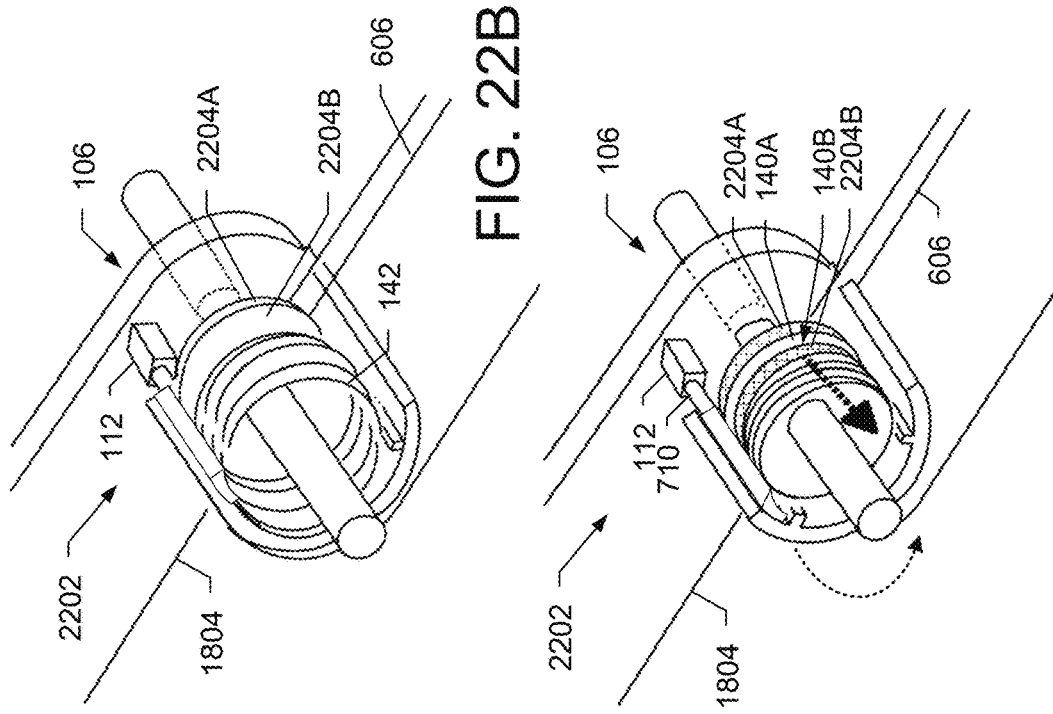
FIG. 22B
FIG. 22C

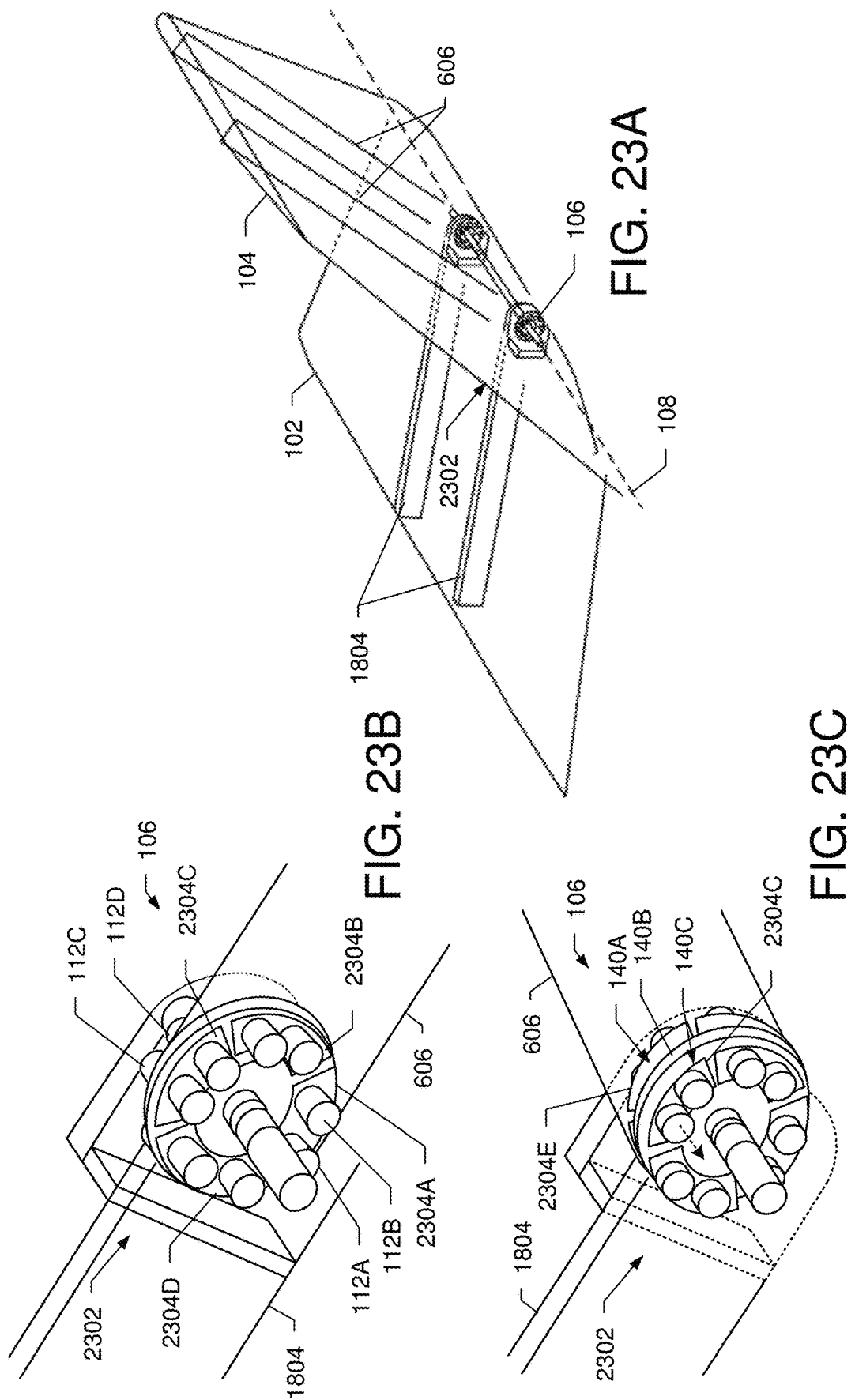

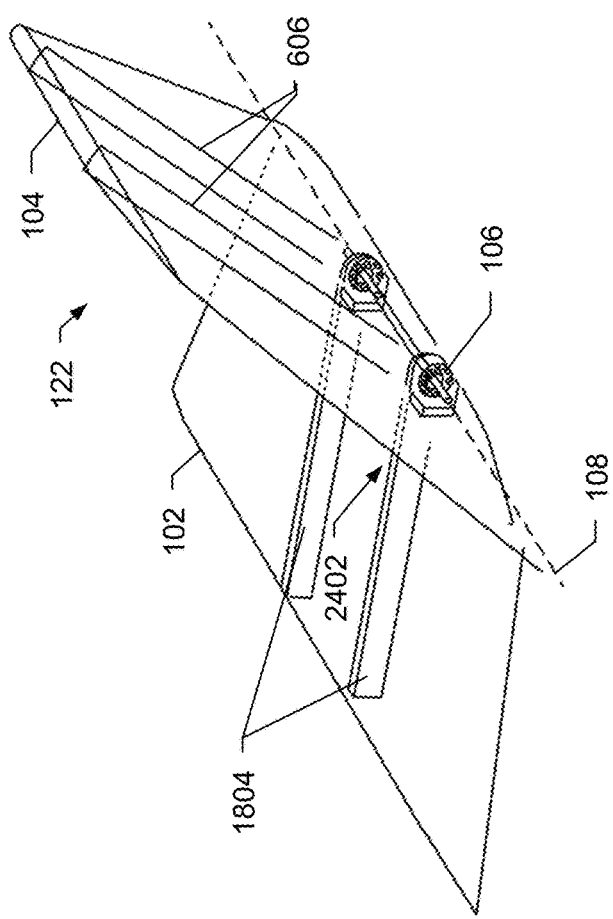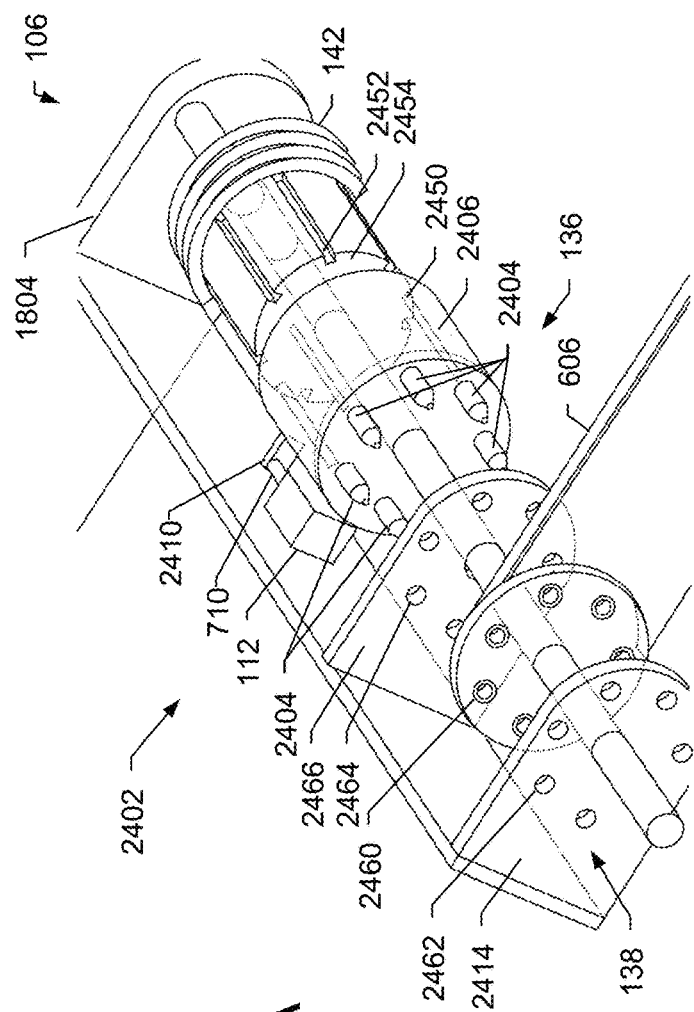
FIG. 24A
FIG. 24B

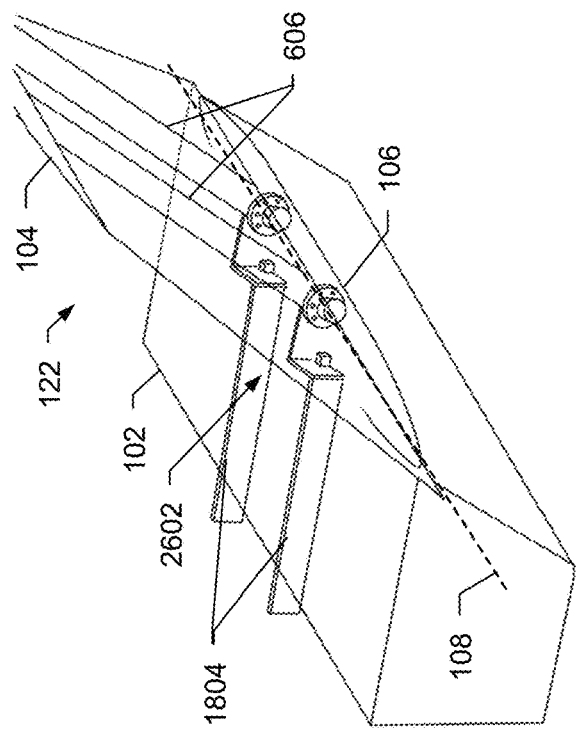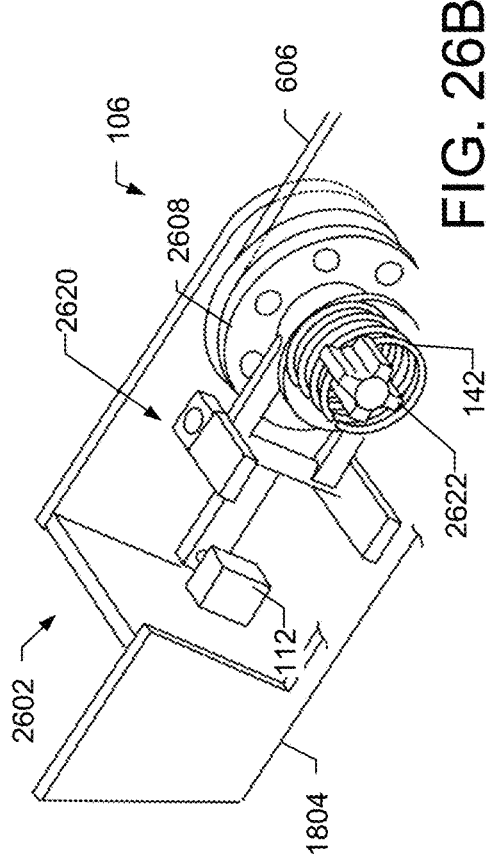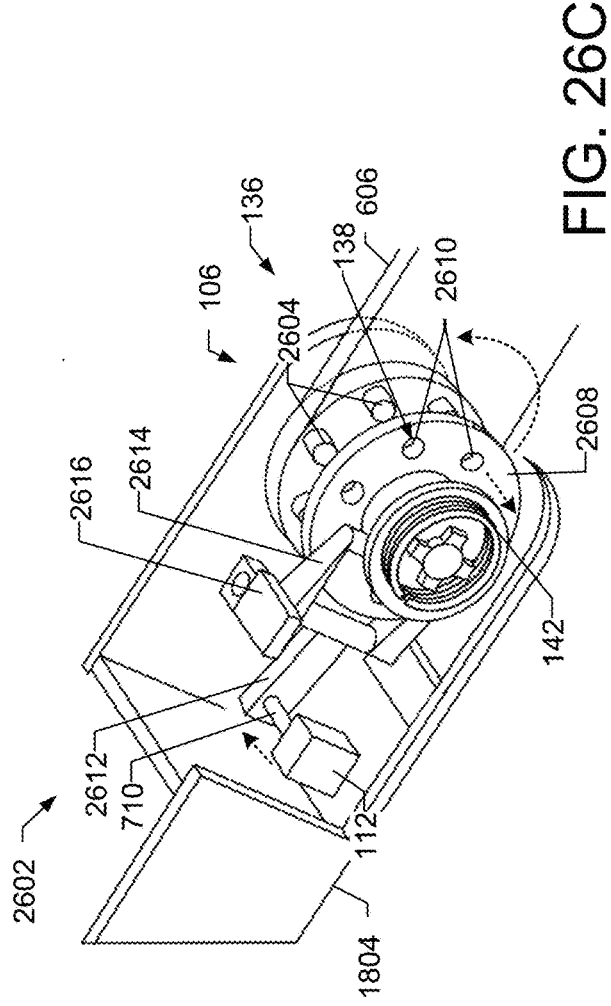

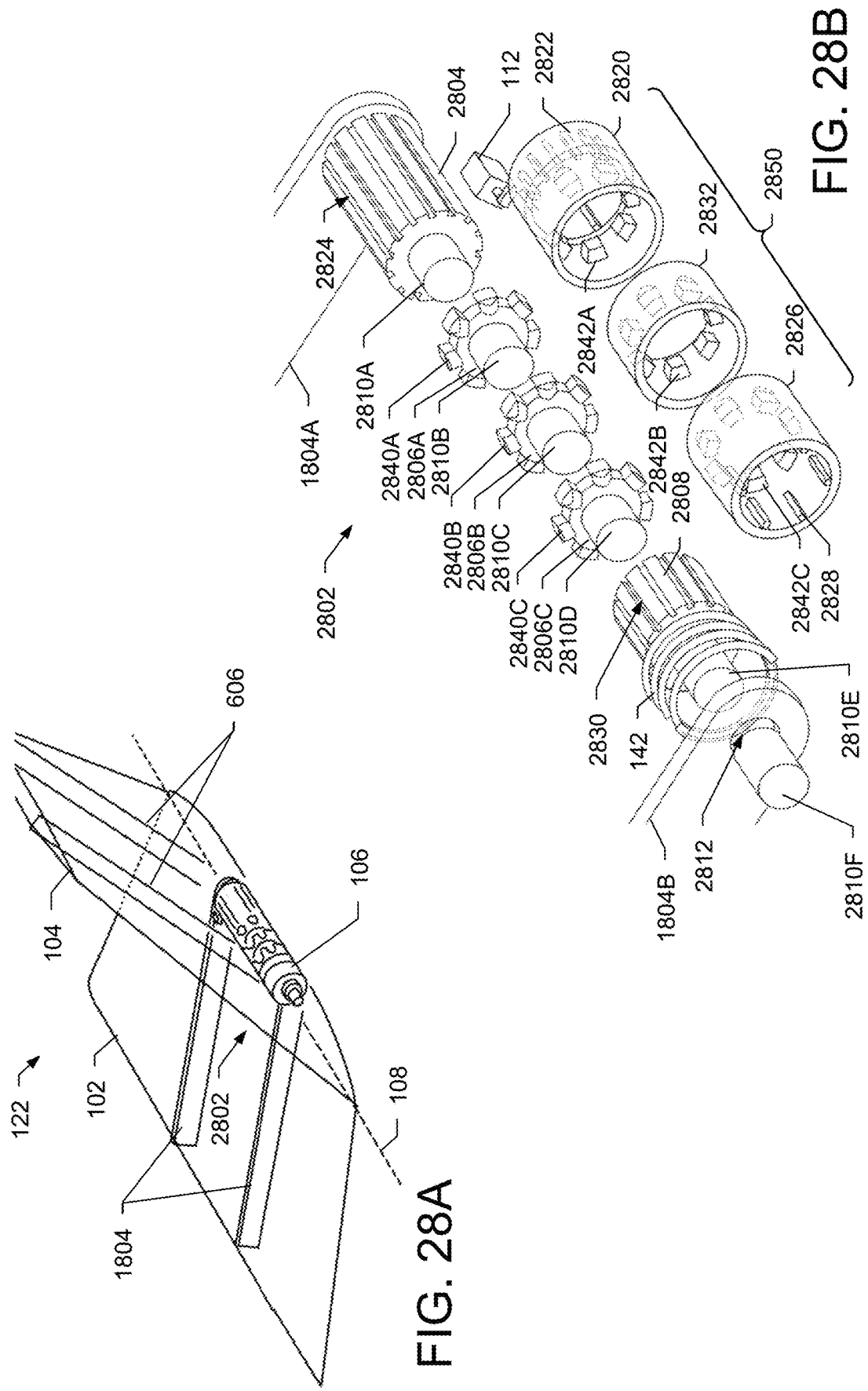

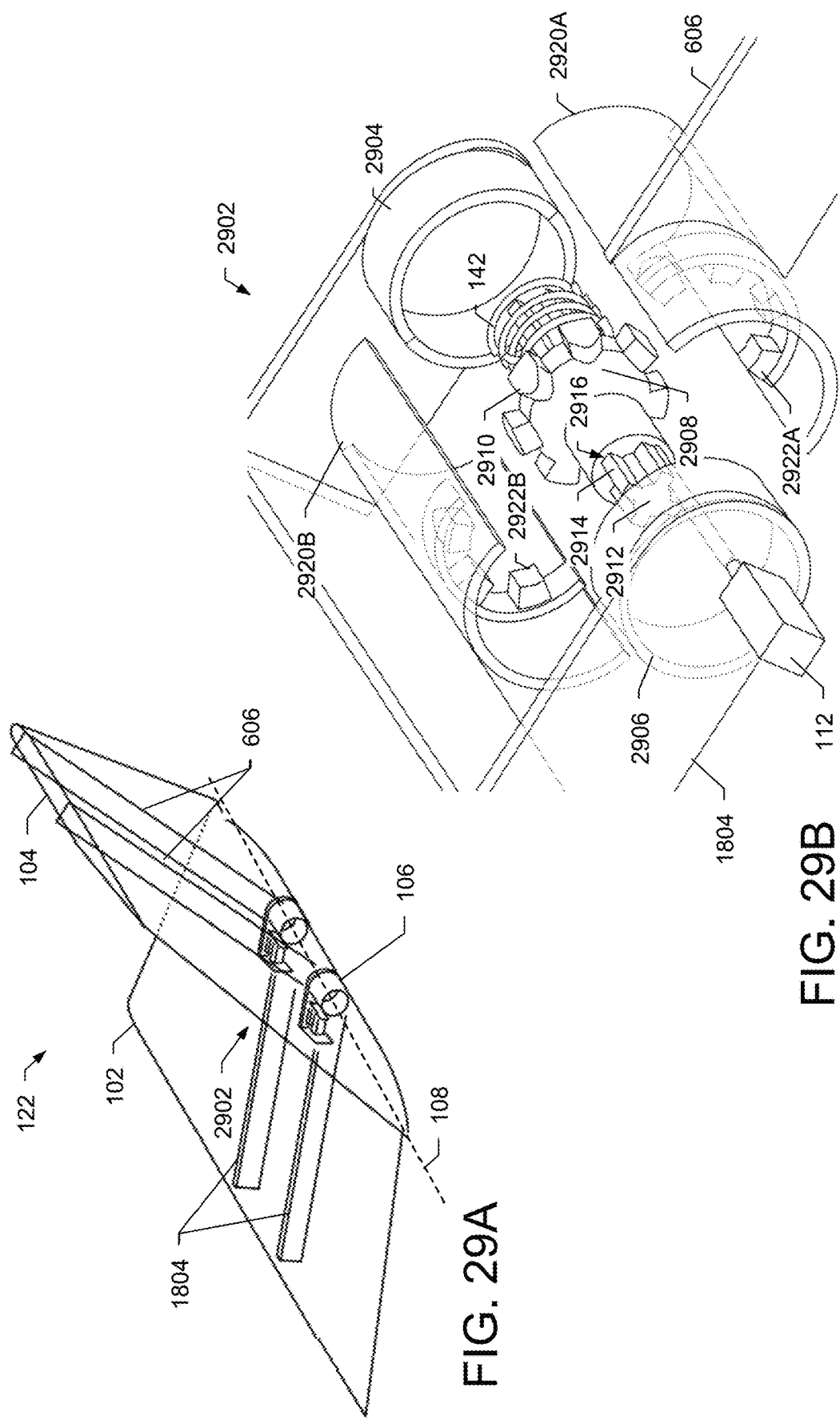

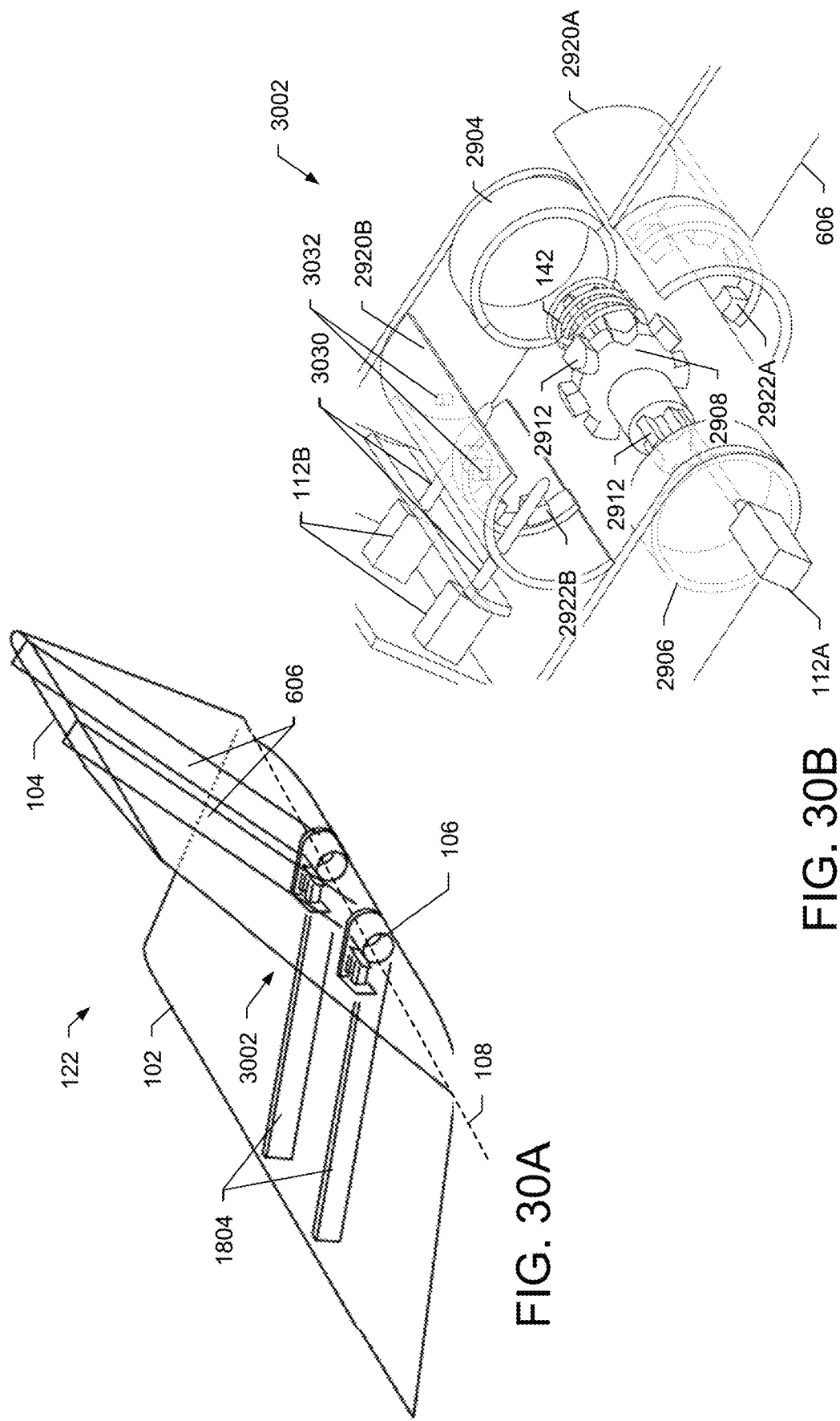

VARIABLE POSITION AIRFOIL

FIELD OF THE DISCLOSURE

The present disclosure is generally related to a variable position airfoil for an aircraft.

BACKGROUND

Various flight surfaces and airfoils of an aircraft improve agility of the aircraft but can also contribute significantly to the radar cross-section of the aircraft. Thus, high performance aircraft designers may have to consider a tradeoff between an aircraft performance and radar cross-section. As an example, many conventional aircraft (such as commercial aircraft) have a vertical tail. However, in many high-performance aircraft, the "vertical" tail or rudder assembly is canted (rather than vertical) to balance agility with radar cross-section. Such design tradeoffs do not provide optimal performance for either agility or radar cross-section.

SUMMARY

In a particular implementation, an aircraft includes an airfoil and a hinge member to rotatably couple the airfoil to a structure of an aircraft. The hinge member defines at least a portion of a rotational axis. The aircraft also includes an indexing mechanism coupled to the airfoil and configured to, in a first state, inhibit rotation of the airfoil about the rotational axis, and in a second state, to permit rotation of the airfoil about the rotational axis between a first position and a second position that is angularly indexed relative to the first position. The aircraft further includes an actuator to selectively change a state of the indexing mechanism from the first state to the second state, from the second state to the first state, or both.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 6A is a diagram that schematically illustrates operation of a first example of the movable airfoil of the aircraft of FIG. 1 according to particular aspects.

FIG. 7A is a diagram that schematically illustrates a second example of the movable airfoil of the aircraft of FIG. 1 according to particular aspects.

FIGS. 7B and 7C are diagrams that together schematically illustrate aspects of operation of the second example of the movable airfoil of FIG. 7A.

FIG. 9A is a diagram that schematically illustrates a fourth example of the movable airfoil of the aircraft of FIG. 1 according to particular aspects.

FIG. 9B is a diagram that schematically illustrates another view of a portion of the fourth example of the movable airfoil of FIG. 9A.

FIGS. 9C, 9D, and 9E are diagrams that together schematically illustrate aspects of operation of the fourth example of the movable airfoil of FIG. 9A.

FIG. 11A is a diagram that schematically illustrates a sixth example of the movable airfoil of the aircraft of FIG. 1 according to particular aspects.

FIGS. 11B, 11C, and 11D are diagrams that together schematically illustrate aspects of operation of the sixth example of the movable airfoil of FIG. 11A.

FIG. 12A is a diagram that schematically illustrates a seventh example of the movable airfoil of the aircraft of FIG. 1 according to particular aspects.

FIGS. 12B, 12C, and 12D are diagrams that together schematically illustrate aspects of operation of the seventh example of the movable airfoil of FIG. 12A.

FIG. 13A is a diagram that schematically illustrates an eighth example of the movable airfoil of the aircraft of FIG. 1 according to particular aspects.

FIGS. 13B, 13C, 13D, and 13E are diagrams that together schematically illustrate aspects of operation of the eighth example of the movable airfoil of FIG. 13A.

FIG. 14A is a diagram that schematically illustrates a ninth example of the movable airfoil of the aircraft of FIG. 1 according to particular aspects.

FIGS. 14B, 14C, 14D, and 14E are diagrams that together schematically illustrate aspects of operation of the ninth example of the movable airfoil of FIG. 14A.

FIG. 16A is a diagram that schematically illustrates an eleventh example of the movable airfoil of the aircraft of FIG. 1 according to particular aspects.

FIG. 16B is a diagram that schematically illustrates another view of a portion of the eleventh example of the movable airfoil of FIG. 16A.

FIGS. 16C, 16D, 16E, 16F, and 16G are diagrams that together schematically illustrate aspects of operation of the eleventh example of the movable airfoil of FIG. 16A.

FIG. 17A is a diagram that schematically illustrates a twelfth example of the movable airfoil of the aircraft of FIG. 1 according to particular aspects.

FIG. 17B is a diagram that schematically illustrates another view of a portion of the twelfth example of the movable airfoil of FIG. 17A.

FIGS. 17C, 17D, 17E, 17F, and 17G are diagrams that together schematically illustrate aspects of operation of the twelfth example of the movable airfoil of FIG. 17A.

FIG. 18A is a diagram that schematically illustrates a thirteenth example of the movable airfoil of the aircraft of FIG. 1 according to particular aspects.

FIGS. 18B, 18C, and 18D are diagrams that together schematically illustrate aspects of operation of the thirteenth example of the movable airfoil of FIG. 18A.

FIG. 19A is a diagram that schematically illustrates a fourteenth example of the movable airfoil of the aircraft of FIG. 1 according to particular aspects.

FIGS. 19B and 19C are diagrams that together schematically illustrate aspects of operation of the fourteenth example of the movable airfoil of FIG. 19A.

FIG. 22A is a diagram that schematically illustrates a seventeenth example of the movable airfoil of the aircraft of FIG. 1 according to particular aspects.

FIGS. 22B and 22C are diagrams that together schematically illustrate aspects of operation of the seventeenth example of the movable airfoil of FIG. 22A.

FIG. 23A is a diagram that schematically illustrates an eighteenth example of the movable airfoil of the aircraft of FIG. 1 according to particular aspects.

FIGS. 23B and 23C are diagrams that together schematically illustrate aspects of operation of the eighteenth example of the movable airfoil of FIG. 23A.

FIG. 24A is a diagram that schematically illustrates a nineteenth example of the movable airfoil of the aircraft of FIG. 1 according to particular aspects.

FIG. 24B is a diagram that schematically illustrates components of the nineteenth example of the movable airfoil of the aircraft of FIG. 1 according to particular aspects.

FIG. 26A is a diagram that schematically illustrates a twenty-first example of the movable airfoil of the aircraft of FIG. 1 according to particular aspects.

FIGS. 26B and 26C are diagrams that together schematically illustrate aspects of operation of the twenty-first example of the movable airfoil of FIG. 26A.

FIG. 28A is a diagram that schematically illustrates a twenty-third example of the movable airfoil of the aircraft of FIG. 1 according to particular aspects.

FIG. 28B is a diagram that schematically illustrates components of the twenty-third example of the movable airfoil of the aircraft of FIG. 1 according to particular aspects.

FIG. 29A is a diagram that schematically illustrates a twenty-fourth example of the movable airfoil of the aircraft of FIG. 1 according to particular aspects.

FIG. 29B is a diagram that schematically illustrates components of the twenty-fourth example of the movable airfoil of the aircraft of FIG. 1 according to particular aspects.

FIG. 30A is a diagram that schematically illustrates a twenty-fifth example of the movable airfoil of the aircraft of FIG. 1 according to particular aspects.

FIG. 30B is a diagram that schematically illustrates components of the twenty-fifth example of the movable airfoil of the aircraft of FIG. 1 according to particular aspects.

DETAILED DESCRIPTION

Figure 1:
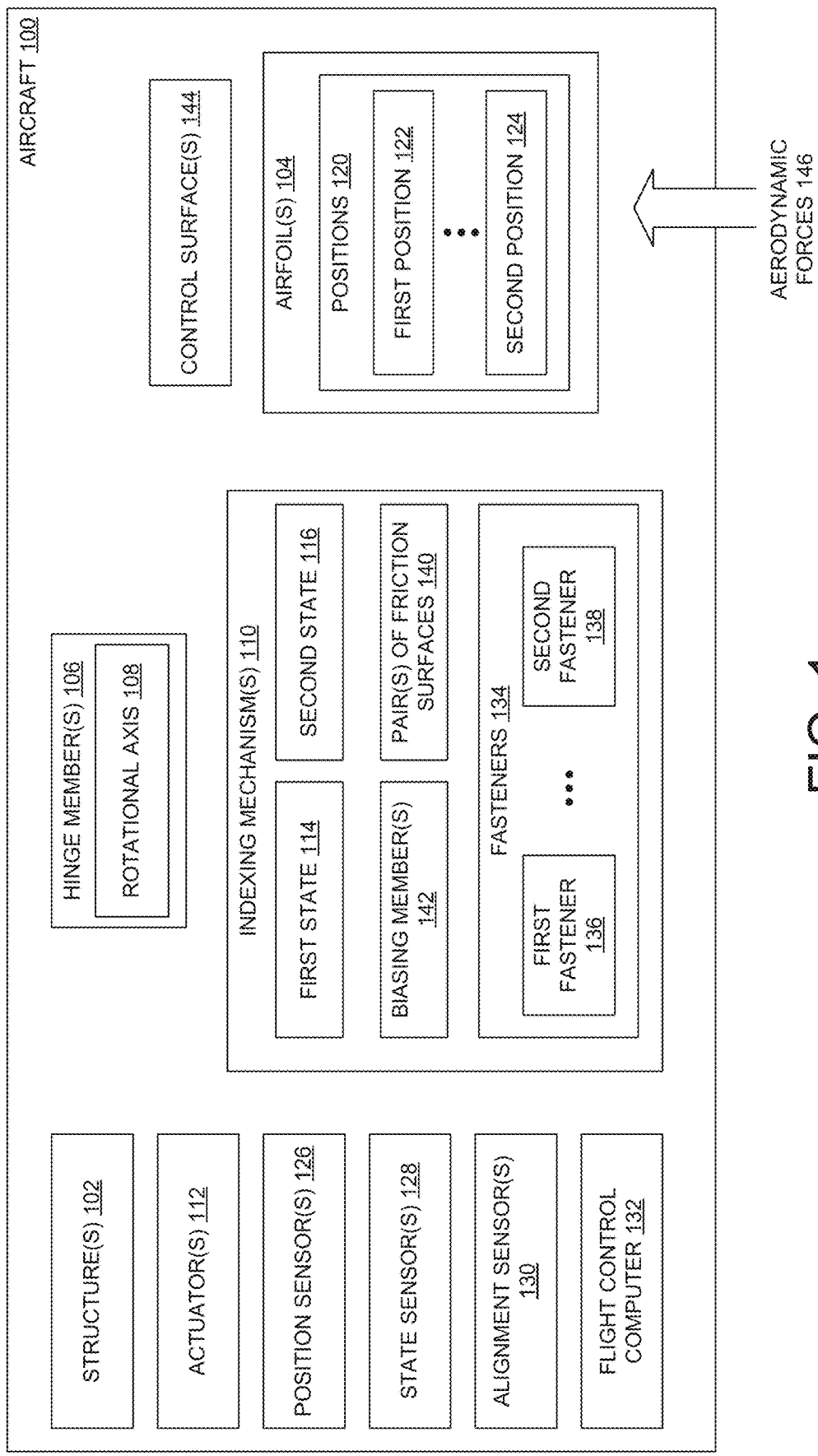
FIG. 1 is a block diagram that illustrates an example of an aircraft including an airfoil that is movable between two or more positions.

Implementations described herein provide movable airfoils to enable movement (e.g., rotation) of an aerodynamic surface between two or more positions during flight. For example, in a second position, the aerodynamic surface may provide reduced radar cross-section (as compared to when the aerodynamic surface is in a first position). In the first position, the aerodynamic surface may provide improve agility (as compared to when the aerodynamic surface is in the second position). To illustrate, during flight, an airfoil may be positioned more or less horizontally (relative to a level flight orientation of the aircraft) and operate as a horizontal stabilizer or an elevator. In this circumstance, the airfoil has a relatively small radar cross-section but provides little or no yaw control. Later in the flight, such as a stealth portion of a mission is over, the airfoil may be rotated to a more vertical position to operate as a vertical stabilizer or a rudder. In this circumstance, the airfoil has a larger radar cross-section but provides improved yaw control.

In a particular aspect, a movable airfoil is movable between two or more indexed positions. In this context, "indexed" means that the airfoil can be locked, latched, or otherwise reliably retained at a known position. As an example, the airfoil may be rotatable between two indexed positions, such as a first indexed position that disposes the airfoil in a vertical orientation and a second indexed position that disposes the airfoil in a horizontal orientation. In this example, the airfoil is retained at the first indexed position until a command or signal is sent to release the airfoil, in which case the airfoil can rotate to and be retained at the second indexed position. In other examples, the first and second indexed positions are at angles that are not precisely vertical and/or horizontal, respectively, relative to the aircraft. To illustrate, in the first indexed position, the airfoil may be offset from the vertical orientation by an offset angle that is less than 90 degrees. In some implementations, the airfoil may be rotatable between more than two indexed positions, such as to N indexed positions, where N is an integer greater than two.

In some implementations, movement of the airfoil is driven by one or more actuators. In some implementations, one or more control surfaces coupled to the airfoil are controlled, via one or more actuators, to adjust the aerodynamic forces to which the airfoil is subjected. In some such implementations, the aerodynamic forces are used to assist with moving the airfoil. In other implementations, movement of the airfoil is driven only by the aerodynamic forces. For example, to move the airfoil may be driven upward responsive to interaction of the airfoil with airflow around the aircraft during flight. In implementations in which the movement of the airfoil is driven by aerodynamic forces, actuators to drive movement of the airfoil may be omitted. Alternatively, in such implementations, actuators to drive movement of the airfoil may be present but unused in circumstances where aerodynamic forces are sufficient to drive the airfoil to a desired position.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2A, multiple airfoils are illustrated and associated with reference numbers 104A and 104B. When referring to a particular one of these designs, such as the port-side airfoil 104A, the distinguishing letter "A" is used. However, when referring to any arbitrary one of these airfoils or to these designs as a group, the reference number 104 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an aircraft 100 including one or more position sensors ("position sensor(s) 126" in FIG. 1), which indicates that in some implementations the aircraft 100 includes a single position sensor 126 and in other implementations the aircraft 100 includes multiple position sensors 126. For ease of reference herein, such features are generally introduced as "one or more" features and may subsequently be referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram that illustrates an example of an aircraft 100 including one or more airfoils 104 (also referred to herein as "movable airfoils 104" or "variable position airfoils 104") that are movable between two or more positions 120. Each airfoil 104 is rotatable coupled via one or more hinge members 106 to one or more structures 102 of the aircraft 100. The structure(s) 102 include, for example, struts, spars, stringers, longerons, bulkheads, ribs, frames, or other structural members. Each hinge member 106 defines at least a portion of a rotational axis 108 about which a particular airfoil 104 is able to rotate.

In particular implementations, the rotational axis 108 of a particular airfoil 104 is oriented along a roll axis of the aircraft 100 and to enable movement of the airfoil 104 between multiple positions 120. In such implementations, rotation of the particular airfoil 104 about the rotational axis 108 changes an angle of the particular airfoil 104 relative to a yaw-rotation plane of the aircraft 100. As used herein, the "yaw-rotation plane" of the aircraft 100 refers to a plane defined by a roll axis and pitch axis of the aircraft 100 and normal to a yaw axis of the aircraft 100.

In a particular example, a particular airfoil 104 extends vertically (e.g., 90 degrees with respect to the yaw-rotation plane) from a fuselage, wing, canard, or horizontal stabilizer of the aircraft 100 when in the particular airfoil 104 is in a first position, and the particular airfoil 104 extends horizontally (e.g., 0 degree with respect to the yaw-rotation plane) from the fuselage, wing, canard, or horizontal stabilizer of the aircraft 100 when the particular airfoil 104 is in a second position 124. In this example, the particular airfoil 104 moves between the first position 122 and the second position 124 via rotation about the rotational axis 108. In other examples, the first position 122 is angularly offset from vertical (e.g., between 0 degrees and 90 degrees or between 0 degrees and 180 degrees with respect to the yaw-rotation plane), the second position 124 is angularly offset from horizontal (e.g., between 0 degrees and 90 degrees or between 0 degrees and 180 degrees with respect to the yaw-rotation plane), or both. To illustrate, the airfoil 104 may be oriented at an angle of 80 degrees with respect to the yaw-rotation plane when in the first position 122, and the airfoil 104 may be oriented at an angle of 20 degrees with respect to the yaw-rotation plane when in the second position 124. In some implementations, the airfoil 104, in the first position 122, extends below horizontal (e.g., between 0 degrees and −90 degrees with respect to the yaw-rotation plane). For example, the aircraft 100 may operate during flight with the airfoil 104 in the first position 122 in which the airfoil 104 projects beneath the aircraft 100, and the airfoil 104 may be moved to the second position 124 to provide additional clearance underneath the aircraft 100 for takeoff or landing operations.

In a particular aspect, the second position 124 is angularly indexed with respect to the first position 122. For example, in particular implementations, the aircraft 100 includes one or more indexing mechanisms 110 configured to retain the airfoil 104 at the second position 124, which is at a known and/or fixed angle relative to the first position 122. Each indexing mechanism 110 is coupled to a respective airfoil 104. An indexing mechanism 110 coupled to a particular airfoil 104 is configured to inhibit rotation of the airfoil 104 when the indexing mechanism 110 is in a first state 114 and to permit rotation of the airfoil 104 about the rotational axis 108 between the first position 122 and the second position 124 when the indexing mechanism 110 is in a second state 116. For example, the first state 114 of the indexing mechanism(s) 110 corresponds to a locked, latched, or otherwise secured state, and the second state 116 of the indexing mechanism(s) 110 corresponds to an unlocked, unlatched, or otherwise unsecured state. In some implementations, a particular indexing mechanism 110 is configured to permit rotation the airfoil 104 about the rotational axis 108 between a plurality of angularly indexed positions that include the first position 122, the second position 124, and one or more additional angularly indexed positions.

In a particular implementation, each indexing mechanism 110 is coupled to one or more actuators 112. The actuator(s) 112 coupled to a particular indexing mechanism 110 are configured to selectively change a state of the indexing mechanism 110 from the first state 114 to the second state 116, from the second state 116 to the first state 114, or both. For example, an actuator 112 may be actuated to unlock or unlatch the indexing mechanism 110 to permit rotation of the airfoil 104. In this example, the actuator 112 may oppose one or more biasing members 142 that tend to lock or latch the indexing mechanism 110, in which case the indexing mechanism 110 may default to the second state 116 when the actuator 112 is not activated (e.g., is not powered). As another example, the actuator 112 may be actuated to lock or latch the indexing mechanism 110 to prohibit or inhibit rotation of the airfoil 104. In this example, the actuator 112 may oppose one or more biasing members 142 that tend to unlock or unlatch the indexing mechanism 110, in which case the indexing mechanism 110 may default to the first state 114 when the actuator 112 is not activated (e.g., is not powered). In still another example, the actuator 112 may be actuated to lock or latch the indexing mechanism 110 to prohibit or inhibit rotation of the airfoil 104 and actuated to unlock or unlatch the indexing mechanism 110. The actuator(s) 112 are driven electrically, hydraulically, and/or pneumatically, as illustrative, non-limiting examples.

In a particular implementation, the actuator(s) 112 further include one or more actuators configured to facilitate movement of the airfoil(s) 104 between angularly indexed positions (e.g., between the first position 122 and the second position 124). Additionally, or alternatively, aerodynamic forces 146 applied to a particular airfoil 104 during flight are used to move the particular airfoil 104 between angularly indexed positions. For example, an actuator 112 may be change an indexing mechanism 110 associated with an airfoil 104 to the second state 116 to enable movement of the airfoil 104. In this example, a pilot and/or a flight control computer 132 may adjust one or more control surfaces (e.g., a control surface 144) such that the aerodynamic forces 146 applied to the airfoil 104 urge the airfoil 104 toward a desired, angularly indexed position. To illustrate, if the airfoil 104 is vertical in the first position 122 and horizontal in the second position 124, then to move the airfoil 104 from the second position 124 to the first position 122, the pilot and/or flight control computer 132 may cause the aircraft 100 to take on a slightly nose up pitch such that the aerodynamic forces 146 applied to a lower surface of the airfoil 104 are larger than the aerodynamic forces 146 applied to an upper surface of the airfoil 104 resulting in upward rotation of the airfoil 104. In some implementations, one or more control surfaces 144 may be coupled to the airfoil 104. In such implementations, the control surface 144 coupled to the airfoil 104 can be moved (rather than the entire aircraft 100) to rotate the airfoil 104.

In the example illustrated in FIG. 1, the aircraft 100 also includes one or more position sensors 126. Each of the position sensor(s) 126 is configured to generate position data indicating an indexed position of one of the airfoil(s) 104 about the rotational axis 108 of the airfoil 104. Each of the position sensor(s) 126 includes or corresponds to a rotary position encoder, an optical sensor, a position switch, or another sensor configured to detect a position 120 of the airfoil 104.

In the example illustrated in FIG. 1, the aircraft 100 also includes one or more state sensors 128. Each of the state sensor(s) 128 is configured to generate state data indicating whether an indexing mechanism 110 associated with the state sensor 128 is in the first state 114 or the second state 116. Each of the state sensor(s) 128 includes or corresponds to an optical sensor, a position switch, or another sensor configured to detect the state of the indexing mechanism 110.

As described in detail below, the indexing mechanism 110 includes a plurality of fasteners 134 (e.g., a first fastener 136, a second fastener 138, and possibly one or more additional fasteners), one or more pairs of friction surfaces 140, or a combination thereof. In implementations that include fasteners 134, the first fastener 136 is engaged with the second fastener 138 in the first state 114, and the first fastener 136 is disengaged from the second fastener 138 in the second state 116. Non-limiting examples of fasteners 134 include pins, receptacles, interlocking gears, pawls, catches, keys, keyways, etc.

In implementations that include a pair of friction surfaces 140, the first friction surface of the pair of friction surfaces 140 is in contact with a second friction surface of the pair of friction surfaces 140 in the first state 114, and the first friction surface of the pair of friction surfaces 140 is not in contact with a second friction surface of the pair of friction surfaces 140 in the second state 116. Non-limiting examples of friction surfaces include brake pads or similar apparatus.

In a particular implementation, the aircraft includes one or more alignment sensors 130. An alignment sensor 130 is configured to generate alignment data indicating whether a first fastener 136 of an indexing mechanism 110 is aligned with a second fastener 138 of the indexing mechanism 110. Each of the alignment sensor(s) 130 includes or corresponds to an optical sensor, a position switch, or another sensor configured to detect the alignment of two or more fasteners 134.

In some implementations, one or more of the fasteners 134 is shaped or otherwise configured to facilitate alignment of the fasteners 134. For example, a first end of the first fastener 136 may be beveled, contoured, or pointed to facilitate aligned engagement of the first fastener 136 and the second fastener 138. Alternatively, the first end of the first fastener 136 may include a roller to facilitate aligned engagement of the first fastener 136 and the second fastener 138. In some such implementations, the biasing member(s) 142 interact with the fasteners 134 such to urge the fasteners 134 toward alignment and engagement. To illustrate, when the first and second fasteners 136, 138 are nearly aligned, the biasing member(s) 142 may apply a force to the first fastener 136 that tends to both move the first and second fasteners 136, 138 closer to alignment as well as tending to move the first fastener 136 toward engagement with the second fastener 138.

In some implementations, the fasteners 134 are arranged such that the first fastener 136 moves along a direction that is substantially parallel to the rotational axis 108 to transition from the first state 114 to the second state 116. In some such implementations, the indexing mechanism 110 includes a plurality of first fasteners 136, a plurality of second fasteners 138, or both. For example, the first fasteners 136 may be arranged about a ring that is concentric with the rotational axis 108 and may move along the rotational axis 108 to engage with or disengage from the second fastener(s) 138. Alternatively, the second fasteners 138 may be arranged about a ring that is concentric with the rotational axis 108 and the first fastener(s) 136 may move along the rotational axis 108 to engage with or disengage from the second fasteners 138. In some such implementations, a count of the first fasteners 136 is not equal to a count of the second fasteners 138. For example, one second fastener 138 may be configured to selectively engage one of multiple angularly offset first fasteners 136, or one first fastener 136 may be configured to selectively engage one of multiple angularly offset second fasteners 138. In others of such implementations, the count of first fasteners 136 is equal to the count of the second fasteners 138.

In some implementations, the fasteners 134 are arranged such that the first fastener 136 moves along a direction that is substantially perpendicular to the rotational axis 108 to transition from the first state 114 to the second state 116. In some such implementations, the indexing mechanism 110 includes a plurality of first fasteners 136, a plurality of second fasteners 138, or both. For example, the first fasteners 136 may be arranged to move toward or away from the rotational axis 108 to engage with or disengage from the second fastener(s) 138.

Although FIG. 1 depicts two positions 120, in some implementations, an airfoil 104 is rotatable between more than two angularly indexed positions 120. For example, in a first position 122, an airfoil 104 may act as a vertical stabilizer or rudder (e.g., may facilitate yaw stabilization or yaw control) and in a second position 124, the airfoil 104 may act as a horizontal stabilizer or elevator (e.g., may facilitate pitch stabilization or pitch control). In this example, the airfoil 104 may also be indexed to a third position between the first position 122 and the second position 124. In the third position, the airfoil 104 may act as a ruddervator (e.g., may facilitate pitch and yaw stabilization and/or control). Generally, surfaces that extend vertically from the aircraft 100 increase a radar cross-section of the aircraft 100 but may also improve maneuverability of the aircraft 100. Thus, the first position 122 may be preferable for high-maneuverability operations, and the second position may be preferable for stealth operations. In the example above, the third position may be selected to provide a mix of stealth and maneuverability.

In general, the aircraft 100 is expected to include an even number of variable position airfoils (e.g., the airfoils 104)

arranged symmetrically about the roll axis of the aircraft 100. For example, a variable position airfoil on the port side of the aircraft 100 is generally matched with a mirror image variable position airfoil on the starboard side of the aircraft. In addition to the variable position airfoils, the aircraft 100 may include other airfoils. To illustrate, the aircraft may include fixed position airfoils, such as wings, vertical stabilizers, canards, horizontals stabilizers, or other airfoils, in addition to the variable position airfoils 104. For example, the aircraft 100 may include fixed wings, and a pair of the airfoils 104 which are configured to be movable between a position that provides yaw stabilization (e.g., the first position 122) and a position that provides pitch stabilization (e.g., the second position 124). In some implementations, variable position airfoils 104 may be attached to fixed position airfoils. To illustrate, the variable position airfoils 104 may correspond to variable position wing tips of a fixed wings of the aircraft 100.

In some implementation, the aircraft 100 may include more than one pair of variable position airfoils 104. For example, a first pair of variable position airfoils 104 may be arranged as variable position wing tips on main wings of the aircraft 100, and a second pair of variable position airfoils 104 may be arranges as variable ruddervators.

FIGS. 2A-5B illustrate various examples of configurations of the aircraft 100 and examples of positions 120 of the airfoils 104. In each of FIGS. 2A-5B, the aircraft 100 may be an uncrewed aircraft (e.g., an autonomous or remotely piloted aircraft) or a crewed aircraft (e.g., operated by an onboard human pilot).

Figure 2A:
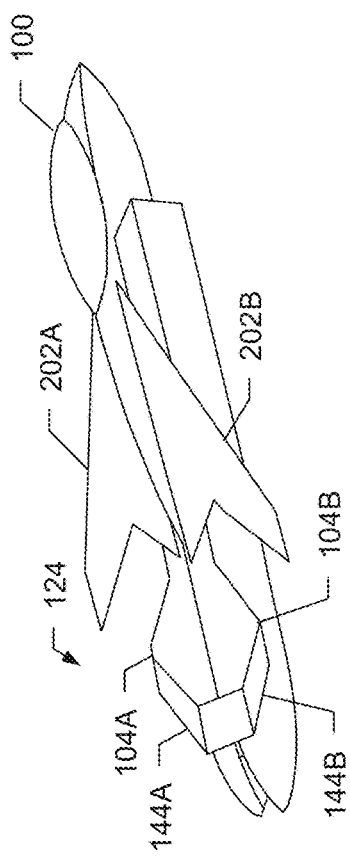
FIG. 2A is a diagram that illustrates a first example of the aircraft of FIG. 1 with the movable airfoils in a first position.
Figure 2B:
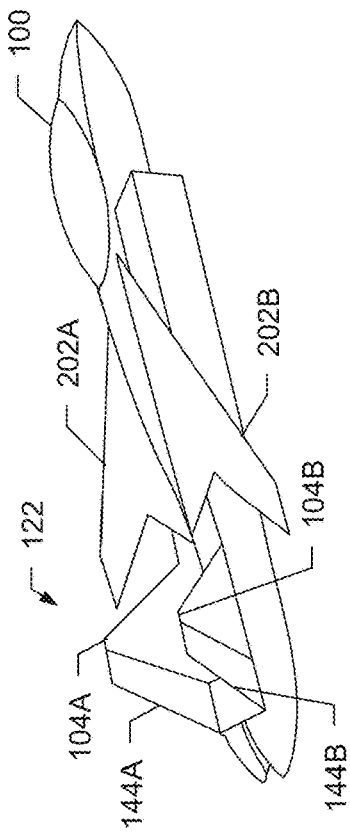
FIG. 2B is a diagram that illustrates the first example of the aircraft of FIG. 1 with the movable airfoils in a second position.

FIG. 2A is a diagram that illustrates a first example of the aircraft 100 of FIG. 1 with the movable airfoils (e.g., a port-side airfoil 104A and a starboard-side airfoil 104B, collectively referred to herein as "movable airfoils 104" or "variable position airfoils 104") in a first position 122, and FIG. 2B is a diagram that illustrates the first example of the aircraft 100 of FIG. 2A with the movable airfoils 104 in a second position 124. In the first example of FIGS. 2A and 2B, the aircraft 100 also includes one or more pairs of fixed position airfoils, such as a port-side wing 202A and a starboard-side wing 202B.

In the first example of FIGS. 2A and 2B, the movable airfoils 104 are in a V-tail arrangement in the first position 122 (as shown in FIG. 2A) and are in a horizontal stabilizer arrangement in the second position 124 (as shown in FIG. 2B). The V-tail arrangement of FIG. 2A provides better maneuverability and yaw stability than the horizontal stabilizer arrangement of FIG. 2B. However, the V-tail arrangement has a larger radar cross-section than the horizontal stabilizer arrangement. Thus, particular position used may depend on the mission or operations that the aircraft 100 is performing. Additionally, the position of the movable airfoils 104 can be changed in flight, such as to transition from a stealth portion of a mission to a high-maneuverability portion of the mission, or vice versa.

In the first example illustrated in FIGS. 2A and 2B, each of the movable airfoils 104 includes a respective control surface 144, such as a port-side control surface 144A and a starboard-side control surface 144B. In the first position 122, the control surfaces 144 operate as ruddervators to provide both pitch and yaw control. In the second position 124, the control surfaces 144 operate as elevators to provide pitch control. When the movable airfoils 104 are in the second position 124, yaw control may be provided by selective positioning of control surfaces on opposites sides of the aircraft 100, by thrust vectoring, or using other techniques. For example, when the pilot provides a yaw control input, the flight control computer 132 of FIG. 1 may generate a thrust vectoring command to effectuate the yaw control input.

Although FIG. 2A illustrates the first position 122 as corresponding to a V-tail arrangement, in other implementations, the first position 122 may correspond to a twin vertical stabilizer arrangement. For example, the airfoils 104A and 104B maybe substantially vertical. In this arrangement, the control surfaces 144A and 144B act as rudders. In some such implementations, the second position 124 may correspond to a V-tail arrangement. In still other implementations, the first position 122 and the second position 124 may both correspond to V-tail configurations with different angles between the airfoils 104A and 104B.

Figure 3A:
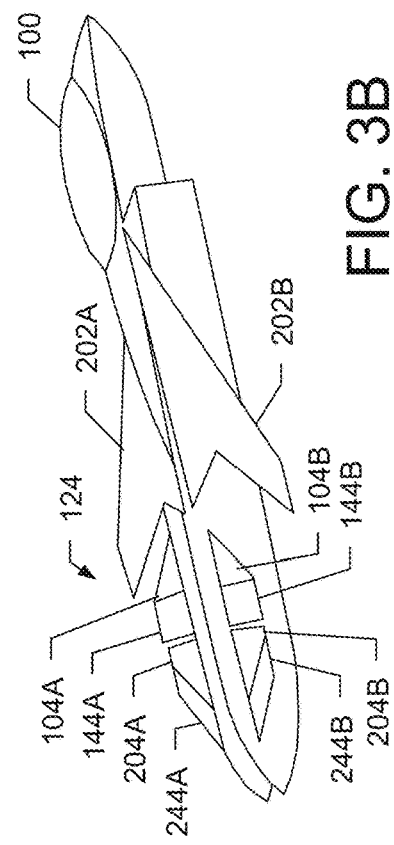
FIG. 3A is a diagram that illustrates a second example of the aircraft of FIG. 1 with the movable airfoils in a first position.
Figure 3B:
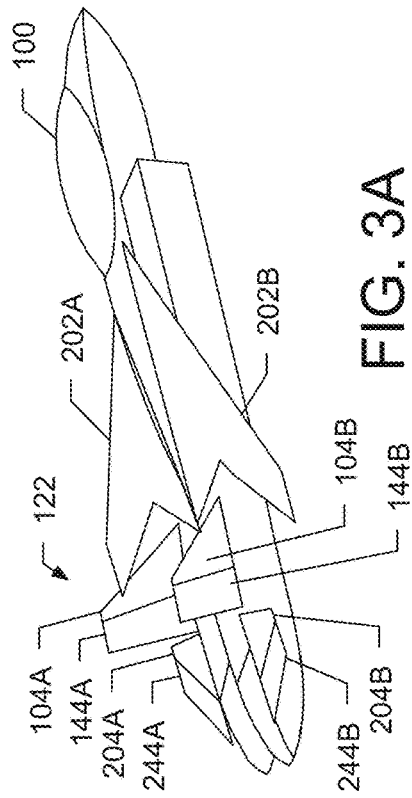
FIG. 3B is a diagram that illustrates the second example of the aircraft of FIG. 1 with the movable airfoils in a second position.

FIG. 3A is a diagram that illustrates a second example of the aircraft 100 of FIG. 1 with the movable airfoils 104 including the port-side airfoil 104A and the starboard-side airfoil 104B in a first position 122, and FIG. 3B is a diagram that illustrates the second example of the aircraft 100 of FIG. 3A with the movable airfoils 104 in a second position 124. In the second example of FIGS. 3A and 3B, the aircraft 100 also includes one or more pairs of fixed position airfoils, including the port-side wing 202A and the starboard-side wing 202B and a port-side stabilizer 204A and a starboard-side stabilizer 204B.

In the second example of FIGS. 3A and 3B, the movable airfoils 104 are in a V-tail arrangement in the first position 122 (as shown in FIG. 3A) and are in a horizontal stabilizer arrangement in the second position 124 (as shown in FIG. 3B). In the second example, the stabilizers 204 are stationary or are movable independently of the movable airfoils 104. To illustrate, the stabilizers 204 may remain in a horizontal stabilizer position while the movable airfoils 104 move between the first position 122 and the second position 124.

In the second example illustrated in FIGS. 3A and 3B, each of the movable airfoils 104 includes a respective control surface 144 including the port-side control surface 144A and the starboard-side control surface 144B. Likewise, in FIGS. 3A and 3B, each of the stabilizers 204 includes a respective control surface, such as a port-side control surface 244A and a starboard-side control surface 244B. In some implementations, the control surfaces 244 coupled to the stabilizers 204 are omitted, and the control surfaces 144 coupled to the movable airfoils 104 are retained. In other implementations, the control surfaces 144 coupled to the movable airfoils 104 are omitted, and the control surfaces 244 coupled to the stabilizers 204 are retained.

Although FIG. 3A illustrates the movable airfoils 104 in a V-tail arrangement in the first position 122, in other implementations, the movable airfoils 104 are in twin vertical stabilizer arrangement in the first position 122. Further, although FIGS. 3A and 3B illustrate the stabilizers 204 arranged as horizontal stabilizers, in other implementations, the stabilizers 204 are arranged in a V-tail arrangement or a twin vertical stabilizer arrangement. Further, although FIGS. 3A and 3B illustrate the stabilizers 204 trailing the movable airfoils 104, in other implementations, the stabilizers 204 may lead the movable airfoils 104. As one example, the stabilizers 204 may be positioned forward of the wings 202 to act as canards.

As in the first example, in the first position 122, the movable airfoils 104 facilitate yaw stabilization, yaw control, or both, and may also (e.g., in a V-tail arrangement) provide some pitch stabilization, pitch control, or both. In the second position 124, the movable airfoils 104 facilitate pitch stabilization, pitch control, or both. Additional stabilization or control may be provided using thrust vectoring, asymmetric control surface positioning, etc.

Figure 4A:
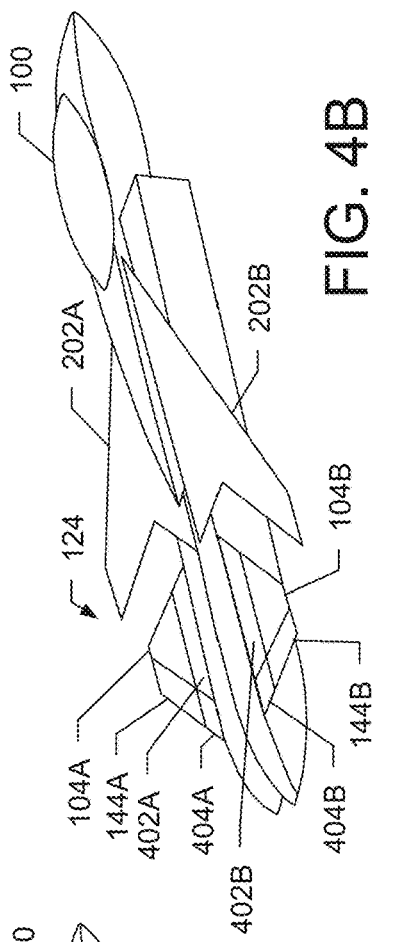
FIG. 4A is a diagram that illustrates a third example of the aircraft of FIG. 1 with the movable airfoils in a first position.
Figure 4B:
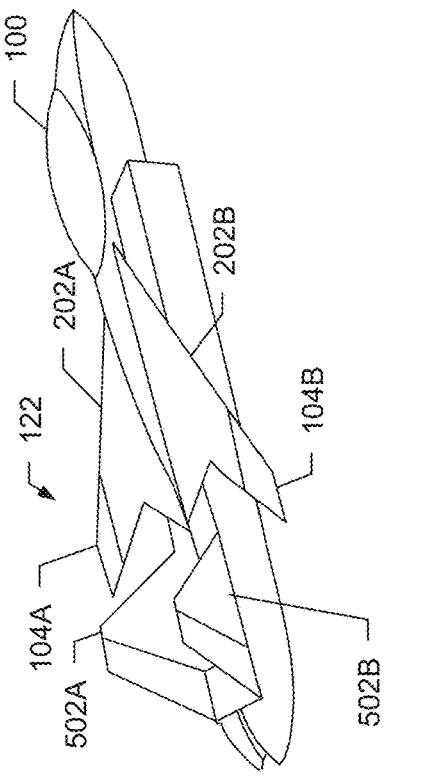
FIG. 4B is a diagram that illustrates the third example of the aircraft of FIG. 1 with the movable airfoils in a second position.

FIG. 4A is a diagram that illustrates a third example of the aircraft 100 of FIG. 1 with the movable airfoils (e.g., a port-side airfoil 104A and a starboard-side airfoil 104B) in a first position 122, and FIG. 4B is a diagram that illustrates the third example of the aircraft 100 of FIG. 4A with the movable airfoils 104 in a second position 124. In the third example of FIGS. 4A and 4B, the aircraft 100 also includes the port-side wing 202A and the starboard-side wing 202B. In the third example of FIGS. 4A and 4B, the movable airfoils 104 are coupled to fixed position airfoils. For example, the port-side airfoil 104A is coupled to an outboard portion of a port-side horizontal stabilizer 402A, and the starboard-side airfoil 104B is coupled to an outboard portion of a starboard-side horizontal stabilizer 402B.

In the third example of FIGS. 4A and 4B, the movable airfoils 104 extend upward from the horizontal stabilizers 402 (e.g., in a V or goalpost arrangement) in the first position 122 (as shown in FIG. 4A) and are substantially aligned with the horizontal stabilizers 402 in the second position 124 (as shown in FIG. 4B). The first position 122 of FIG. 4A provides better maneuverability and yaw stability than the second position 124 of FIG. 4B. However, the first position 122 causes the aircraft 100 to have a larger radar cross-section than the second position 124. Thus, particular position used may depend on the mission or operations that the aircraft 100 is performing. Additionally, the position of the movable airfoils 104 can be changed in flight, such as to transition from a stealth portion of a mission to a high-maneuverability portion of the mission.

In the third example illustrated in FIGS. 4A and 4B, the horizontal stabilizers 402 include elevators 404, such as a port-side elevator 404A and a starboard-side elevator 404B. Additionally, in the third example, each of the movable airfoils 104 includes a respective control surface 144, such as a port-side control surface 144A and a starboard-side control surface 144B. In the first position 122, the control surfaces 144 operate as rudders (in a goalpost arrangement) or ruddervators (in a V arrangement) to provide yaw control or yaw and pitch control. In the second position 124, the control surfaces 144 operate as elevators to provide pitch control. When the movable airfoils 104 are in the second position 124, yaw control may be provided by selective positioning of control surfaces on opposites sides of the aircraft 100, by thrust vectoring, or using other techniques. For example, when the pilot provides a yaw control input, the flight control computer 132 of FIG. 1 may generate a thrust vectoring command to effectuate the yaw control input.

Although FIG. 4A illustrates the movable airfoils 104 aligned with the horizontal stabilizers 402 in the second position 124, in other implementations, the movable airfoils 104 may be positioned in a V-tail arrangement in the second position 124. For example, the movable airfoils 104 may be substantially vertical (e.g., each forming approximately a 90-degree angle relative to a respective horizontal stabilizer 402) in the first position 122 to form the goalpost arrangement and may extend upward from the horizontal stabilizers (e.g., each forming an angle between 90 and 180 degrees relative to a respective horizontal stabilizer 402) to form the V-tail arrangement in the second position 124. In still other implementations, the first position 122 and the second position 124 may both correspond to V-tail configurations with different angles between the movable airfoils 104A and 104B.

Figure 5A:
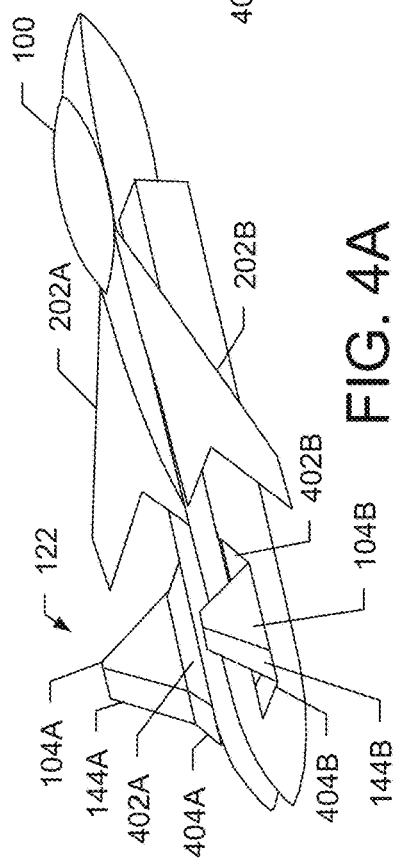
FIG. 5A is a diagram that illustrates a fourth example of the aircraft of FIG. 1 with the movable airfoils in a first position.
Figure 5B:
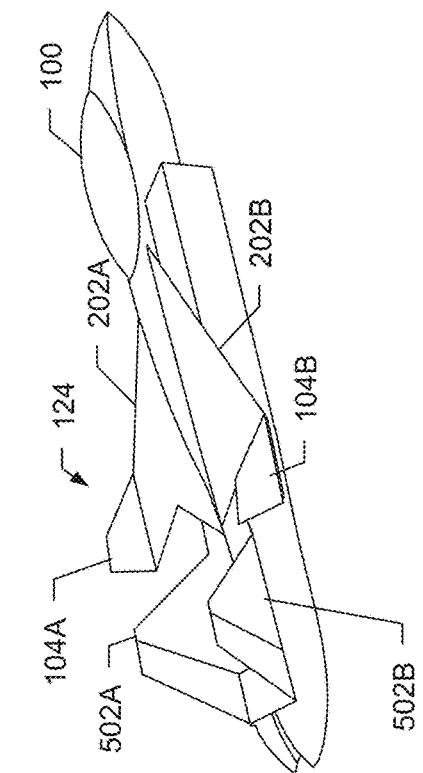
FIG. 5B is a diagram that illustrates the fourth example of the aircraft of FIG. 1 with the movable airfoils in a second position.

FIG. 5A is a diagram that illustrates a fourth example of the aircraft 100 of FIG. 1 with the movable airfoils 104, including the port-side airfoil 104A and the starboard-side airfoil 104B, in the first position 122. FIG. 5B is a diagram that illustrates the fourth example of the aircraft 100 of FIG. 5A with the movable airfoils 104 in the second position 124. In the fourth example of FIGS. 5A and 5B, the aircraft 100 also includes one or more pairs of fixed position airfoils, such as the port-side wing 202A and a starboard-side wing 202B, a port-side stabilizer 502A, and a starboard-side stabilizer 502B.

In the fourth example of FIGS. 5A and 5B, the movable airfoils 104 are coupled to the wings 202 and act as variable position wing tips. In the first position 122, each of the movable airfoils 104 is upturned to act as a winglet for the respective wing 202. In the second position 124, each of the movable airfoils 104 is substantially aligned with a respective wing 202 (e.g., is an extension of the wing 202). In the first position 122 (illustrated in FIG. 5A), the movable airfoils 104 act as winglets that decrease drag and therefore increase efficiency. However, the winglets also increase the radar cross section of the aircraft 100 relative to the second position 124. Thus, the particular position used may depend on the mission or operations that the aircraft 100 is performing. Additionally, the position of the movable airfoils 104 can be changed in flight, such as to transition from a long-range cruise portion of a mission to a stealth portion of the mission.

Although FIG. 5A illustrates two stabilizers 502 in a V-tail arrangement, in other implementations, the aircraft 100 may include a different tail configuration, such as a single vertical stabilizer and a pair of horizontal stabilizers. Further, in some implementations, a tail assembly of the aircraft 100 can include or correspond to any of the arrangements illustrated in FIGS. 2A-4B. For example, in additional to movable airfoils 104 coupled to the wings 202, as illustrated in FIGS. 5A and 5B, the aircraft 100 may include the movable airfoils 104 illustrated in FIGS. 2A and 2B, the movable airfoils 104 illustrated in FIGS. 3A and 3B, or the movable airfoils 104 illustrated in FIGS. 4A and 4B.

Figure 6B:
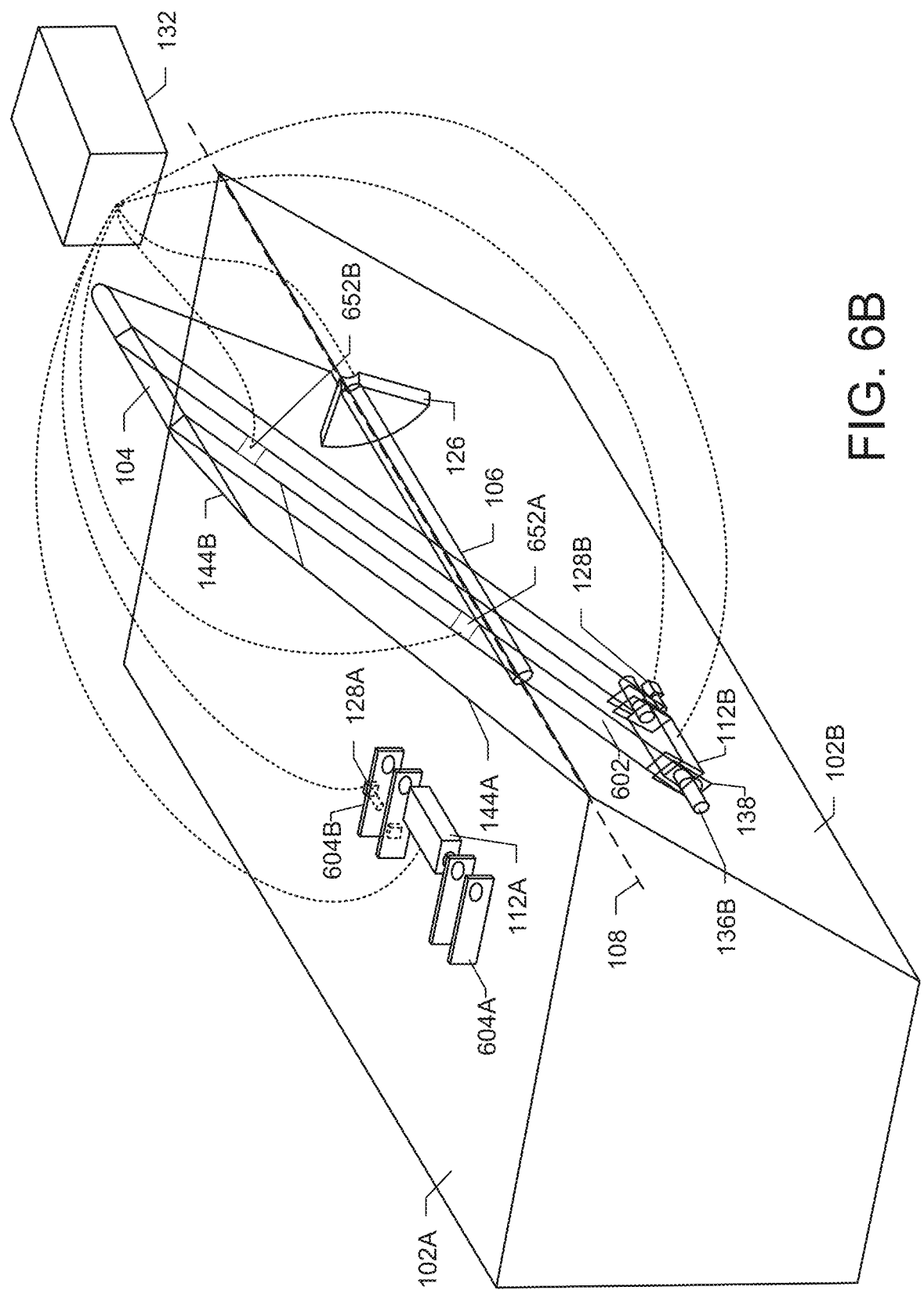
FIG. 6B is a diagram that schematically illustrates the first example of the movable airfoil of FIG. 6A disposed in a first position.
Figure 6C:
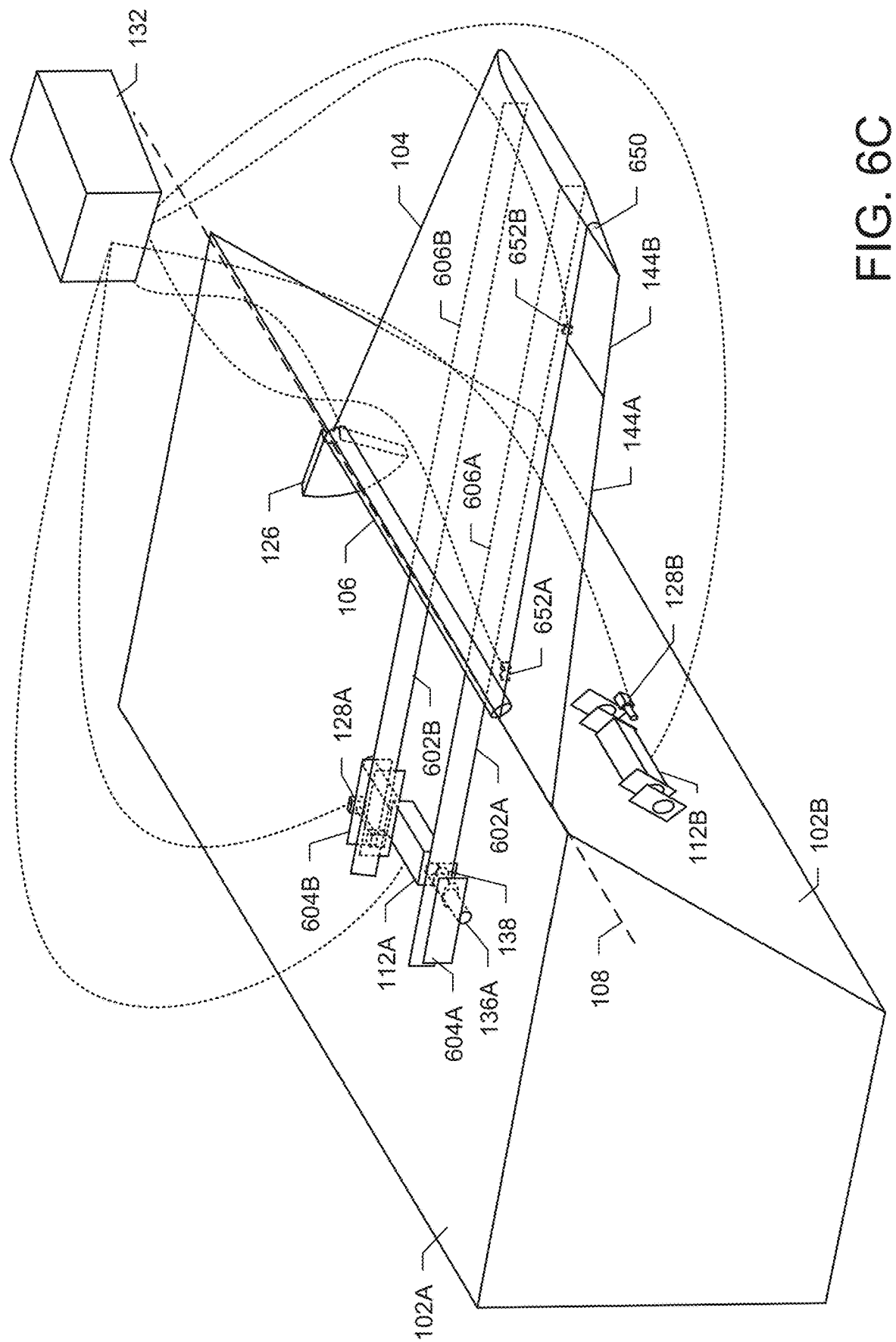
FIG. 6C is a diagram that schematically illustrates the first example of the movable airfoil of FIG. 6A disposed in a second position.

FIGS. 6A, 6B, and 6C schematically illustrate operation of a first example of a movable airfoil 104 of the aircraft of FIG. 1 according to particular aspects. The first example of the movable airfoil 104 illustrated in FIGS. 6A-6C may correspond to any of the movable airfoils described with reference to FIGS. 1-5B. FIG. 6A illustrates a view along the rotational axis 108 (shown in FIG. 6B) and shows the movable airfoil 104 in the first position 122 and the second position 124 to illustrate a range of motion of the movable airfoil 104 in the first example. FIG. 6B illustrates a perspective view of the first example of FIG. 6A with the movable airfoil 104 in the first position 122, and FIG. 6C illustrates a perspective view of the first example of FIG. 6A with the movable airfoil 104 in the second position 124.

In FIGS. 6A-6C, the movable airfoil 104 is coupled, via the hinge member(s) 106, to structure(s) 102 (e.g., a first structure 102A and a second structure 102B) of the aircraft 100. The structure(s) 102 may include fuselage components (e.g., bulkheads), wing box components (e.g., ribs or stringers), etc. In some implementations, the first structure 102A and a second structure 102B are portions, features, or sides of a larger structure or assembly, such as a wing, tail assembly, etc.

In the first example of FIGS. 6A-6C, the movable airfoil 104 is coupled to or includes one or more structural members 602 in a cantilevered arrangement about the rotational axis 108. For example, the structural member(s) 602 may include portions of spars 606 (shown in FIG. 6C) that extend along at least a portion of the movable airfoil 104, across the rotational axis 108, and into a portion of the aircraft 100 that includes components of the indexing mechanism 110. In some implementations, the movable airfoil 104 is coupled to or includes more than one such structural member, such as a first structural member 602A and a second structural member 602B, as illustrated in FIGS. 6B and 6C. As illustrated in FIGS. 6A and 6B, when the movable airfoil 104 is in the first position 122, the structural member(s) 602 are disposed proximate the second structure 102B, and as illustrated in FIGS. 6A and 6C, when the movable airfoil 104 is in the second position 124, the structural member(s) 602 are disposed proximate the first structure 102A.

In the first example, the structural member(s) 602 include the second fastener 138 (as shown in FIGS. 6B and 6C) and instances of the first fastener 136 are coupled to each of the first structure 102A and the second structure 102B. Thus, when the movable airfoil 104 is in the first position 122, the first fastener(s) 136A can engage the second fastener(s) 138, and when the movable airfoil 104 is in the second position 124, the first fastener(s) 136B can engage the second fastener(s) 138. In the first example, the first fastener(s) 136 move along a direction that is substantially parallel or antiparallel to the rotational axis 108 to engage/disengage from the second fastener(s) 138. In some implementations, first ends of the first fastener(s) 136 are beveled, contoured, or pointed to facilitate aligned engagement of the first fastener(s) 136 and the second fastener(s) 138.

In the first example of FIGS. 6A-6C, each of the first fastener(s) 136 is associated with a respective actuator 112. To illustrate, as shown in FIGS. 6B and 6C, the first fastener(s) 136A are associated with (e.g., movable by) a first actuator 112A, and the first fastener(s) 136B are associated with (e.g., movable by) a second actuator 112B. The actuator 112A is configured to selectively change a state of the indexing mechanism 110 between the first state 114 (of FIG. 1) in which the first fastener(s) 136A engage the second fastener(s) 138 and the second state 116 (of FIG. 1) in which the first fastener(s) 136A are disengaged from the second fastener(s) 138. Likewise, the actuator 112B is configured to selectively change a state of the indexing mechanism 110 between the first state 114 (of FIG. 1) in which the first fastener(s) 136B engage the second fastener(s) 138 and the second state 116 (of FIG. 1) in which the first fastener(s) 136B are disengaged from the second fastener(s) 138.

In the first example of FIGS. 6A-6C, the position sensor(s) 126 are coupled to the moveable airfoil 104 and/or to one or more of the structural member(s) 602. The position sensor(s) 126 are also communicatively coupled to the flight control computer 132 and configured to send position data indicating an indexed position of the movable airfoil 104 about the rotational axis 108 to the flight control computer 132. For example, the position data may indicate that the movable airfoil 104 is in the first position 122 (as illustrated in FIG. 6B), is in the second position 124 (as illustrated in FIG. 6C) or is angularly offset from the first position 122 and the second position 124 (e.g., is between indexed positions).

In the first example of FIGS. 6A-6C, the state sensor(s) 128 are also communicatively coupled to the flight control computer 132. Each of the state sensor(s) 128 is configured to generate state data indicating whether a respective portion of the indexing mechanism 110 is in the first state or the second state. To illustrate, in FIGS. 6A-6C, each indexed position is associated with a set of guides 604, one of the actuator(s) 112, and a state sensor 128. A state sensor 128 at a particular indexed position generates state data indicating whether the first fastener(s) 136 associated with the particular indexed position are engaged with the second fastener(s) 138, whether the actuator(s) 112 associated with a particular indexed position are actuated (e.g., extended) or unactuated (e.g., retracted), etc. For example, in FIG. 6B, the actuator 112B is actuated to cause the first fastener(s) 136B to engage the second fastener(s) 138, and the state sensor 128B generates state data indicating the first state 114 of FIG. 1. In contrast, the actuator 112A is unactuated, the first fastener(s) 136A are not engaged with the second fastener(s) 138, and the state sensor 128A generates state data indicating the second state 116 of FIG. 1.

In some implementations, the first example of FIGS. 6A-6C also includes alignment sensors 130. In such implementations, the alignment sensors 130 are configured to generate alignment data indicating whether the first fastener(s) 136 are aligned with the second fastener(s) 138. For example, as the airfoil 104 moves toward the second position 124, the structural member(s) 602 approach the guides 604, and the alignment sensor(s) 130 detect when the structural members 602 are far enough between the guides 604 for the first fastener(s) 136A to engage the second fastener(s) 138.

In some implementations, the movable airfoil 104 includes one or more control surface(s), such as a control surface 144A and a control surface 144B (as illustrated in FIGS. 6B and 6C). In some such implementations, the position of the control surface(s) 144 relative to an ambient airflow can be adjusted (e.g., by the flight control computer 132) to control the aerodynamic forces 146 applied to the movable airfoil 104. For example, the flight control computer 132 can control the position of the control surface 144A, the control surface 144B, or both, to control aerodynamic forces 146 applied to the movable airfoil 104 to urge the movable airfoil 104 between the first position 122 and the second position 124. In such implementations, the movable airfoil 104 may not be coupled to a positioning actuator that is configured to move the movable airfoil 104 between the positions 120. Alternatively, the movable airfoil 104 may be coupled to a positioning actuator and the aerodynamic forces 146 may supplement force applied by the positioning actuator.

In FIGS. 6B and 6C, the control surface 144A is coupled to and rotatable about an axis 650 by a control surface actuator 652A, and the control surface 144B is coupled to and rotatable about the axis 650 by a control surface actuator 652B. In some implementations, when more than one control surface 144 is coupled to the movable airfoil 104, one of the control surfaces, such as the control surface 144A, may be configured to provide coarse positioning of the movable airfoil 104 and another of the control surface, such as the control surface 144B, may be configured to provide fine positioning of the movable airfoil 104. To illustrate, a control surface 144 configured to provide coarse positioning may be larger than, have a wider range of motion than, or be positioned more outboard than, a control surface 144 configured to provide fine positioning.

FIGS. 7A, 7B, and 7C schematically illustrate operation of a second example of a movable airfoil 104 of the aircraft of FIG. 1 according to particular aspects. The second example of the movable airfoil 104 illustrated in FIGS. 7A-7C may correspond to any of the movable airfoils described with reference to FIGS. 1-5B. FIG. 7A illustrates a perspective view of the second example with the movable airfoil 104 in the second position 124. FIG. 7B and FIG. 7C illustrate details of operation of components 702 of a portion of the indexing mechanisms 110 of the second example.

While FIGS. 7B and 7C illustrate only one instance of the components 702 of the indexing mechanism 110, as illustrated in FIG. 7A, the second example of FIGS. 7A-7C includes more than one instance of the components 702.

In FIGS. 7A-7C, the movable airfoil 104 is coupled, via the hinge member(s) 106, to structure(s) 102 (e.g., a first structure 102A and a second structure 102B) of the aircraft 100. Further, in the second example of FIGS. 7A-7C, the movable airfoil 104 is coupled to or includes one or more structural members 602 in a cantilevered arrangement about the rotational axis 108. For example, the structural member(s) 602 may include portions of spars 606 that extend along at least a portion of the movable airfoil 104, across the rotational axis 108, and into a portion of the aircraft 100 that includes components of the indexing mechanism 110. In the second example of FIGS. 7A-7C, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

In the second example, the structural member(s) 602 include the second fastener 138 (as shown in FIGS. 7B and 7C) and instances of the first fastener 136 are coupled to each of the first structure 102A and the second structure 102B. FIGS. 7B and 7C illustrate details of operation of each of the first fasteners 136 of the second example. In FIG. 7B, the actuator 112 has retracted the first fastener 136 to allow the structural member(s) 602 move between the guides 604. Likewise, a second actuator 706 has retracted an alignment mechanism 708 to allow the structural member(s) 602 move between the guides 604. In the second example of FIGS. 7A-7C, the alignment mechanism 708 includes a curved, beveled, or angled surface 704 disposed between walls 720, each of which includes a respective opening 722. The curved, beveled, or angled surface 704 is configured to facilitate alignment of the first fastener 136 and the second fastener. After the structural member 602 is sufficiently between the guides 604, the second actuator 706 extends a rod 710 to push the surface 704 into contact with an end of the structural member 602. Continued extension of the rod 710 causes (or facilitates) movement of the structural member 602 toward an indexed portion (e.g., the first position 122 or the second position 124) associated with the portion of the indexing mechanisms 110.

In the second example, when the structural member 602 is at an indexed position, the openings 722, the openings 724 and an opening in the structural member 602 (corresponding to the second fastener 138) are aligned, and the actuator 112 can be actuated to cause the first fastener 136 to engage the second fastener 138. In some implementation, the second actuator 706 may retract the rod 710 and the alignment mechanism 708 after the first fastener 136 engages the second fastener 138. Alternatively, the second actuator 706 may leave the rod 710 extended such that the alignment mechanism 708 provides a secondary lock to retain the airfoil 104 at the indexed position.

In the second example, the rod 710 moves along a direction that is substantially perpendicular to the rotational axis 108 to facilitate alignment of the first and second fasteners 136, 138. In the second example, the first fastener(s) 136 moves along a direction that is substantially parallel or antiparallel to the rotational axis 108 to engage/disengage from the second fastener(s) 138. In some implementations, first ends of the first fastener(s) 136 are beveled, contoured, or pointed to facilitate aligned engagement of the first fastener(s) 136 and the second fastener(s) 138.

The position sensor(s) 126, the state sensor(s) 128, the alignment sensor(s) 130, the flight control computer 132, and the control surface 144 are not illustrated in FIGS. 7A-7C; however, the position sensor(s) 126, the state sensor(s) 128, the alignment sensor(s) 130, the flight control computer 132, the control surface 144, or any combination thereof, may be present in an aircraft 100 according to the second example of FIGS. 7A-7C. If present, the position sensor(s) 126, the state sensor(s) 128, the alignment sensor(s) 130, the flight control computer 132 and/or the control surface 144 operate as described with reference to FIGS. 1 and 6A-6C.

Figure 8A:
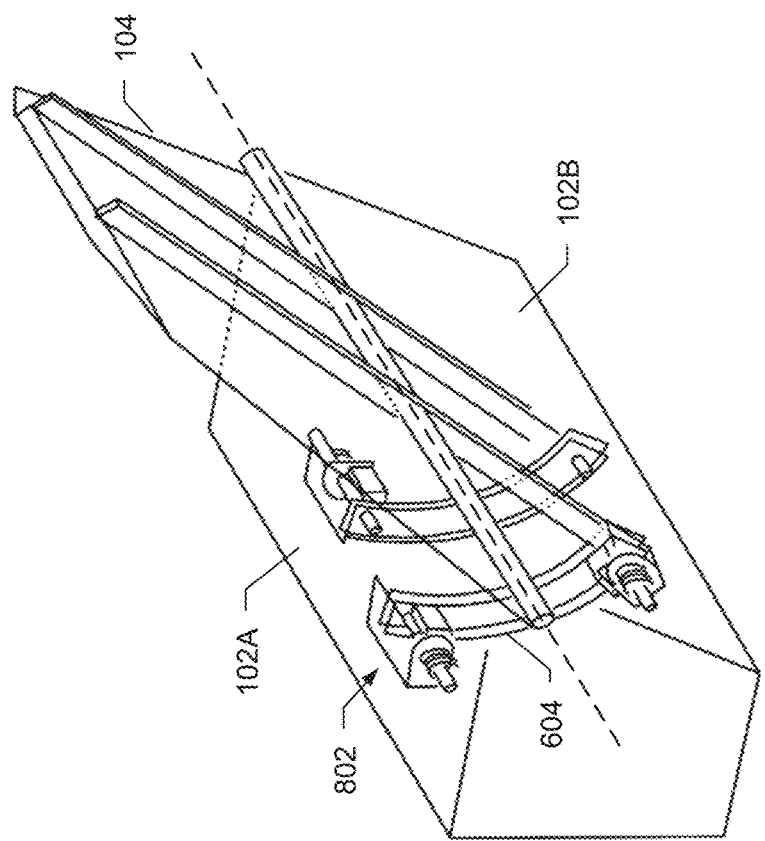
FIG. 8A is a diagram that schematically illustrates a third example of the movable airfoil of the aircraft of FIG. 1 according to particular aspects.
Figure 8B:
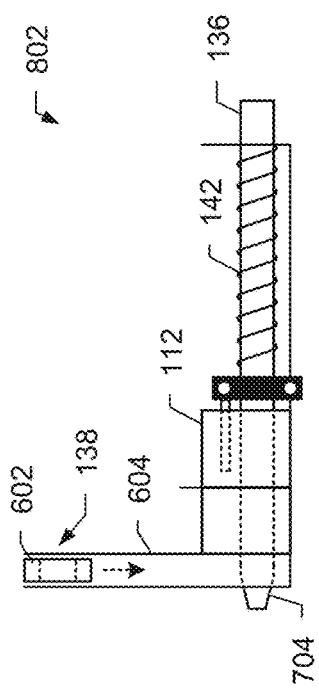
FIGS. 8B, 8C, and 8D are diagrams that together schematically illustrate aspects of operation of the third example of the movable airfoil of FIG. 8A.
Figure 8C:
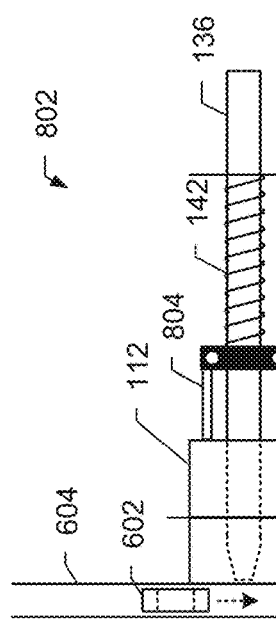
Figure 8D:
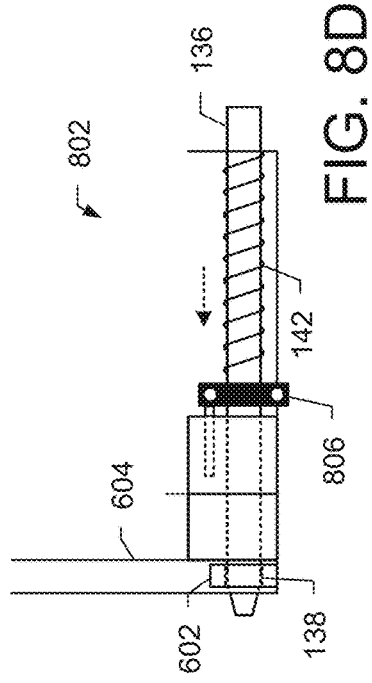

FIGS. 8A, 8B, 8C, and 8D schematically illustrate operation of a third example of a movable airfoil 104 of the aircraft of FIG. 1 according to particular aspects. The third example of the movable airfoil 104 illustrated in FIGS. 8A-8D may correspond to any of the movable airfoils described with reference to FIGS. 1-5B. FIG. 8A illustrates a perspective view of the third example with the movable airfoil 104 in the first position 122. FIGS. 8B-8D illustrate details of operation of components 802 of a portion of the indexing mechanisms 110 of the third example. While 8B-8D illustrate only one instance of the components 802 of the indexing mechanism 110, as illustrated in FIG. 8A, the third example of FIGS. 8A-8D includes more than one instance of the components 802.

In FIGS. 8A-8D, the movable airfoil 104 is coupled, via the hinge member(s) 106, to structure(s) 102 (e.g., a first structure 102A and a second structure 102B) of the aircraft 100. Further, in the third example of FIGS. 8A-8D, the movable airfoil 104 is coupled to or includes one or more structural members 602 in a cantilevered arrangement about the rotational axis 108. In the third example, the structural member(s) 602 are disposed between guides 604 that extent between the first structure 102A and the second structure 102B. In the third example of FIGS. 8A-8D, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

In the third example, the structural member(s) 602 include the second fastener 138 (as shown in FIGS. 8B-8D) and instances of the first fastener 136 are coupled to each of the first structure 102A and the second structure 102B. FIGS. 8B-8D illustrate details of operation of each of the first fasteners 136 of the third example. In FIG. 8B, the movable airfoil 104 is transitioning between indexed positions, and is approaching an indexed position associated with the components 802 of the indexing mechanism 110. In FIG. 8C, the actuator 112 has extended a rod 804. The rod 804 is coupled to a ring 806, which is coupled to the first fastener 136. Extending the rod 804 causes the first fastener to retract from an area between the guides 604 and stores energy in a biasing member 142 (e.g., compresses a spring). Retracting the first fastener 136 from between the guides 604 allows the structural member 602 to move to a position in which the first fastener 136 and the second fastener 138 are aligned. In the third example, the rod 710 and the first fastener 136 move along a direction that is substantially parallel or antiparallel to the rotational axis 108 to engage/disengage from the second fastener(s) 138.

When the first fastener 136 and the second fastener 138 are aligned or approximately aligned, the actuator 112 disengages, and the biasing member 142 pushes the first fastener 136 into engagement with the second fastener 138 (as illustrated in FIG. 8D). In the third example illustrated in FIGS. 8A-8D, a first end of the first fastener 136 includes a curved, beveled, or angled surface 704 to facilitate alignment of the first fastener 136 and the second fastener 138. Subsequently, to move the movable airfoil 104 to a different indexed position, the actuator 112 extends the rod 804 to retract the first fastener 136 from the second fastener 138 to free the structural member 602 to move between the guides 604 to the other indexed position.

The position sensor(s) 126, the state sensor(s) 128, the alignment sensor(s) 130, the flight control computer 132, and the control surface 144 are not illustrated in FIGS. 8A-8D; however, the position sensor(s) 126, the state sensor(s) 128, the alignment sensor(s) 130, the flight control computer 132, the control surface 144, or any combination thereof, may be present in an aircraft 100 according to the third example of FIGS. 8A-8D. If present, the position sensor(s) 126, the state sensor(s) 128, the alignment sensor(s) 130, the flight control computer 132 and/or the control surface 144 operate as described with reference to FIGS. 1 and 6A-6C.

FIGS. 9A, 9B, 9C, 9D, and 9E schematically illustrate operation of a fourth example of a movable airfoil 104 of the aircraft of FIG. 1 according to particular aspects. The fourth example of the movable airfoil 104 illustrated in FIGS. 9A-9E may correspond to any of the movable airfoils described with reference to FIGS. 1-5B. FIG. 9A illustrates a view of the fourth example along the rotational axis and shows the movable airfoil 104 in a plurality of indexed positions, including the first position 122, the second position 124, a first intermediate position 922, and a second intermediate position 924. FIG. 9B illustrates a perspective view of components 902 of a portion of the indexing mechanism 110 in the according to the fourth example. FIGS. 9C-9E illustrate details of operation of the components 902 of the portion of the indexing mechanisms 110 of the fourth example. While 9A-9E illustrate four indexed positions, in other implementations, the fourth example of FIGS. 9A-9E includes more than four or fewer than four indexed positions. The position sensor 126 may be configured to generate position data distinguishing between the indexed positions.

In FIGS. 9A-9E, the movable airfoil 104 is coupled, via the hinge member(s) 106, to structure(s) 102 (e.g., a first structure 102A and a second structure 102B) of the aircraft 100. Further, in the fourth example of FIGS. 9A-9E, the movable airfoil 104 is coupled to or includes one or more structural members 602 in a cantilevered arrangement about the rotational axis 108. In the fourth example, a rail 904 is disposed between the structural member(s) 602, and the rail 904 extends between the first structure 102A and the second structure 102B. The rail 904 includes a plurality of openings which correspond to second fastener(s) 138. Additionally, the bumps 906 are coupled to the rail 904. The bumps 906 are arranges such that curved surfaces 908 of the bumps 906 form valleys proximate the second fastener(s) 138. To illustrate, in FIG. 9C-9E, a particular second fastener 138 is disposed between two bumps 906A, 906B such that the opening of the second fastener 138 is approximately centered between curved surfaces 908 of the bumps 906.

As illustrated in FIG. 9B, an actuator 112 is coupled to one of the structural member 602. The actuator 112 is also coupled to the first fastener 136 and is configured to extend and/or retract the first fastener 136. To illustrate, the first fastener 136 is configured to move along a direction that is substantially parallel to the rotational axis 108 to transition between the first and second states 114, 116. The first fastener 136, when retracted, may partially extend through an opening 914B in the second structural member 602B, as illustrated in FIG. 9C. In a particular implementation, a roller 910 is coupled to or includes on an end of the first fastener 136. The actuator 112 or a biasing member 142 (e.g., a spring internal to the actuator 112) may urge the roller 910 into contact with the curved surface 908 of one of the bumps 906. Due to the curvature of the curved surface 908, the force applied (either by the actuator 112 or the biasing member 142) to the roller 910 generates a component of force that urges the movable airfoil 104 to rotate to align the first and second fasteners 136, 138. To illustrate, in FIGS. 9C and 9D, a downward force 916 on the first fastener 136 generates a component of force 918 that urges the structural members 602 to move in a direction that tends to align the first fastener 136 and the second fastener 138.

When the first and second fasteners 136, 138 are aligned, the force 916 causes the first fastener 136 to extend through the second fastener 138 and, in some implementations, through an opening 914A in the structural member 602A. This arrangement corresponds to the first state 114 of the indexing mechanism 110 in the fourth example of FIGS. 9A-9E. The indexing mechanism 110 in the fourth example of FIGS. 9A-9E can transition to the second state 116 by actuation of the actuator 112 to retract the first fastener 136 back to the position illustrated in FIG. 9C.

The state sensor(s) 128, the alignment sensor(s) 130, the flight control computer 132, and the control surface 144 are not illustrated in FIGS. 9A-9E; however, the state sensor(s) 128, the alignment sensor(s) 130, the flight control computer 132, the control surface 144, or any combination thereof, may be present in an aircraft 100 according to the fourth example of FIGS. 9A-9E. If present, the state sensor(s) 128, the alignment sensor(s) 130, the flight control computer 132 and/or the control surface 144 operate as described with reference to FIGS. 1 and 6A-6C.

Figure 10A:
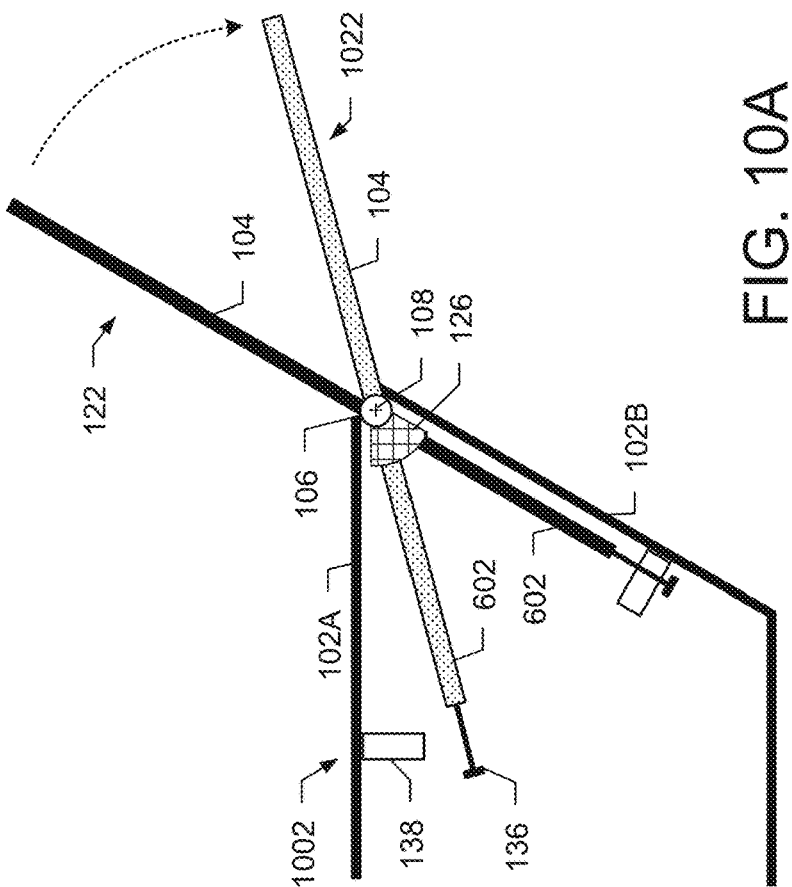
FIG. 10A is a diagram that schematically illustrates a fifth example of the movable airfoil of the aircraft of FIG. 1 according to particular aspects.
Figure 10B:
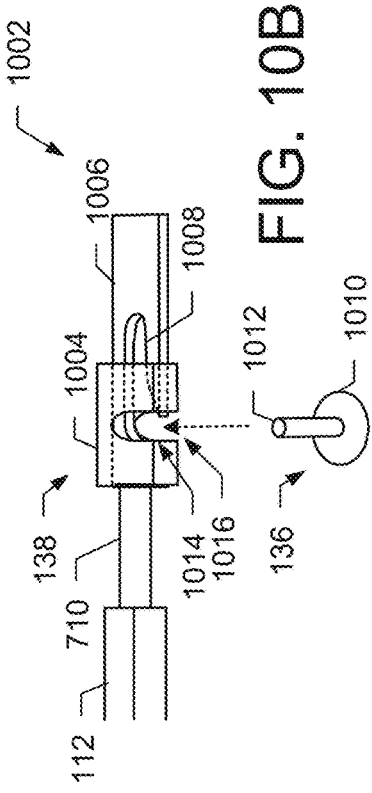
FIGS. 10B, 10C, and 10D are diagrams that together schematically illustrate aspects of operation of the fifth example of the movable airfoil of FIG. 10A.
Figure 10C:
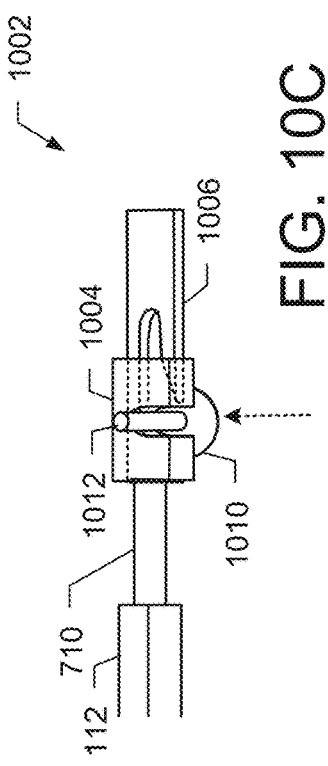
Figure 10D:
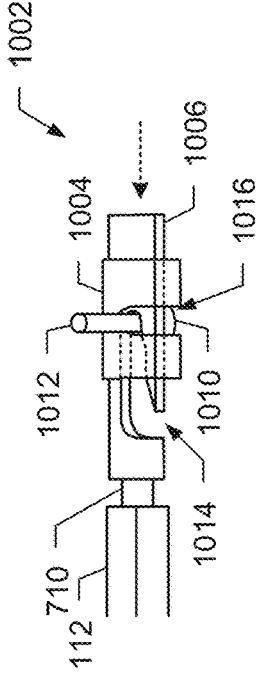

FIGS. 10A, 10B, 10C, and 10D schematically illustrate operation of a fifth example of a movable airfoil 104 of the aircraft of FIG. 1 according to particular aspects. The fifth example of the movable airfoil 104 illustrated in FIGS. 10A-10D may correspond to any of the movable airfoils described with reference to FIGS. 1-5B. FIG. 10A illustrates a view of the fifth example along the rotational axis 108 and shows the movable airfoil 104 in the first position 122 and in an intermediate position 1022 between the first position 122 and the second position 124 (not shown in FIGS. 10A-10D). FIGS. 10B-10D illustrate details of operation of components 1002 of a portion of the indexing mechanisms 110 of the fifth example. While FIGS. 10B-10D illustrate only one instance of the components 1002 of the indexing mechanism 110, as illustrated in FIG. 10A, the fifth example of FIGS. 10A-10C includes more than one instance of the components 1002.

In FIGS. 10A-10D, the movable airfoil 104 is coupled, via the hinge member(s) 106, to structure(s) 102 (e.g., a first structure 102A and a second structure 102B) of the aircraft 100. Further, in the fifth example of FIGS. 10A-10D, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes components of the indexing mechanism 110. In the fifth example of FIGS. 10A-10D, when the movable airfoil 104 is in the first position 122, the structural member(s) 602 are disposed proximate the second structure 102B, and when the movable airfoil 104 is in the second position 124 (not shown in FIGS. 10A-10D), the structural member(s) 602 are disposed proximate the first structure 102A.

In the fifth example, the structural member(s) 602 include the first fastener(s) 136 and instances of the second fasteners 138 are coupled to each of the first structure 102A and the second structure 102B. In the implementation illustrated in FIGS. 10A-10D, the first fastener(s) 136 include a rod 1012 and a cap 1010, where the cap 1010 has a larger characteristic dimension (e.g., width or diameter) than the rod 1012. In some implementations, the cap 1010 is omitted.

In the fifth example, each of the second fasteners 138 is coupled, via a rod 710, to a respective actuator 112. The rod 710 is coupled to a hook 1006 that defines a curved or angled surface 1008 and an opening 1014. The hook 1006 is disposed within and movable with respect to a bracket 1004 that also defines an opening 1016. When the indexing mechanism 110 is in the second state 116, the opening 1014 of the hook 1006 is exposed (e.g., open) within the opening 1016 of the bracket 1004, as illustrated in FIG. 10B. Put another way, the openings 1014 and 1016 are aligned. In contrast, when the indexing mechanism 110 is in the first state 114, the openings 1014 and 1016 are not aligned and the opening 1014 is blocked by a portion of the bracket 1004, as illustrated in FIG. 10D.

FIGS. 10B, 10C and 10D illustrate details of operation of the fifth example. In FIG. 10B, the rod 710 coupled to the actuator 112 is extended to align the opening 1014 of the hook 1006 with the opening 1016 of the bracket 1004 such that the rod 1012 of the first fastener 136 is able to move into the openings 1014, 1016, as illustrated in FIG. 10C. After the rod 1012 is disposed within the openings 1014, 1016, the actuator 112 retracts the rod 710 to slide the hook 1006 relative to the bracket 1004. Walls of the opening 1016 and the surface 1008 of the hook 1006 guide the rod 1012 deeper into the hook 1006 until the opening 1014 of the hook 1006 is sufficiently misaligned with the opening 1016 that the rod 1012 is not able to move back out of the hook 1006 (e.g., back to the position illustrated in FIG. 10B). The position in which the rod 1012 is retained by the hook 1006 and the openings 1014, 1016 are misaligned corresponds to the second state 116 of FIG. 1.

To transition from the second state, illustrated in FIG. 10D to the first state, illustrated in FIGS. 10C and 10B, the actuator 112 extends the rod 710 so that the hook 1006 moves relative to the bracket 1004 until the openings 1014, 1016 are sufficiently aligned for the rod 1012 to exit the openings 1014, 1016. Thus, in the fifth example, the rod 710 and the second fastener(s) 138 move along a direction that is substantially parallel to the rotational axis 108 to facilitate alignment of the first and second fasteners 136, 138.

The state sensor(s) 128, the alignment sensor(s) 130, the flight control computer 132, and the control surface 144 are not illustrated in FIGS. 10A-10D; however, the state sensor(s) 128, the alignment sensor(s) 130, the flight control computer 132, the control surface 144, or any combination thereof, may be present in an aircraft 100 according to the fifth example of FIGS. 10A-10D. If present, the state sensor(s) 128, the alignment sensor(s) 130, the flight control computer 132 and/or the control surface 144 operate as described with reference to FIGS. 1 and 6A-6C.

FIGS. 11A, 11B, 11C, and 11D schematically illustrate operation of a sixth example of a movable airfoil 104 of the aircraft of FIG. 1 according to particular aspects. The sixth example of the movable airfoil 104 illustrated in FIGS. 11A-11D may correspond to any of the movable airfoils described with reference to FIGS. 1-5B. FIG. 11A illustrates a view of the sixth example along the rotational axis 108 and shows the movable airfoil 104 in the first position 122 and in an intermediate position 1122 between the first position 122 and the second position 124 (not shown in FIGS. 11A-11D). FIGS. 11B-11D illustrate details of operation of components of a portion of the indexing mechanisms 110 of the sixth example. While FIGS. 11B-11D illustrate only one instance of the components 1102 of the indexing mechanism 110, as illustrated in FIG. 11A, the sixth example of FIGS. 11A-11C includes more than one instance of the components 1102.

In FIGS. 11A-11D, the movable airfoil 104 is coupled, via the hinge member(s) 106, to structure(s) 102 (e.g., a first structure 102A and a second structure 102B) of the aircraft 100. Further, in the sixth example of FIGS. 11A-11D, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes the components 1102 of the indexing mechanism 110. In the sixth example of FIGS. 11A-11D, when the movable airfoil 104 is in the first position 122, the structural member(s) 602 are disposed proximate the second structure 102B, and when the movable airfoil 104 is in the second position 124 (not shown in FIGS. 11A-11D), the structural member(s) 602 are disposed proximate the first structure 102A.

In the sixth example, the structural member(s) 602 include the first fastener(s) 136 and instances of the second fasteners 138 are coupled to each of the first structure 102A and the second structure 102B. In the implementation illustrated in FIGS. 11A-11D, the first fastener(s) 136 include the rod 1012 and a cap 1010, where the cap 1010 has a larger characteristic dimension (e.g., width or diameter) than the rod 1012. In some implementations, the cap 1010 is omitted.

In the sixth example, each of the second fasteners 138 includes a rotary member 1106, a bracket 1104, and a pawl 1116. The rotary member 1106 defines an opening 1110 and a notch 1112 and is configured to rotate about an axis 1114. The pawl 1116 is configured to rotate about an axis 1118 to engage or disengage from the notch 1112 of the rotary member 1106.

When the indexing mechanism 110 is in the first state 114, the opening 1110 of the rotary member 1106 is aligned with an opening 1120 of the bracket 1104, and the pawl 1116 is not engaged with the notch 1112 of the rotary member 1106, as illustrated in FIG. 11B. When the indexing mechanism 110 is in the second state 116, the rod 1012 of the first fastener 136 is disposed in the opening 1110 of the rotary member 1106. Additionally, the opening 1110 of the rotary member 1106 is not aligned with the opening 1120 of the bracket 1104, and the pawl 1116 is engaged with the notch 1112 of the rotary member 1106, as illustrated in FIG. 11D.

FIGS. 11B, 11C and 11D illustrate details of operation of the sixth example. In FIG. 11B, the rotary member 1106 is rotated to align the opening 1110 of the rotary member 1106 with the opening 1120 of the bracket 1104 such that the rod 1012 of the first fastener 136 is able to move into the openings 1110, 1120, as illustrated in FIG. 11C. After the rod 1012 is disposed within the openings 1110, 1120, an actuator 112 (not shown in FIGS. 11A-11D) rotates the rotary member 1106 about the axis 1114. When the rotary member 1106 is sufficiently rotated, the pawl 1116 rotates about the axis 1118 to engage the notch 1112. In a particular implementation, a spring or other biasing member moves the pawl 1116 to engage the notch 1112. In another particular implementation, the actuator 112 or a second actuator moves the pawl 1116 to engage the notch 1112. The position illustrated in FIG. 11D in which the rod 1012 is retained by the rotary member 1106 and bracket 1104 and the pawl 1116 is engaged with the notch 1112 corresponds to the second state 116 of FIG. 1.

To transition from the second state 116, illustrated in FIG. 11D to the first state 114, illustrated in FIG. 11B, an actuator rotates the pawl 1116 to disengage the pawl 1116 from the notch 1112. Additionally, an actuator rotates the rotary member 1106 about the axis 1114 to align the opening 1110 of the rotary member 1106 and the opening of the bracket 1104. In an alternative implementation, a biasing member is coupled to the rotary member 1106 and configured to bias the rotary member 1106 toward a position in which the opening 1110 of the rotary member 1106 is aligned with the opening of the bracket 1104. In this implementations, the rotary member 1106 rotates to the first state in response to the pawl 1116 disengaging from the notch 1112.

The state sensor(s) 128, the alignment sensor(s) 130, the flight control computer 132, and the control surface 144 are not illustrated in FIGS. 11A-11D; however, the state sensor(s) 128, the alignment sensor(s) 130, the flight control computer 132, the control surface 144, or any combination thereof, may be present in an aircraft 100 according to the sixth example of FIGS. 11A-11D. If present, the state sensor(s) 128, the alignment sensor(s) 130, the flight control computer 132 and/or the control surface 144 operate as described with reference to FIGS. 1 and 6A-6C.

FIGS. 12A, 12B, 12C, and 12D schematically illustrate operation of a seventh example of a movable airfoil 104 of the aircraft of FIG. 1 according to particular aspects. The seventh example of the movable airfoil 104 illustrated in FIGS. 12A-12D may correspond to any of the movable airfoils described with reference to FIGS. 1-5B. FIG. 12A illustrates a view of the seventh example along the rotational axis 108 and shows the movable airfoil 104 in the first position 122, in the second position 124, and in an intermediate position 1222 between the first position 122 and the second position 124. FIGS. 12B-12D illustrate details of operation of components 1202 of a portion of the indexing mechanisms 110 of the seventh example. While FIGS. 12B-12D illustrate only one instance of the components 1202 of the indexing mechanism 110, as illustrated in FIG. 12A, the seventh example of FIGS. 12A-12D includes more than one instance of the components 1202.

In FIGS. 12A-12D, the movable airfoil 104 is coupled, via the hinge member(s) 106, to structure(s) 102 (e.g., a first structure 102A and a second structure 102B) of the aircraft 100. Further, in the seventh example of FIGS. 12A-12D, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes the components 1202 of the indexing mechanism 110. In the seventh example of FIGS. 12A-12D, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

In the seventh example, the structural member(s) 602 include the first fastener(s) 136 and instances of the second fasteners 138 are coupled to each of the first structure 102A and the second structure 102B. In the implementation illustrated in FIGS. 12A-12D, the first fastener(s) 136 include a pawl 1204 that is rotatable relative to the structural member(s) 602 about an axis 1206. A biasing member 142 (not shown in FIGS. 12A-12D) is coupled to the structural member(s) 602 and the pawl 1204 and configured to urge the pawl 1204 toward a position in which the pawl 1204 and the structural member(s) 602 are aligned (e.g., as illustrated in FIG. 12D).

In the seventh example, each of the second fasteners 138 is disposed proximate a respective actuator 112. The second fasteners 138 are shaped to define one or more ramps 1210 and one or more ledges 1208. The actuator 112 associated with a particular second fastener 138 is positioned to, when actuated, extend a rod 710 to push the pawl 1204 on the ledge 1208 of the second fastener 138 off of the ledge 1208.

FIGS. 12B, 12C and 12D illustrate details of operation of the seventh example. FIG. 12B illustrates the seventh example in the second state 116 in which the pawl 1204 is disposed on the ledge 1208 of the second fastener 138. In this position, contact between the pawl 1204 and the ledge 1208 constrains movement of the structural member(s) 602 in a first direction and the structure 102A constrains movement of the structural member(s) 602 in a second direction (opposite the first direction). The biasing member 142 applies a force to the pawl 1204 that constrains rotation of the pawl 1204 off of the ledge 1208.

To transition from the second state 116 (as illustrated in FIG. 12B) to the first state 114 (as illustrated in FIG. 12D), the actuator 112 extends the rod 710. Extension of the rod 710 overcomes the biasing force applied by the biasing member 142 sufficiently to push the pawl 1204 off of the ledge 1208. After the pawl 1204 clears the edge of the ledge 1208, the force applied by the biasing member 142 tends to rotate the pawl 1204 back toward the second fastener 138, which causes the pawl 1204 to slide along the ramp(s) 1210 (as illustrated in FIG. 12C). Thus, in the seventh example, the rod 710 and the first fastener(s) 136 move along a direction that is substantially perpendicular to the rotational axis 108 to disengage the first and second fasteners 136, 138.

To subsequently re-engage the first and second fasteners 136, 138 in the seventh example, a force is applied (e.g., the aerodynamic forces 146 of FIG. 1) to rotate the structural member(s) 602 and the pawl 1204 toward the second fastener(s) 138. The ramp(s) 1210 of the second fastener(s) 138 causes the pawl 1204 to rotate toward the structural member(s) 602 (similar to the position illustrated in FIG. 12C). When the pawl 1204 reaches the top of the ramp(s) 1210 and clears the ledge 1208, the force applied by the biasing member 142 rotates the pawl 1204 into the position illustrated in FIG. 12B.

The state sensor(s) 128, the alignment sensor(s) 130, the flight control computer 132, and the control surface 144 are not illustrated in FIGS. 12A-12D; however, the state sensor(s) 128, the alignment sensor(s) 130, the flight control computer 132, the control surface 144, or any combination thereof, may be present in an aircraft 100 according to the seventh example of FIGS. 12A-12D. If present, the state sensor(s) 128, the alignment sensor(s) 130, the flight control computer 132 and/or the control surface 144 operate as described with reference to FIGS. 1 and 6A-6C.

FIGS. 13A, 13B, 13C, 13D, and 13E schematically illustrate operation of an eighth example of a movable airfoil 104 of the aircraft of FIG. 1 according to particular aspects. The eighth example of the movable airfoil 104 illustrated in FIGS. 13A-13E may correspond to any of the movable airfoils described with reference to FIGS. 1-5B. FIG. 13A illustrates a view of the eighth example along the rotational axis 108 and shows the movable airfoil 104 in the first position 122 and in the second position 124. FIGS. 13B-13E illustrate details of operation of components 1302 of a portion of the indexing mechanisms 110 of the eighth example. While FIGS. 13B-13E illustrate only one instance of the components 1302 of the indexing mechanism 110, as illustrated in FIG. 13A, the eighth example of FIGS. 13A-13E includes more than one instance of the components 1302.

In FIGS. 13A-13E, the movable airfoil 104 is coupled, via the hinge member(s) 106, to structure(s) 102 (e.g., a first structure 102A and a second structure 102B) of the aircraft 100. Further, in the eighth example of FIGS. 13A-13E, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes the components 1302 of the indexing mechanism 110. In the eighth example of FIGS. 13A-13E, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

In the eighth example, each first fastener(s) 136 corresponds to or includes a pawl 1306 and ends of the structural member(s) 602 correspond to or include the second fastener(s) 138. The pawl 1306 is rotatable about an axis 1304 and arranged to be biased (e.g., by a biasing member(s) 142) toward a position associated with the second state 116.

FIGS. 13B and 13C illustrate aspects of a first stage of operation of the components 1302 as the movable airfoil 104 moves toward one of the indexed positions (e.g., the first position 122). As the structural member(s) 602 rotate, an end 1308 of the structural member(s) 602 contacts a surface of the pawl 1306 and causes the pawl 1306 to rotate about the axis 1304 (in opposition to the force applied by the biasing member 142).

FIG. 13D illustrates aspects of a second stage of operation of the components 1302 after the movable airfoil reaches the indexed position and the components 1302 transition to the second state 116. For example, the second stage of FIG. 13D is subsequent to the first stage of FIGS. 13B and 13C. When the end 1308 of the structural member(s) 602 pass an end 1310 of the pawl 1306, the biasing member 142 causes the pawl 1306 to rotate to a position corresponding to the second state 116, as illustrated in FIG. 13D. In the position illustrated in FIG. 13D, a surface of the structural member(s) 602 near the end 1308 and adjacent to the pawl 1306 acts as the second fastener 138, and the end 1310 of the pawl 1306 acts as the first fastener 136.

FIG. 13E illustrates aspects of a third stage of operation of the components 1302 as the movable airfoil prepares to move from the indexed position, and the components 1302 transition to the first state 114. For example, the third stage of FIG. 13E is subsequent to the second stage of FIG. 13D. In FIG. 13E, to transition from the second state 116 of FIG. 13D, the actuator 112 extends the rod 710 to rotate the pawl 1306 so that the end 1310 of the pawl 1306 moves below the end 1308 of the structural member(s) 602 enabling rotation of the structural member(s) 602.

The state sensor(s) 128, the alignment sensor(s) 130, the flight control computer 132, and the control surface 144 are not illustrated in FIGS. 13A-13E; however, the state sensor(s) 128, the alignment sensor(s) 130, the flight control computer 132, the control surface 144, or any combination thereof, may be present in an aircraft 100 according to the eighth example of FIGS. 13A-13E. If present, the state sensor(s) 128, the alignment sensor(s) 130, the flight control computer 132 and/or the control surface 144 operate as described with reference to FIGS. 1 and 6A-6C.

FIGS. 14A, 14B, 14C, 14D, and 14E schematically illustrate operation of a ninth example of a movable airfoil 104 of the aircraft of FIG. 1 according to particular aspects. The ninth example of the movable airfoil 104 illustrated in FIGS. 14A-14E may correspond to any of the movable airfoils described with reference to FIGS. 1-5B. FIG. 14A illustrates a perspective view of the ninth example in the first position 122. FIGS. 14B-14E illustrate details of operation of components 1402 of a portion of the indexing mechanisms 110 of the ninth example. While FIGS. 14B-14E illustrate only one instance of the components 1402 of the indexing mechanism 110, as illustrated in FIG. 14A, the ninth example of FIGS. 14A-14E includes more than one instance of the components 1402.

In FIGS. 14A-14E, the movable airfoil 104 is coupled, via the hinge member(s) 106, to structure(s) 102 (e.g., a first structure 102A and a second structure 102B) of the aircraft 100. Further, in the ninth example of FIGS. 14A-14E, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes the components 1402 of the indexing mechanism 110. In the ninth example of FIGS. 14A-14E, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

In the ninth example, each first fastener(s) 136 corresponds to or includes a pawl 1406 and ends of the structural member(s) 602 correspond to or include the second fastener(s) 138. The pawl 1406 is rotatable about an axis 1404 and arranged to be biased (e.g., by a biasing member(s) 142) toward a position associated with the second state 116.

FIGS. 14B and 14C illustrate aspects of a first stage of operation of the components 1402 as the movable airfoil 104 moves toward one of the indexed positions (e.g., the second position 124). As the structural member(s) 602 rotate, an edge 1408 of the structural member(s) 602, guided by guides 604, contacts a surface of the pawl 1406 and causes the pawl 1406 to rotate about the axis 1404 (in opposition to the force applied by the biasing member 142).

FIG. 14D illustrates aspects of a second stage of operation of the components 1402 after the movable airfoil reaches the indexed position and the components 1402 transition to the second state 116. For example, the second stage of FIG. 14D is subsequent to the first stage of FIGS. 14B and 14C. When a second edge 1412 of the structural member(s) 602 passes an end 1410 of the pawl 1406, the biasing member 142 causes the pawl 1406 to rotate to a position corresponding to the second state 116, as illustrated in FIG. 14D. In the position illustrated in FIG. 14D, the second edge 1412 of the structural member(s) 602 is adjacent to the pawl 1406 and acts as the second fastener 138, and the end 1410 of the pawl 1406 acts as the first fastener 136.

FIG. 14E illustrates aspects of a third stage of operation of the components 1402 as the movable airfoil 104 prepares to move from the indexed position, and the components 1402 transition to the first state 114. For example, the third stage of FIG. 14E is subsequent to the second stage of FIG. 14D. In FIG. 14E, to transition from the second state 116 of FIG. 14D, the actuator 112 extends the rod 710 to rotate the pawl 1406 so that the end 1410 of the pawl 1406 moves away from the second edge 1412 of the structural member(s) 602 enabling rotation of the structural member(s) 602.

The position sensor(s) 126, the state sensor(s) 128, the alignment sensor(s) 130, the flight control computer 132, and the control surface 144 are not illustrated in FIGS. 14A-14E; however, the position sensor(s) 126, the state sensor(s) 128, the alignment sensor(s) 130, the flight control computer 132, the control surface 144, or any combination thereof, may be present in an aircraft 100 according to the ninth example of FIGS. 14A-14E. If present, the position sensor(s) 126, the state sensor(s) 128, the alignment sensor(s) 130, the flight control computer 132 and/or the control surface 144 operate as described with reference to FIGS. 1 and 6A-6C.

Figure 15A:
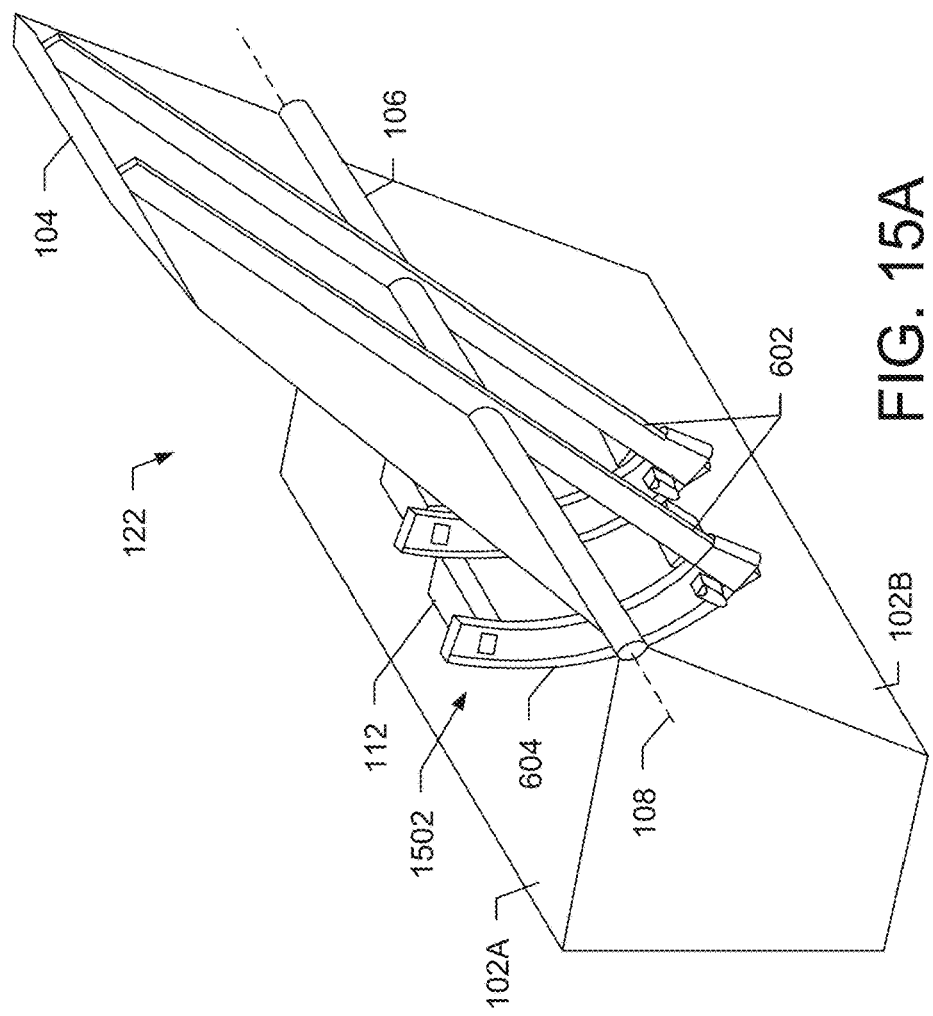
FIG. 15A is a diagram that schematically illustrates a tenth example of the movable airfoil of the aircraft of FIG. 1 according to particular aspects.
Figure 15B:
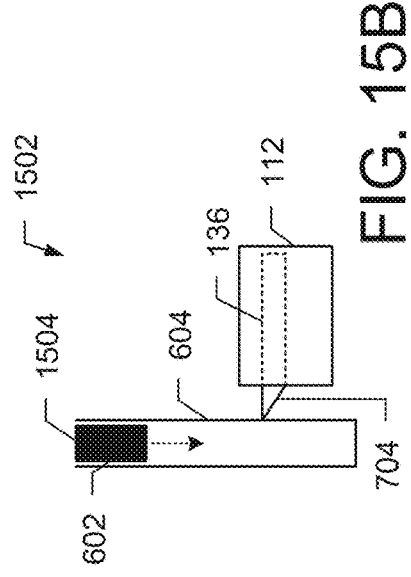
FIGS. 15B and 15C are diagrams that together schematically illustrate aspects of operation of the tenth example of the movable airfoil of FIG. 15A.
Figure 15C:
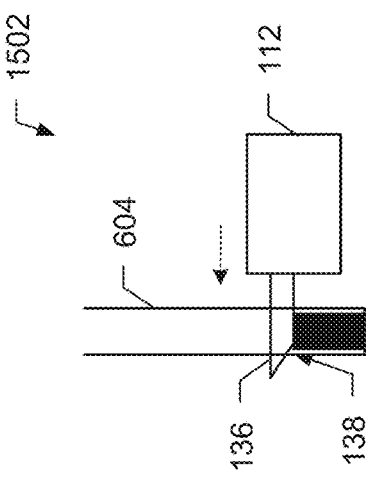

FIGS. 15A, 15B, and 15C schematically illustrate operation of a tenth example of a movable airfoil 104 of the aircraft of FIG. 1 according to particular aspects. The tenth example of the movable airfoil 104 illustrated in FIGS. 15A-15C may correspond to any of the movable airfoils described with reference to FIGS. 1-5B. FIG. 15A illustrates a perspective view of the tenth example in the first position 122. FIGS. 15B and 15C illustrate details of operation of components 1502 of a portion of the indexing mechanisms 110 of the tenth example. While FIGS. 15B and 15C illustrate only one instance of the components 1502 of the indexing mechanism 110, as illustrated in FIG. 15A, the tenth example of FIGS. 15A-15C includes more than one instance of the components 1502.

In FIGS. 15A-15C, the movable airfoil 104 is coupled, via the hinge member(s) 106, to structure(s) 102 (e.g., a first structure 102A and a second structure 102B) of the aircraft 100. Further, in the tenth example of FIGS. 15A-15C, the movable airfoil 104 is coupled to or includes one or more structural members 602 in a cantilevered arrangement about the rotational axis 108. For example, the structural member(s) 602 may include portions of spars 606 (of FIG. 6C) that extend along at least a portion of the movable airfoil 104, across the rotational axis 108, and into a portion of the aircraft 100 that includes the components 1502 of the indexing mechanism 110. In the tenth example of FIGS. 15A-15C, when the movable airfoil 104 is in the first position 122, the structural member(s) 602 are disposed proximate the second structure 102B, and when the movable airfoil 104 is in the second position 124, the structural member(s) 602 are disposed proximate the first structure 102A.

FIG. 15B illustrates the components 1502 in the first state 114, and FIG. 15C illustrates the components 1502 in the second state 116. In the tenth example, each first fastener(s) 136 is a pin and an edge 1504 of the structural member(s) 602 correspond to or include the second fastener(s) 138. As illustrated in FIG. 15B, to enable the movable airfoil 104 to move toward one of the indexed positions (e.g., the second position 124), the first fastener 136 is retracted, and the structural member(s) 602, guided by guides 604, moves past the first fastener 136. The first fastener 136 includes a curved, beveled, or angled surface 704 to facilitate alignment of the first fastener 136 and the second fastener 138. When the structural member(s) 602 are sufficiently past the first fastener 136 to allow the surface 704 to contact the edge 1504, the actuator 112 extends the first fastener 136 to retain the structural member(s) 602, as illustrated in FIG. 15C. Thus, in the tenth example, the first fastener(s) 136 move along a direction that is substantially parallel or antiparallel to the rotational axis 108 to engage/disengage from the second fastener(s) 138.

The position sensor(s) 126, the state sensor(s) 128, the alignment sensor(s) 130, the flight control computer 132, and the control surface 144 are not illustrated in FIGS. 15A-15C; however, the position sensor(s) 126, the state sensor(s) 128, the alignment sensor(s) 130, the flight control computer 132, the control surface 144, or any combination thereof, may be present in an aircraft 100 according to the tenth example of FIGS. 15A-15C. If present, the position sensor(s) 126, the state sensor(s) 128, the alignment sensor(s) 130, the flight control computer 132 and/or the control surface 144 operate as described with reference to FIGS. 1 and 6A-6C.

FIGS. 16A, 16B, 16C, 16D, 16E, 16F, and 16G schematically illustrate operation of an eleventh example of a movable airfoil 104 of the aircraft of FIG. 1 according to particular aspects. The eleventh example of the movable airfoil 104 illustrated in FIGS. 16A-16G may correspond to any of the movable airfoils described with reference to FIGS. 1-5B. FIG. 16A illustrates a perspective view of the eleventh example in the first position 122. FIGS. 16B-16G illustrate details of operation of components 1602 of a portion of the indexing mechanisms 110 of the eleventh example. While FIGS. 16B-16G illustrate only one instance of the components 1602 of the indexing mechanism 110, the eleventh example of FIGS. 16A-16G may include more than one instance of the components 1602, such as one instance for each spar 606.

In FIGS. 16A-16G, the movable airfoil 104 is coupled, via the hinge member(s) 106, to structure(s) 102 (e.g., a first structure 102A and a second structure 102B) of the aircraft 100. Further, in the eleventh example of FIGS. 16A-16G, the movable airfoil 104 is coupled to or includes one or more spars 606 which at least partially enclose the first fastener 136. Second fastener(s) 138 are coupled to the structures 102 of the aircraft 100 across the rotational axis 108 from the spar(s) 606. In the eleventh example of FIGS. 16A-16G, when the movable airfoil 104 is in the first position 122, the first fastener(s) 136 are aligned with second fastener(s) 138B disposed proximate the second structure 102B, and when the movable airfoil 104 is in the second position 124, the first fastener(s) 136 are aligned with second fastener(s) 138A disposed proximate the first structure 102A.

FIG. 16B illustrates details of components 1602 associated with the first fastener(s) 136 according to the eleventh example. In FIG. 16B, the first fastener 136 includes or corresponds to a rail 1604 disposed in a spar 606. The rail 1604 includes features 1606 configured to interact with teeth 1610 of a drive gear 1608 that is coupled to the actuator 112. The features 1606 include, for example, holes, bumps, teeth, ridges, indentations, etc. Movement of the rail 1604 within the spar 606 is guided by rollers 1612. When the actuator 112 rotates the drive gear 1608 in a first direction (e.g., clockwise in the example illustrated in FIG. 16B), the rail 1604 is moved toward one of the second fasteners 138, and when the actuator 112 rotates the drive gear 1608 in a second direction (e.g., anticlockwise in the example illustrated in FIG. 16B), the rail 1604 is moved away from the second fasteners 138.

FIGS. 16C-16G illustrate aspects of operation of the components 1602 as the movable airfoil 104 transitions from the second position 124 to the first position 122. FIG. 16C illustrates the components 1602 in the first state 114 and arranged to dispose the movable airfoil 104 in the second position 124. In FIG. 16C, the first fastener 136 is extended into both the spar 606 and the second fastener 138A, thus preventing rotation of the hinge member 106. FIG. 16D illustrates the components 1602 in the second state 116 and arranged to dispose the movable airfoil 104 in the second position 124. For example, the actuator 112 may rotate the drive gear 1608 to retract the first fastener 136 from the second fastener 138A to transition from the arrangement illustrated in FIG. 16C to the arrangement illustrated in FIG. 16D.

After the components 1602 are in the second state 116 (as illustrated in FIG. 16D), the movable airfoil 104 is free to rotate about the hinge member 106 (as illustrated in FIG. 16E) until the airfoil 104 is disposed in a different indexed position, such as the first position 122. Rotation of the movable airfoil may be driven by an actuator, by the aerodynamic forces 146 of FIG. 1, or both.

In the first position 122, the first fastener 136 is aligned with the second fastener 138B, as illustrated in FIG. 16F. To lock the movable airfoil 104 in the first position 122, the actuator 112 rotates the drive gear 1608 to cause the first fastener 136 to engage the second fastener 138B, as illustrated in FIG. 16G.

The position sensor(s) 126, the state sensor(s) 128, the alignment sensor(s) 130, the flight control computer 132, and the control surface 144 are not illustrated in FIGS. 16A-16G; however, the position sensor(s) 126, the state sensor(s) 128, the alignment sensor(s) 130, the flight control computer 132, the control surface 144, or any combination thereof, may be present in an aircraft 100 according to the eleventh example of FIGS. 16A-16G. If present, the position sensor(s) 126, the state sensor(s) 128, the alignment sensor(s) 130, the flight control computer 132 and/or the control surface 144 operate as described with reference to FIGS. 1 and 6A-6C.

FIGS. 17A, 17B, 17C, 17D, 17E, 17F, and 17G schematically illustrate operation of a twelfth example of a movable airfoil 104 of the aircraft of FIG. 1 according to particular aspects. The twelfth example of the movable airfoil 104 illustrated in FIGS. 17A-17G may correspond to any of the movable airfoils described with reference to FIGS. 1-5B. FIG. 17A illustrates a perspective view of the twelfth example in the first position 122. FIGS. 17B-17G illustrate details of operation of components 1702 of a portion of the indexing mechanisms 110 of the twelfth example. While FIGS. 17B-17G illustrate only one instance of the components 1702 of the indexing mechanism 110, the twelfth example of FIGS. 17A-17G may include more than one instance of the components 1702, such as one instance for each spar 606.

In FIGS. 17A-17G, the movable airfoil 104 is coupled, via the hinge member(s) 106, to structure(s) 102 (e.g., a first structure 102A and a second structure 102B) of the aircraft 100. Further, in the twelfth example of FIGS. 17A-17G, the movable airfoil 104 is coupled to or includes one or more spars 606 which at least partially enclose the first fastener 136. Second fastener(s) 138 are coupled to the structures 102 of the aircraft 100 across the rotational axis 108 from the spar(s) 606. In the twelfth example of FIGS. 17A-17G, when the movable airfoil 104 is in the first position 122, the first fastener(s) 136 are aligned with second fastener(s) 138B disposed proximate the second structure 102B, and when the movable airfoil 104 is in the second position 124, the first fastener(s) 136 are aligned with second fastener(s) 138A disposed proximate the first structure 102A.

FIG. 17B illustrates details of components 1702 associated with the first fastener(s) 136 according to the twelfth example. In FIG. 17B, the first fastener 136 is disposed in the spar 606 and coupled to the actuator 112. Movement of the first fastener 136 within the spar 606 is guided by rollers 1612. The actuator 112 is configured to move the first fastener 136 in a linear motion toward and/or away from the second fasteners 138.

FIGS. 17C-17G illustrate aspects of operation of the components 1702 as the movable airfoil 104 transitions from the second position 124 to the first position 122. FIG. 17C illustrates the components 1702 in the first state 114 and arranged to dispose the movable airfoil 104 in the second position 124. In FIG. 17C, the first fastener 136 is extended into both the spar 606 and the second fastener 138A, thus preventing rotation of the hinge member 106. FIG. 17D illustrates the components 1702 in the second state 116 and arranged to dispose the movable airfoil 104 in the second position 124. For example, the actuator 112 retracts the first fastener 136 from the second fastener 138A to transition from the arrangement illustrated in FIG. 17C to the arrangement illustrated in FIG. 17D.

After the components 1702 are in the second state 116 (as illustrated in FIG. 17D), the movable airfoil 104 is free to rotate about the hinge member 106 (as illustrated in FIG. 17E) until the airfoil 104 is disposed in a different indexed position, such as the first position 122. Rotation of the movable airfoil 104 may be driven by an actuator, by the aerodynamic forces 146 of FIG. 1, or both.

In the twelfth example, an alignment sensor 130 is used to determine when the first fastener 136 is aligned with one of the second fasteners 138. To illustrate, the alignment sensor 130 may transmit an optical signal 1704. When the optical signal 1704 is reflected by a reflector 1706, the reflected portion of the optical signal 1704 is detected by the alignment sensor 130 as an indication of alignment of the first fastener 136 and the second fastener 138. When the alignment sensor 130 generates alignment data indicating that the first fastener 136 and the second fastener 138B are aligned (as illustrated in FIG. 17F), the actuator 112 extends the first fastener 136 into the second fastener 138B to lock the movable airfoil 104 in the first position 122 (as illustrated in FIG. 17G).

The position sensor(s) 126, the state sensor(s) 128, the flight control computer 132, and the control surface 144 are not illustrated in FIGS. 17A-17G; however, the position sensor(s) 126, the state sensor(s) 128, the flight control computer 132, the control surface 144, or any combination thereof, may be present in an aircraft 100 according to the twelfth example of FIGS. 17A-17G. If present, the position sensor(s) 126, the state sensor(s) 128, the flight control computer 132 and/or the control surface 144 operate as described with reference to FIGS. 1 and 6A-6C.

FIGS. 18A, 18B, 18C, and 18D schematically illustrate operation of a thirteenth example of a movable airfoil 104 of the aircraft of FIG. 1 according to particular aspects. The thirteenth example of the movable airfoil 104 illustrated in FIGS. 18A-18D may correspond to any of the movable airfoils described with reference to FIGS. 1-5B. FIG. 18A illustrates a perspective view of the thirteenth example in the first position 122. FIGS. 18B-18D illustrate details of operation of components 1802 of a portion of the indexing mechanisms 110 of the thirteenth example. While FIGS. 18B-18D illustrate only one instance of the components 1802 of the indexing mechanism 110, the thirteenth example of FIGS. 18A-18D may include more than one instance of the components 1802.

In FIGS. 18A-18D, the movable airfoil 104 is coupled, via the hinge member(s) 106, to structure(s) 102 of the aircraft 100. Further, in the thirteenth example of FIGS. 18A-18D, the movable airfoil 104 is coupled to or includes one or more spars 606, and the structure(s) 102 include or correspond to one or more additional spars 1804. Second fastener(s) 138 are coupled to a portion 1806 of the hinge member(s) 106 that rotates as the movable airfoil 104 rotates. In the thirteenth example of FIGS. 18A-18D, when the movable airfoil 104 is in the first position 122, the first fastener(s) 136 are aligned with second fastener(s) 138A, and when the movable airfoil 104 is in the second position 124, the first fastener(s) 136 are aligned with second fastener(s) 138B.

FIGS. 18B-18D illustrate aspects of operation of the components 1802 as the movable airfoil 104 transitions between the second position 124 and the first position 122. FIG. 18B illustrates the components 1802 in the first state 114 and arranged to dispose the movable airfoil 104 in the second position 124. In FIG. 18C, the first fastener(s) 136 are extended into the second fastener 138A, thus preventing rotation of the portion 1806 of hinge member 106. The portion 1806 of the hinge member 106 is fixed to and moves with the spars 606. Thus, when the portion 1806 of the hinge member 106 is prevented from rotating, the movable airfoil 104 is prevented from rotating.

FIG. 18C illustrates the components 1802 in the second state 116 and arranged to dispose the movable airfoil 104 in the second position 124. For example, the actuator 112 retracts the first fastener(s) 136 from the second fastener(s) 138B to transition from the arrangement illustrated in FIG. 18B to the arrangement illustrated in FIG. 18C. In the thirteenth example, the first fastener(s) 136 move in a direction that is substantially perpendicular to the rotational axis 108 to transition between the first and second states 114, 116.

With the components 1802 in the second state 116 (as illustrated in FIG. 18C), the movable airfoil 104 is free to rotate about the hinge member 106 until the movable airfoil 104 is disposed in a different indexed position, such as the first position 122. Rotation of the movable airfoil 104 may be driven by an actuator, by the aerodynamic forces 146 of FIG. 1, or both. As illustrated in FIG. 18D, when the second fastener(s) 138A are aligned with the first fastener(s) 136, the actuator(s) 112 extend the first fastener(s) 136 to lock the movable airfoil 104 in the first position. Although FIGS. 18A-18D illustrate two sets of second fasteners (e.g., second fastener(s) 138A associated with the first position 122 and second fastener(s) 138B associated with the first position 122), the thirteenth example is not limited to two indexed positions. For example, additional second fasteners may be coupled to the portion 1806 of the hinge member(s) 106 and associated with additional indexed position.

The position sensor(s) 126, the state sensor(s) 128, the alignment sensor 130, the flight control computer 132, and the control surface 144 are not illustrated in FIGS. 18A-18D; however, the position sensor(s) 126, the state sensor(s) 128, the alignment sensor 130, the flight control computer 132, the control surface 144, or any combination thereof, may be present in an aircraft 100 according to the thirteenth example of FIGS. 18A-18D. If present, the position sensor(s) 126, the state sensor(s) 128, the alignment sensor 130, the flight control computer 132 and/or the control surface 144 operate as described with reference to FIGS. 1 and 6A-6C.

FIGS. 19A, 19B, and 19C schematically illustrate operation of a fourteenth example of a movable airfoil 104 of the aircraft of FIG. 1 according to particular aspects. The fourteenth example of the movable airfoil 104 illustrated in FIGS. 19A-19C may correspond to any of the movable airfoils described with reference to FIGS. 1-5B. FIG. 19A illustrates a perspective view of the fourteenth example in the first position 122. FIGS. 19B and 19C illustrate details of operation of components 1902 of a portion of the indexing mechanisms 110 of the fourteenth example. While FIGS. 19B and 19C illustrate only one instance of the components 1902 of the indexing mechanism 110, the fourteenth example of FIGS. 19A-19C may include more than one instance of the components 1902, such as one instance per spar 606 or one instance per spar 1804.

In FIGS. 19A-19C, the movable airfoil 104 is coupled, via the hinge member(s) 106, to structure(s) 102 of the aircraft 100. Further, in the fourteenth example of FIGS. 19A-19C, the movable airfoil 104 is coupled to or includes one or more spars 606, and the structure(s) 102 include or correspond to one or more additional spars 1804. In the fourteenth example, the first fastener(s) 136 include or correspond to ridges (e.g., keys) formed on a portion 1904 of the hinge member(s) 106 that rotates relative to the structure(s) 102 as the movable airfoil 104 rotates. To illustrate, as shown in FIG. 19B and 19C, the portion 1904 includes a cup that is coupled (directly or indirectly) to one of the spars 606 in a fixed relative position. In the implementation illustrated in FIGS. 19B and 19C, the components 1902 of the indexing mechanism 110 include a plurality of first fasteners 136 (e.g., a plurality of keys) arranged about a ring that is concentric with the rotational axis 108; however, in other implementations, the portion 1904 includes a single first fastener 136.

In the fourteenth example, the second fastener(s) 138 include or correspond to recesses (e.g., keyways) formed on a portion 1906 of the hinge member(s) 106 that does not rotate relative to the structure(s) 102 when the movable airfoil 104 rotates. To illustrate, as shown in FIGS. 19B and 19C, the portion 1906 includes a body that is slidable along a keyed shaft 1920 that maintains a fixed rotational orientation relative to the structure(s) 102. In the implementation illustrated in FIGS. 19B and 19C, the components 1902 of the indexing mechanism 110 include a plurality of second fasteners 138 (e.g., a plurality of keyways) arranged about a ring that is concentric with the rotational axis 108. In some implementations, a count of the number of second fasteners 138 (e.g., keyways) of the portion 1906 is equal to a count of the number of first fasteners 136 (e.g., keys). In other implementations, the count of the number of second fasteners 138 (e.g., keyways) of the portion 1906 is not equal to the count of the number of first fasteners 136 (e.g., keyways). For example, the count of the number of second fasteners 138 (e.g., keyways) may be an integer multiple of the count of the number of first fasteners 136 (e.g., keyways).

FIGS. 19B and 19C illustrate aspects of operation of the components 1902 as the movable airfoil 104 transitions between the second position 124 and the first position 122. FIG. 19B illustrates the components 1902 in the first state 114 and arranged to dispose the movable airfoil 104 in the second position 124. In FIG. 19B, the first fastener(s) 136 are engages with the second fastener 138, thus preventing rotation of the movable airfoil 104 relative to the structure(s) 102.

FIG. 19C illustrates the components 1902 in the second state 116. For example, to transition from the arrangement illustrated in FIG. 19B to the arrangement illustrated in FIG. 19C, the actuator 112 retracts a rod 710 that is coupled to the portion 1906 causing the portion 1906 to slide along the keyed shaft 1920 to a position in which the keyways of the second fastener(s) 138 are disconnected from the keys of the first fastener(s) 136 of the portion 1904. In the fourteenth example, the rod 170 and the second fastener(s) 138 move in a direction that is substantially parallel to the rotational axis 108 to transition between the first and second states 114, 116.

With the components 1902 in the second state 116 (as illustrated in FIG. 19C), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both. When the second fastener(s) 138 are aligned with the first fastener(s) 136 at a particular indexed position, the actuator(s) 112 extends the rod 710 to engage the first and second fasteners 136, 138 and to lock the movable airfoil 104 in the particular indexed position.

The position sensor(s) 126, the state sensor(s) 128, the alignment sensor 130, the flight control computer 132, and the control surface 144 are not illustrated in FIGS. 19A-19C; however, the position sensor(s) 126, the state sensor(s) 128, the alignment sensor 130, the flight control computer 132, the control surface 144, or any combination thereof, may be present in an aircraft 100 according to the fourteenth example of FIGS. 19A-19C. If present, the position sensor(s) 126, the state sensor(s) 128, the alignment sensor 130, the flight control computer 132 and/or the control surface 144 operate as described with reference to FIGS. 1 and 6A-6C.

Figure 20A:
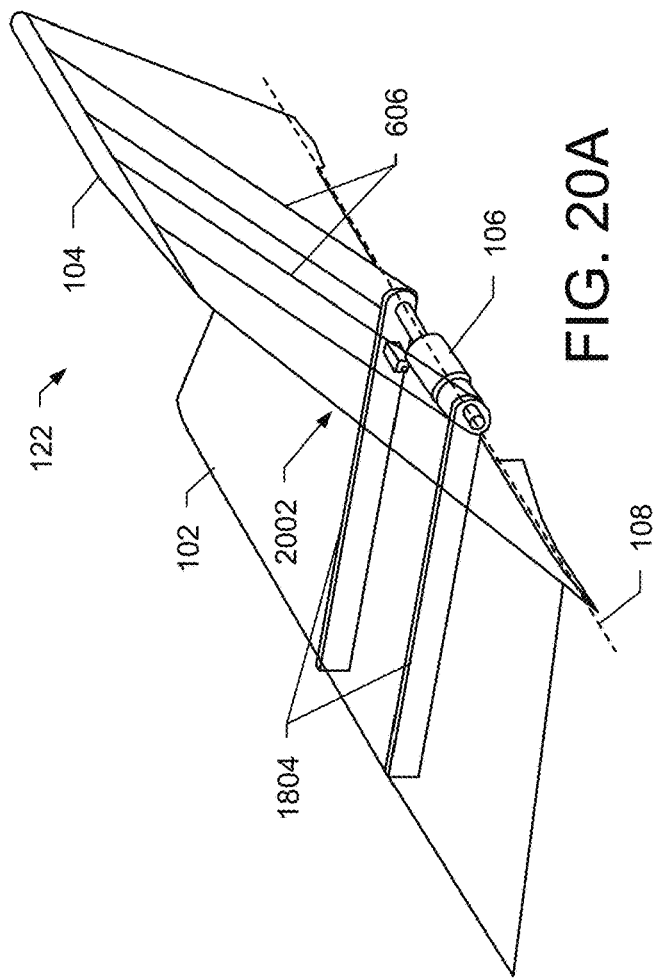
FIG. 20A is a diagram that schematically illustrates a fifteenth example of the movable airfoil of the aircraft of FIG. 1 according to particular aspects.
Figure 20B:
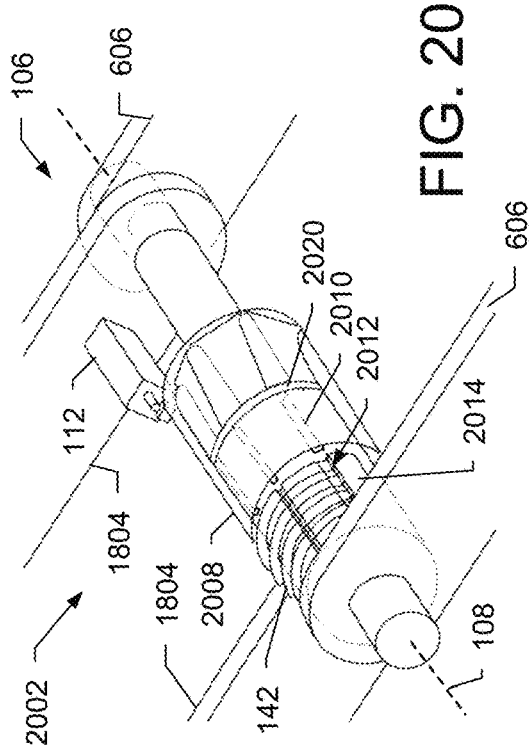
FIGS. 20B and 20C are diagrams that together schematically illustrate aspects of operation of the fifteenth example of the movable airfoil of FIG. 20A.
Figure 20C:
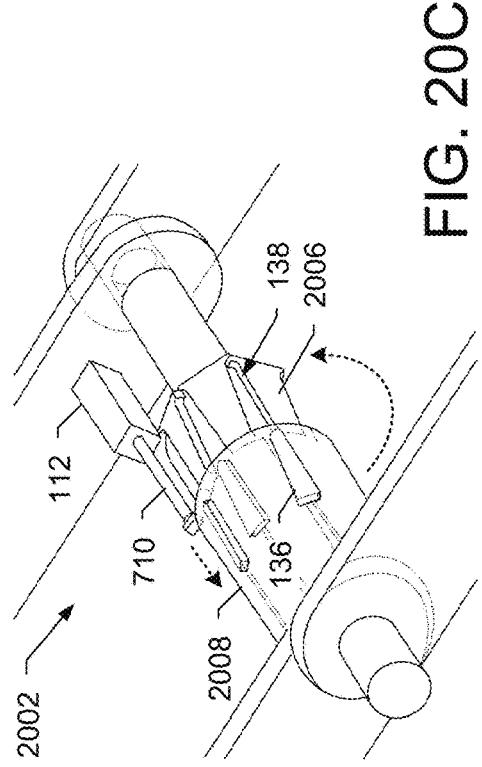

FIGS. 20A, 20B, and 20C schematically illustrate operation of a fifteenth example of a movable airfoil 104 of the aircraft of FIG. 1 according to particular aspects. The fifteenth example of the movable airfoil 104 illustrated in FIGS. 20A-20C may correspond to any of the movable airfoils described with reference to FIGS. 1-5B. FIG. 20A illustrates a perspective view of the fifteenth example in the first position 122. FIGS. 20B and 20C illustrate details of operation of components 2002 of a portion of the indexing mechanisms 110 of the fifteenth example. While FIGS. 20B and 20C illustrate only one instance of the components 2002 of the indexing mechanism 110, the fifteenth example of FIGS. 20A-20C may include more than one instance of the components 2002.

In FIGS. 20A-20C, the movable airfoil 104 is coupled, via the hinge member(s) 106, to structure(s) 102 of the aircraft 100. Further, in the fifteenth example of FIGS. 20A-20C, the movable airfoil 104 is coupled to or includes one or more spars 606, and the structure(s) 102 include or correspond to one or more additional spars 1804. In the fifteenth example, the first fastener(s) 136 include or correspond to ridges (e.g., keys) on an inner surface a sleeve 2008 of the hinge member(s) 106. The inner surface of the sleeve 2008 also includes ridges 2010, which engage and slide within grooves 2012 of a body 2014. The body 2014 is stationary relative to the structure(s) 102. In the implementation illustrated in FIGS. 20B and 20C, the components 2002 of the indexing mechanism 110 include a plurality of first fasteners 136 (e.g., a plurality of keys) arranged about a ring that is concentric with the rotational axis 108.

In the fifteenth example, the second fastener(s) 138 include or correspond to recesses (e.g., keyways) formed on a spline 2006 of the hinge member(s) 106. The spline 2006 is stationary relative to the movable airfoil 104. When the first fastener(s) 136 are engaged with the second fastener(s) 138, the sleeve 2008 couples the spline 2006 to the body 2014 such that the movable airfoil 104 is not rotatable relative to the structure(s) 102. When the first fastener(s) 136 are not engaged with the second fastener(s) 138, the spline 2006 and the body 2014 can move relative to one another (along interface 2020), enabling the movable airfoil 104 to rotate about the rotational axis 108 relative to the structure(s) 102. In the implementation illustrated in FIGS. 20A-20B, biasing member(s) 142 coupled to the sleeve 2008 are configured to urge the sleeve 2008 toward the spline 2006.

In the implementation illustrated in FIGS. 20B and 20C, the components 2002 of the indexing mechanism 110 include a plurality of first fasteners 136 and a plurality of second fasteners 138 (e.g., a plurality of keyways) arranged about a ring that is concentric with the rotational axis 108. In some implementations, a count of the number of second fasteners 138 (e.g., keyways) of the spline 2006 is equal to a count of the number of first fasteners 136 (e.g., keys). In other implementations, the count of the number of second fasteners 138 (e.g., keyways) of the spline 2006 is not equal to the count of the number of first fasteners 136 (e.g., keyways). For example, the count of the number of second fasteners 138 (e.g., keyways) may be an integer multiple of the count of the number of first fasteners 136 (e.g., keyways).

FIGS. 20B and 20C illustrate aspects of operation of the components 2002 as the movable airfoil 104 transitions between the second position 124 and the first position 122. FIG. 20B illustrates the components 2002 in the first state 114 and arranged to dispose the movable airfoil 104 in the second position 124. In FIG. 20B, the first fastener(s) 136 engage with the second fastener 138, thus preventing rotation of the movable airfoil 104 relative to the structure(s) 102.

FIG. 20C illustrates the components 2002 in the second state 116. For example, to transition from the arrangement illustrated in FIG. 20B to the arrangement illustrated in FIG. 20C, the actuator 112 extends a rod 710 and overcomes force applied by the biasing member(s) to cause the sleeve 2008 to slide toward the body 2014, which disengages the first and second fasteners 136, 138. Thus, in the fifteenth example, the rod 170 and the first fastener(s) 136 move in a direction that is substantially parallel to the rotational axis 108 to transition between the first and second states 114, 116.

With the components 2002 in the second state 116 (as illustrated in FIG. 20C), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both. When the second fastener(s) 138 are substantially aligned with the first fastener(s) 136 at a particular indexed position, the actuator(s) 112 retracts the rod 710 to allow the sleeve 2008 to slide toward the spline 2006. In the fifteenth example, the first and second fasteners 136, 138 are shaped to facilitate aligned engagement of the first and second fasteners 136, 138. For example, the second fasteners 138 in FIG. 20C are angled or beveled (e.g., funnel shaped) to guide the first fasteners 136 into engagement even if the first and second fasteners 136, 138 are not perfectly aligned when the sleeve 2008 begins moving toward the spline 2006.

The position sensor(s) 126, the state sensor(s) 128, the alignment sensor 130, the flight control computer 132, and the control surface 144 are not illustrated in FIGS. 20A-20C; however, the position sensor(s) 126, the state sensor(s) 128, the alignment sensor 130, the flight control computer 132, the control surface 144, or any combination thereof, may be present in an aircraft 100 according to the fifteenth example of FIGS. 20A-20C. If present, the position sensor(s) 126, the state sensor(s) 128, the alignment sensor 130, the flight control computer 132 and/or the control surface 144 operate as described with reference to FIGS. 1 and 6A-6C.

Figure 21A:
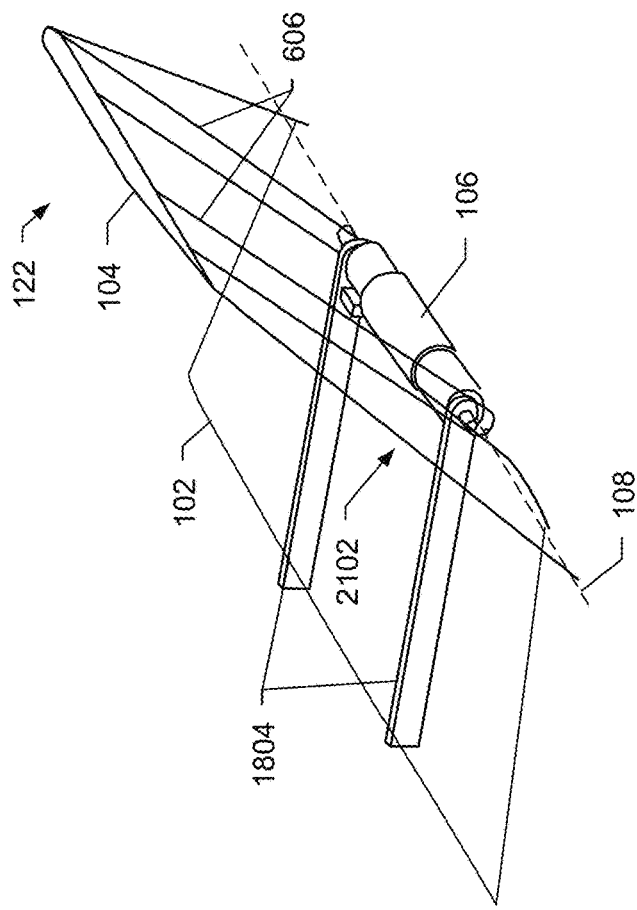
FIG. 21A is a diagram that schematically illustrates a sixteenth example of the movable airfoil of the aircraft of FIG. 1 according to particular aspects.
Figure 21B:
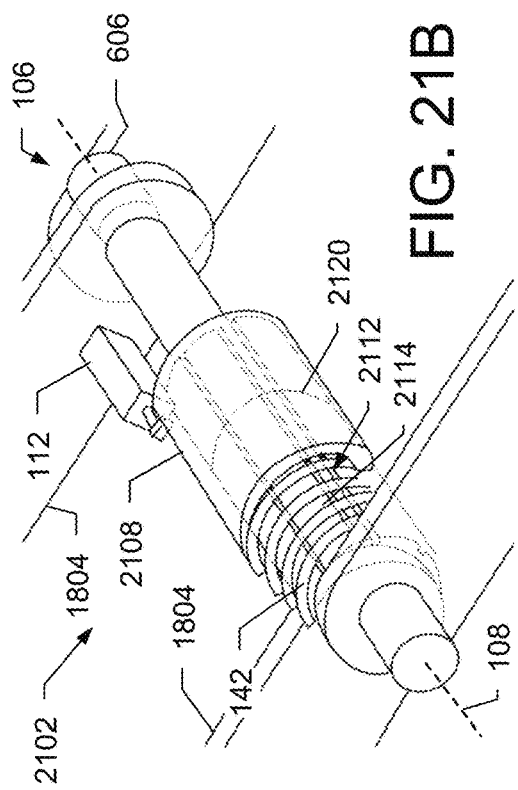
FIGS. 21B and 21C are diagrams that together schematically illustrate aspects of operation of the sixteenth example of the movable airfoil of FIG. 21A.
Figure 21C:
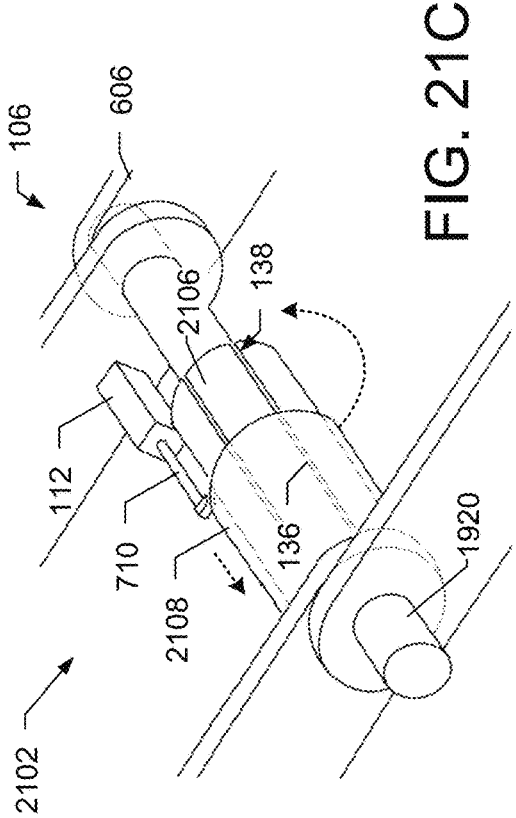

FIGS. 21A, 21B, and 21C schematically illustrate operation of a sixteenth example of a movable airfoil 104 of the aircraft of FIG. 1 according to particular aspects. The sixteenth example of the movable airfoil 104 illustrated in FIGS. 21A-21C may correspond to any of the movable airfoils described with reference to FIGS. 1-5B. FIG. 21A illustrates a perspective view of the sixteenth example in the first position 122. FIGS. 21B and 21C illustrate details of operation of components 2102 of a portion of the indexing mechanisms 110 of the sixteenth example. While FIGS. 21B and 21C illustrate only one instance of the components 2102 of the indexing mechanism 110, the sixteenth example of FIGS. 21A-21C may include more than one instance of the components 2102.

In FIGS. 21A-21C, the movable airfoil 104 is coupled, via the hinge member(s) 106, to structure(s) 102 of the aircraft 100. Further, in the sixteenth example of FIGS. 21A-21C, the movable airfoil 104 is coupled to or includes one or more spars 606, and the structure(s) 102 include or correspond to one or more additional spars 1804. In the sixteenth example, the first fastener(s) 136 include or correspond to ridges (e.g., keys) on an inner surface a sleeve 2108 of the hinge member(s) 106. The first fastener(s) 136 are also configured to engage and slide within grooves 2112 of a body 2114. The body 2114 is stationary relative to the structure(s) 102. In the implementation illustrated in FIGS. 21B and 21C, the components 2102 of the indexing mechanism 110 include a plurality of first fasteners 136 (e.g., a plurality of keys) arranged about a ring that is concentric with the rotational axis 108.

In the sixteenth example, the second fastener(s) 138 include or correspond to recesses (e.g., keyways) formed on a spline 2106 of the hinge member(s) 106. The spline 2106 is stationary relative to the movable airfoil 104. When the first fastener(s) 136 are engaged with the second fastener(s) 138, the sleeve 2108 couples the spline 2106 to the body 2114 such that the movable airfoil 104 is not rotatable relative to the structure(s) 102. When the first fastener(s) 136 are not engaged with the second fastener(s) 138, the spline 2106 and the body 2114 can move relative to one another (along interface 2120), enabling the movable airfoil 104 to rotate about the rotational axis 108 relative to the structure(s) 102. In the implementation illustrated in FIGS. 21A-21B, biasing member(s) 142 coupled to the sleeve 2108 are configured to urge the sleeve 2108 toward the spline 2106.

In the implementation illustrated in FIGS. 21B and 21C, the components 2102 of the indexing mechanism 110 include a plurality of first fasteners 136 and a plurality of second fasteners 138 (e.g., a plurality of keyways) arranged about a ring that is concentric with the rotational axis 108. In some implementations, a count of the number of second fasteners 138 (e.g., keyways) of the spline 2106 is equal to a count of the number of first fasteners 136 (e.g., keys). In other implementations, the count of the number of second fasteners 138 (e.g., keyways) of the spline 2106 is not equal to the count of the number of first fasteners 136 (e.g., keyways). For example, the count of the number of second fasteners 138 (e.g., keyways) may be an integer multiple of the count of the number of first fasteners 136 (e.g., keyways).

FIGS. 21B and 21C illustrate aspects of operation of the components 2102 as the movable airfoil 104 transitions between the second position 124 and the first position 122. FIG. 21B illustrates the components 2102 in the first state 114 and arranged to dispose the movable airfoil 104 in the second position 124. In FIG. 21B, the first fastener(s) 136 engage with the second fastener 138, thus preventing rotation of the movable airfoil 104 relative to the structure(s) 102.

FIG. 21C illustrates the components 2102 in the second state 116. For example, to transition from the arrangement illustrated in FIG. 21B to the arrangement illustrated in FIG. 21C, the actuator 112 extends a rod 710 and overcomes force applied by the biasing member(s) 142 to cause the sleeve 2108 to slide toward the body 2114, which disengages the first and second fasteners 136, 138. Thus, in the sixteenth example, the rod 170 and the first fastener(s) 136 move in a direction that is substantially parallel to the rotational axis 108 to transition between the first and second states 114, 116.

With the components 2102 in the second state 116 (as illustrated in FIG. 21C), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both. When the second fastener(s) 138 are substantially aligned with the first fastener(s) 136 at a particular indexed position, the actuator(s) 112 retracts the rod 710 to allow the sleeve 2108 to slide toward the spline 2106. In some implementations of the sixteenth example, the first and second fasteners 136, 138 are shaped to facilitate aligned engagement of the first and second fasteners 136, 138. For example, the second fasteners 138 in FIG. 21C may be angled or beveled (e.g., funnel shaped) to guide the first fasteners 136 into engagement even if the first and second fasteners 136, 138 are not perfectly aligned when the sleeve 2108 begins moving toward the spline 2106.

The position sensor(s) 126, the state sensor(s) 128, the alignment sensor 130, the flight control computer 132, and the control surface 144 are not illustrated in FIGS. 21A-21C; however, the position sensor(s) 126, the state sensor(s) 128, the alignment sensor 130, the flight control computer 132, the control surface 144, or any combination thereof, may be present in an aircraft 100 according to the sixteenth example of FIGS. 21A-21C. If present, the position sensor(s) 126, the state sensor(s) 128, the alignment sensor 130, the flight control computer 132 and/or the control surface 144 operate as described with reference to FIGS. 1 and 6A-6C.

FIGS. 22A, 22B, and 22C schematically illustrate operation of a seventeenth example of a movable airfoil 104 of the aircraft of FIG. 1 according to particular aspects. The seventeenth example of the movable airfoil 104 illustrated in FIGS. 22A-22C may correspond to any of the movable airfoils described with reference to FIGS. 1-5B. FIG. 22A illustrates a perspective view of the seventeenth example in the first position 122. FIGS. 22B and 22C illustrate details of operation of components 2202 of a portion of the indexing mechanisms 110 of the seventeenth example. While FIGS. 22B and 22C illustrate only one instance of the components 2202 of the indexing mechanism 110, the seventeenth example of FIGS. 22A-22C may include more than one instance of the components 2202.

In FIGS. 22A-22C, the movable airfoil 104 is coupled, via the hinge member(s) 106, to structure(s) 102 of the aircraft 100. Further, in the seventeenth example of FIGS. 22A-22C, the movable airfoil 104 is coupled to or includes one or more spars 606, and the structure(s) 102 include or correspond to one or more additional spars 1804.

In the seventeenth example, the components 2202 include a pair of friction surfaces 140, including a first friction surface 140A of a first friction plate 2204A and a second friction surface 140B of a second friction plate 2204B. The first friction plate 2204A is coupled to the structure(s) 102 (e.g., to one or more of the spars 1804) in a fixed relative orientation, and the second friction plate 2204B is coupled to the movable airfoil 104 in a fixed relative orientation. Thus, inhibiting rotation of the second friction plate 2204B about the rotational axis 108 inhibits movement of the movable airfoil 104 about the rotational axis 108.

The first friction surface 140A and the second friction surface 140B are configured to have a high coefficient of friction when in contact with one another. The biasing member(s) 142 are positioned to apply a force to the second friction plate 2204B that tends to push the second friction surface 140B toward the first friction surface 140A. In a particular aspect, when unopposed (e.g., by force applied by the actuator(s) 112), the force applied by the biasing member (s) 142 is sufficient to hold the movable airfoil 104 in a fixed position relative to the structure(s) 102 despite aerodynamic forces 146 encountered by the aircraft 100 during flight. In another particular aspect, the seventeenth example may be used in combination with one or more other indexing mechanisms 110, as described with reference to any of FIG. 6A-21C or 24A-35C. As an illustrative example, the components 2202 and the components 2102 of the sixteenth example of FIGS. 21A-21C may each be positioned along the rotational axis 108. In this illustrative example, the components 2202 and the components 2102 cooperate to enable and/or disable rotation of the movable airfoil 104. To illustrate, when the friction surfaces 140 of FIGS. 22A-22C are in contact with one another and the first and second fasteners 136, 138 are engaged with one another, the movable airfoil 104 is not able to rotate about the rotational axis 108. When the first and second fasteners 136, 138 are disengaged, contact between the friction surfaces 140 can be controlled to limit the rate of movement of the movable airfoil 104 about the rotational axis 108, to stop movement of the movement of the movable airfoil 104 about the rotational axis 108 to align and engage the first and second fastener 136, 138, or both. Although this illustrative example describes combined used of the sixteenth and seventeenth examples, the seventeenth example can be used in combination with any of the first through sixteenth examples or any of the nineteenth through thirtieth examples.

FIGS. 22B and 22C illustrate aspects of operation of the components 2202 as the movable airfoil 104 transitions between the second position 124 and the first position 122. FIG. 22B illustrates the components 2202 in the first state 114. In the first state 114, the first and second friction surfaces 140 are in contact with one another with sufficient force to inhibit rotation of the movable airfoil 104. Although the seventeenth example illustrates the biasing member(s) 142 applying braking force (e.g., force that tends to push the second friction surface 140B into contact with the first friction surface 140A); in other examples, the actuator(s) 112 applies the braking force and the biasing member(s) 142 apply a force that tends to separate the friction surfaces 140.

FIG. 22C illustrates the components 2202 in the second state 116. For example, to transition from the arrangement illustrated in FIG. 22B to the arrangement illustrated in FIG. 22C, the actuator 112 extends a rod 710 and overcomes force applied by the biasing member(s) 142 to cause the second friction plate 2204B to move away from the first friction plate 2204A. Thus, in the seventeenth example, the rod 710 moves in a direction that is substantially parallel to the rotational axis 108 to transition between the first and second states 114, 116.

The position sensor(s) 126, the state sensor(s) 128, the alignment sensor 130, the flight control computer 132, and the control surface 144 are not illustrated in FIGS. 22A-22C; however, the position sensor(s) 126, the state sensor(s) 128, the alignment sensor 130, the flight control computer 132, the control surface 144, or any combination thereof, may be present in an aircraft 100 according to the seventeenth example of FIGS. 22A-22C. If present, the position sensor (s) 126, the state sensor(s) 128, the alignment sensor 130, the flight control computer 132 and/or the control surface 144 operate as described with reference to FIGS. 1 and 6A-6C.

FIGS. 23A, 23B, and 23C schematically illustrate operation of an eighteenth example of a movable airfoil 104 of the aircraft of FIG. 1 according to particular aspects. The eighteenth example of the movable airfoil 104 illustrated in FIGS. 23A-23C may correspond to any of the movable airfoils described with reference to FIGS. 1-5B. FIG. 23A illustrates a perspective view of the eighteenth example in the first position 122. FIGS. 23B and 23C illustrate details of operation of components 2302 of a portion of the indexing mechanisms 110 of the eighteenth example. While FIGS. 23B and 23C illustrate only one instance of the components 2302 of the indexing mechanism 110, the eighteenth example of FIGS. 23A-23C may include more than one instance of the components 2302.

In FIGS. 23A-23C, the movable airfoil 104 is coupled, via the hinge member(s) 106, to structure(s) 102 of the aircraft 100. Further, in the eighteenth example of FIGS. 23A-23C, the movable airfoil 104 is coupled to or includes one or more spars 606, and the structure(s) 102 include or correspond to one or more additional spars 1804.

In the eighteenth example, the components 2302 include multiple sets of paired friction surfaces 140, including friction surfaces coupled to one or more of the spar(s) 606 and friction surfaces of pads 2304 coupled to the structure(s) 102 (e.g., to one or more of the spar(s) 1804). In FIGS. 23B and 23C, each of the pads 2304 is coupled to a pair of actuators 112. To illustrate, pad 2304A is coupled to actuators 112A and 112B, and the pad 2304E is coupled to the actuators 112C and 112D. Likewise, pads 2304B, 2304C, 2304D, and corresponding pads (not shown) on the other side of the spar 606 in the views illustrated in FIGS. 23A-23B, are each coupled to a pair of actuators 112. The pads 2304 are coupled to the structure(s) 102 (e.g., to one or more of the spars 1804) in a fixed relative orientation. The friction surfaces (e.g., friction surface 140C) of the spar 606 in FIGS. 23B and 23C are integral with or connected in a fixed relative orientation to the spar 606. Only friction surface 140C of the spar 606 is visible in the view illustrated in FIGS. 23B and 23C; however, the spar 606 includes another friction surface (not shown) on the side opposite the friction surface 140C and positioned to interact with friction surface 140A of pad 2304E.

The actuators 112 are configured to move the pads 2304 toward and away from the spar 606 (e.g., to pinch the spar 606 therebetween or release the spar 606). When the spar 606 is pinched between the pads 2304, the friction surfaces (e.g., friction surfaces 140A of pad 2304E, friction surface 140C of pad 2304 C, the friction surfaces (not shown) of the pads 2304A, 2304B, 2304D, and the friction surfaces (not shown) of the pads (not shown) on the opposite side of the spar 606) contact the friction surfaces of the spar 606 (e.g., the friction surface 140B and the friction surface (not shown) on the opposite side of the spar 606), which inhibits movement of the movable airfoil 104 about the rotational axis 108.

In some implementations, the eighteenth example may be used in combination with one or more other indexing mechanisms 110, as described with reference to any of FIG. 6A-21C or 24A-35C. As an illustrative example, the components 2302 and the components 2102 of the sixteenth example of FIGS. 21A-21C may each be positioned along the rotational axis 108. In this illustrative example, the components 2302 and the components 2102 cooperate to enable and/or disable rotation of the movable airfoil 104. To illustrate, when the friction surfaces 140 of FIGS. 23A-23C are in contact with one another and the first and second fasteners 136, 138 are engaged with one another, the movable airfoil 104 is not able to rotate about the rotational axis 108. When the first and second fasteners 136, 138 are disengaged, contact between the friction surfaces 140 can be controlled to limit the rate of movement of the movable airfoil 104 about the rotational axis 108, to stop movement of the movement of the movable airfoil 104 about the rotational axis 108 to align and engage the first and second fastener 136, 138, or both. Although this illustrative example describes combined used of the sixteenth and eighteenth examples, the eighteenth example can be used in combination with any of the first through sixteenth examples or any of the nineteenth through thirtieth examples.

FIGS. 23B and 23C illustrate aspects of operation of the components 2302 as the movable airfoil 104 transitions between the second position 124 and the first position 122. FIG. 23B illustrates the components 2302 in the first state 114. In the first state 114, the friction surfaces 140 are in contact with one another with sufficient force to inhibit rotation of the movable airfoil 104. FIG. 23C illustrates the components 2302 in the second state 116. For example, to transition from the arrangement illustrated in FIG. 23B to the arrangement illustrated in FIG. 23C, the actuators 112 retract to cause the friction pads 2304 to move away from the friction surfaces of the spar 606. Thus, in the eighteenth example, the actuators 112 move in a direction that is substantially parallel to the rotational axis 108 to transition between the first and second states 114, 116.

The position sensor(s) 126, the state sensor(s) 128, the alignment sensor 130, the flight control computer 132, and the control surface 144 are not illustrated in FIGS. 23A-23C; however, the position sensor(s) 126, the state sensor(s) 128, the alignment sensor 130, the flight control computer 132, the control surface 144, or any combination thereof, may be present in an aircraft 100 according to the eighteenth example of FIGS. 23A-23C. If present, the position sensor(s) 126, the state sensor(s) 128, the alignment sensor 130, the flight control computer 132 and/or the control surface 144 operate as described with reference to FIGS. 1 and 6A-6C.

Figure 24D:
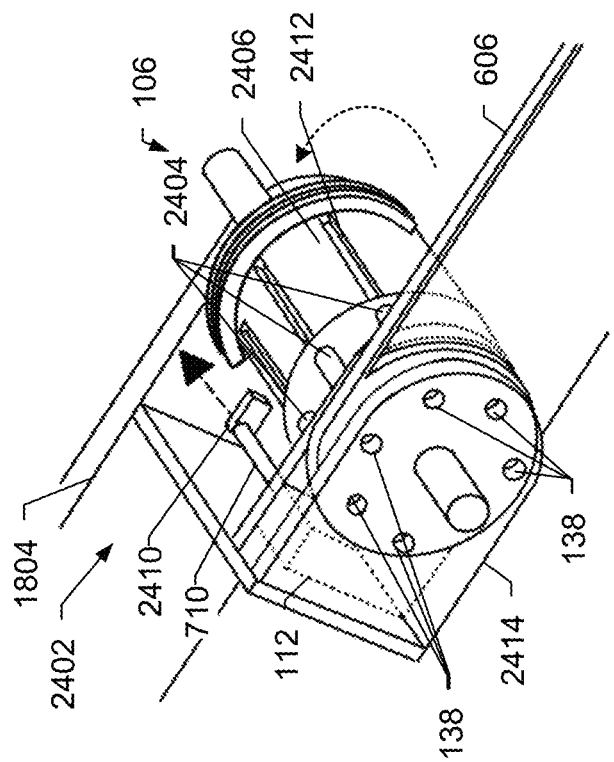
FIGS. 24C and 24D are diagrams that together schematically illustrate aspects of operation of the nineteenth example of the movable airfoil of FIG. 24A.
Figure 24C:
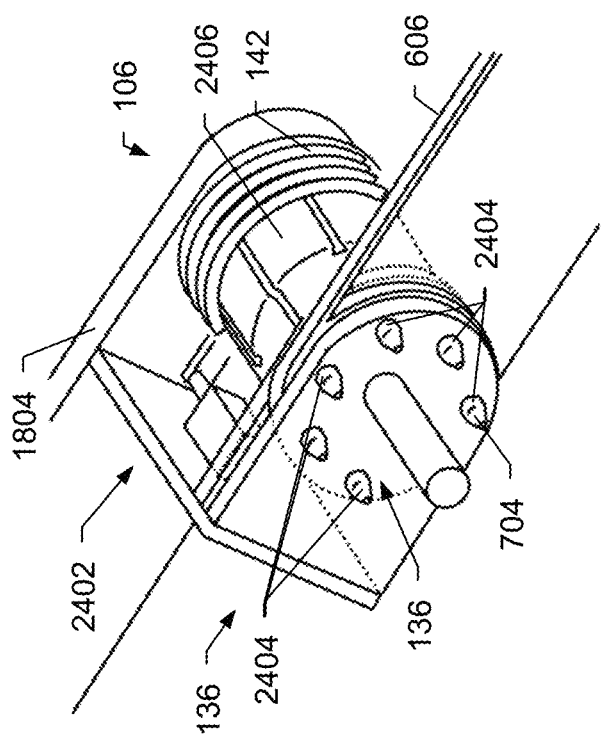

FIGS. 24A, 24B, 24C, and 24D schematically illustrate operation of a nineteenth example of a movable airfoil 104 of the aircraft of FIG. 1 according to particular aspects. The nineteenth example of the movable airfoil 104 illustrated in FIGS. 24A-24D may correspond to any of the movable airfoils described with reference to FIGS. 1-5B. FIG. 24A illustrates a perspective view of the nineteenth example in the first position 122. FIG. 24B illustrates a disassembled view of components 2402 of a portion of the indexing mechanisms 110 of the nineteenth example. FIGS. 24C and 24D illustrate details of operation of components 2402 of a portion of the indexing mechanisms 110 of the nineteenth example. While FIGS. 24B-24D illustrate only one instance of the components 2402 of the indexing mechanism 110, the nineteenth example of FIGS. 24A-24D may include more than one instance of the components 2402.

In FIGS. 24A-24D, the movable airfoil 104 is coupled, via the hinge member(s) 106, to structure(s) 102 of the aircraft 100. Further, in the nineteenth example of FIGS. 24A-24D, the movable airfoil 104 is coupled to or includes one or more spars 606, and the structure(s) 102 include or correspond to one or more additional spars 1804. In the nineteenth example, the first fastener(s) 136 include or correspond to a set of pins 2404 coupled to an end of a sleeve 2406. The sleeve 2406 includes keys 2450 on an inner surface. The keys 2450 are configured to engage keyways 2452 defined on a body 2454. The pins 2404 are arranged in a ring that is concentric with the rotational axis 108. The body 2454 is coupled to the structure(s) 102 (e.g., to the spar 1804) such that the body 2454 is not rotatable (relative to the structure(s) 102) about the rotational axis 108. The sleeve 2406 is slidable relative to the body 2454 and is prevented from rotating relative to the body 2454 due to engagement of the keys 2450 with the keyways 2452. The pins 2404 are integral with or coupled in fixed position relative to the sleeve 2406. Thus, if the sleeve 2406 slides along the rotational axis 108, the pins 2404 slide with the sleeve 2406.

In the nineteenth example, the second fasteners 138 include or correspond to receptacles for the pins 2404. In the example illustrated in FIGS. 24B-24D, the receptacles include through holes (e.g., exemplary hole 2460) of the spar 606, holes (e.g., exemplary hole 2462) through structure 2414 that is coupled to the spar 1804, and holes (e.g., exemplary hole 2464) through structure 2466 that is coupled to the spar 1804. When the fastener(s) 136 (e.g., the pins 2404) are engaged with the second fastener(s) 138 (e.g., the receptacles), as illustrated in FIG. 24C, the spar 606 (and therefore the movable airfoil 104) is not rotatable relative to the spar 1804 (and therefore the structure(s) 102). When the first fastener(s) 136 (e.g., the pins 2404) are not engaged with the second fastener(s) 138 (e.g., the receptacles), as illustrate in FIG. 24D, the movable airfoil 104 is free to rotate about the rotational axis 108 relative to the structure(s) 102.

In the implementation illustrated in FIGS. 24A-24D, the biasing member(s) 142 are coupled to the sleeve 2406 and configured to urge the sleeve 2406 toward a position corresponding to the first state 114 in which the fasteners 136, 138 are engaged. One or more actuators 112 are coupled to the sleeve 2406 (e.g., via a tab 2410) and configured to, when actuated, extend a rod 710 (e.g., in a direction parallel to the rotational axis 108) to oppose the force applied by the biasing member(s) 142 and to disengage the fasteners 136, 138. For example, the actuator(s) 112 cause the sleeve 2406 to slide on the body 2454 along the rotational axis 108 until the pins 2404 are free of the receptacles. To engage the fasteners 136, 138 (e.g., after rotation of the movable airfoil 104) the actuator(s) 112 retract the rod 710, and the force applied by the biasing member(s) 142 urges the sleeve 2406 to slide on the body 2454 along the rotational axis 108 toward the structure 2414. In some implementations, the pins 2404 include curved, beveled, or angled surface 704 to facilitate aligned engagement of the pins 2404 with the receptacles.

In the implementation illustrated in FIGS. 24B-24D, the components 2402 of the indexing mechanism 110 include a plurality of first fasteners 136 (e.g., the pins 2404) and a plurality of second fasteners 138 (e.g., the receptacles) arranged about a ring that is concentric with the rotational axis 108. In some implementations, a count of the number of second fasteners 138 (e.g., receptacles) is equal to a count of the number of first fasteners 136 (e.g., pins 2404). In other implementations, the count of the number of second fasteners 138 (e.g., receptacles) is not equal to the count of the number of first fasteners 136 (e.g., pins 2404). For example, the count of the number of second fasteners 138 (e.g., pins) may be an integer multiple of the count of the number of first fasteners 136 (e.g., receptacles). Further, the first fasteners 136 (e.g., receptacles) may be arranged to enable engagement of the fasteners 136, 138 at multiple angularly offset, indexed positions between the first position 122 and the second position 124.

FIGS. 24C and 24D illustrate aspects of operation of the components 2402 as the movable airfoil 104 transitions between the second position 124 and the first position 122. FIG. 24C illustrates the components 2402 in the first state 114 and arranged to dispose the movable airfoil 104 in the second position 124. In FIG. 24C, the first fasteners 136 engage with the second fasteners 138, thus preventing rotation of the movable airfoil 104 relative to the structure(s) 102. FIG. 24D illustrates the components 2402 in the second state 116.

With the components 2402 in the second state 116 (as illustrated in FIG. 24D), the movable airfoil 104 is free to rotate about the hinge member 106 until the movable airfoil 104 is disposed in a different indexed position, such as the second position 124 or an intermediate position between the first and second positions 122, 124. The number of intermediate indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both.

The position sensor(s) 126, the state sensor(s) 128, the alignment sensor 130, the flight control computer 132, and the control surface 144 are not illustrated in FIGS. 24A-24D; however, the position sensor(s) 126, the state sensor(s) 128, the alignment sensor 130, the flight control computer 132, the control surface 144, or any combination thereof, may be present in an aircraft 100 according to the nineteenth example of FIGS. 24A-24D. If present, the position sensor(s) 126, the state sensor(s) 128, the alignment sensor 130, the flight control computer 132 and/or the control surface 144 operate as described with reference to FIGS. 1 and 6A-6C.

Figure 25A:
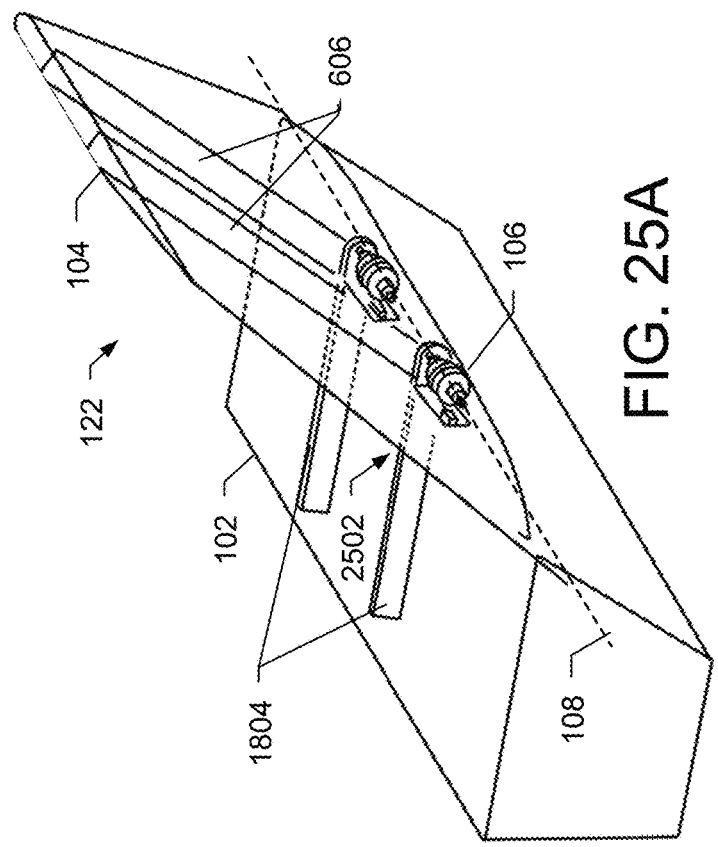
FIG. 25A is a diagram that schematically illustrates a twentieth example of the movable airfoil of the aircraft of FIG. 1 according to particular aspects.
Figure 25B:
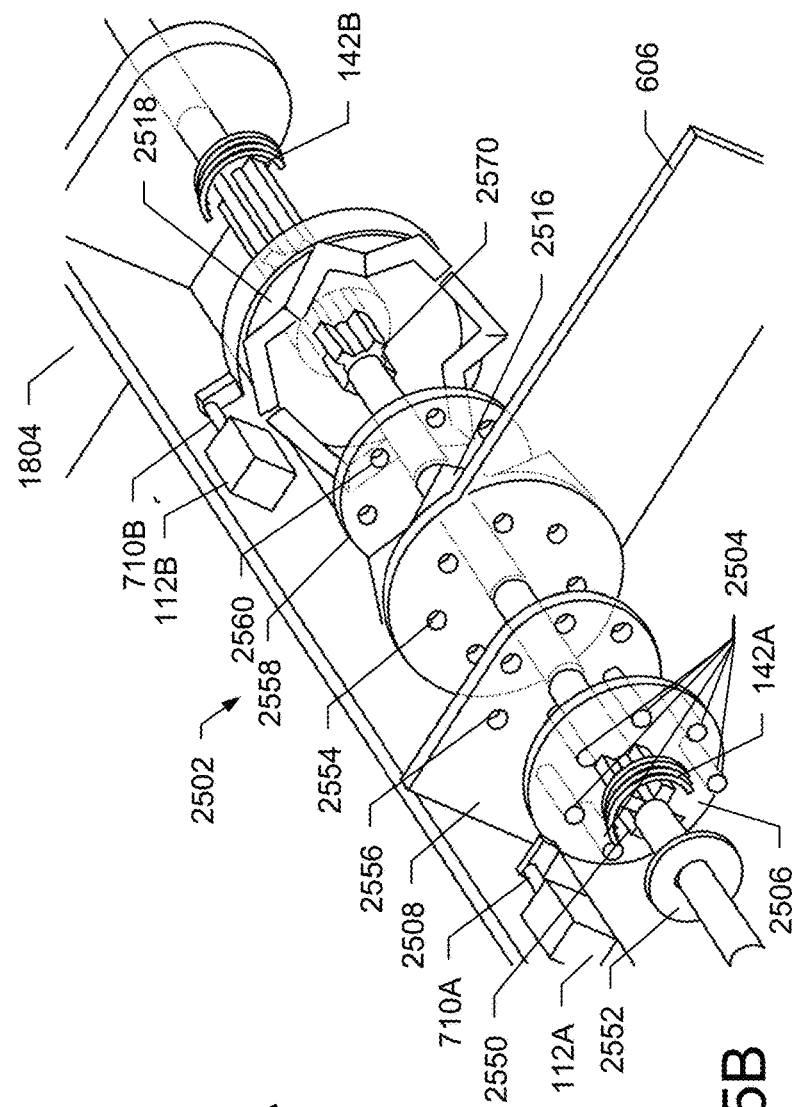
FIG. 25B is a diagram that schematically illustrates components of the twentieth example of the movable airfoil of the aircraft of FIG. 1 according to particular aspects.
Figure 25D:
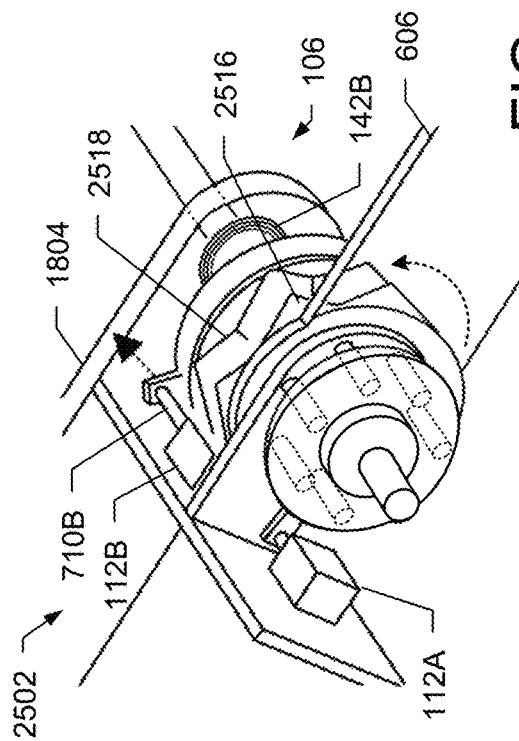
FIGS. 25C and 25D are diagrams that together schematically illustrate aspects of operation of the twentieth example of the movable airfoil of FIG. 25A.
Figure 25C:
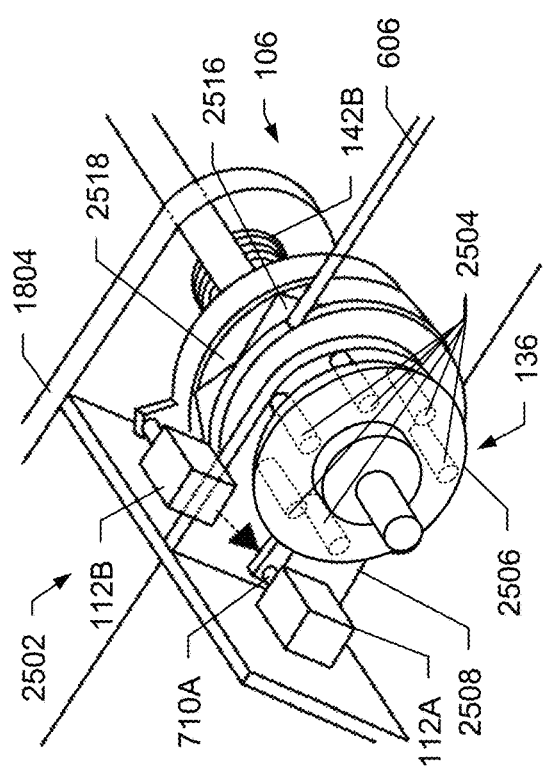

FIGS. 25A, 25B, 25C, and 25DD schematically illustrate operation of a twentieth example of a movable airfoil 104 of the aircraft of FIG. 1 according to particular aspects. The twentieth example of the movable airfoil 104 illustrated in FIGS. 25A-25D may correspond to any of the movable airfoils described with reference to FIGS. 1-5B. FIG. 25A illustrates a perspective view of the twentieth example in the first position 122. FIG. 25B illustrates a disassembled view of components 2502 of a portion of the indexing mechanisms 110 of the twentieth example. FIGS. 25C and 25D illustrate details of operation of components 2502 of a portion of the indexing mechanisms 110 of the twentieth example. While FIGS. 25B-25D illustrate only one instance of the components 2502 of the indexing mechanism 110, the twentieth example of FIGS. 25A-25D may include more than one instance of the components 2502.

In FIGS. 25A-25D, the movable airfoil 104 is coupled, via the hinge member(s) 106, to structure(s) 102 of the aircraft 100. Further, in the twentieth example of FIGS. 25A-25D, the movable airfoil 104 is coupled to or includes one or more spars 606, and the structure(s) 102 include or correspond to one or more additional spars 1804. In the twentieth example, the first fastener(s) 136 include or correspond to a set of pins 2504 coupled to a pin plate 2506. In the implementation illustrated in FIGS. 25B-25D, the pins 2504 are arranged in a ring that is concentric with the rotational axis 108. The pin plate 2506 is configured to slide along a spline 2550 and not rotatable (relative to the structure(s) 102) about the rotational axis 108. One or more biasing members 142A are coupled between the pin plate 2506 and a stop 2552 and configured to urge the pin plate 2506 toward a structure 2508 that is coupled to the spar(s) 1804. A first actuator 112A is coupled to the pin plate 2506 and configured to, when actuated, overcome a force applied by the biasing member(s) 142A to slide the pin plate 2506 toward the stop 2552.

In the twentieth example, the second fasteners 138 include or correspond to receptacles for the pins 2504. In the example illustrated in FIGS. 25B-25D, the receptacles include through holes through the spar 606 (e.g., exemplary hole 2554), holes through the structure 2508 (e.g., exemplary hole 2556), and holes through a plate 2558 (e.g., exemplary hole 2560). When the first fastener(s) 136 (e.g., the pins 2504) are engaged with the second fastener(s) 138 (e.g., the receptacles), the spar 606 (and therefore the movable airfoil 104) is not rotatable relative to the structure(s) 102 (e.g., relative to the spar 1804).

In the implementation illustrated in FIGS. 25A-25D, one or more biasing member 142B are coupled to a body 2518 and configured to urge the body 2518 toward a body 2516. The body 2516 is coupled to the movable airfoil 104 in a fixed position (e.g., does not rotate or translate relative to the spar 606). The body 2518 is able to slide along a direction parallel to the rotational axis 108 (e.g., along a keyed spline 2570) and is not rotatable about the rotational axis 108 relative to the structure(s) 102 (e.g., relative to the spar 1804). The body 2516 and the body 2518 have faces shaped to form a self-centering joint. For example, in FIGS. 25A-25D, the body 2516 includes crenelations, bevels, teeth, or other similar structures on a face adjacent to the body 2518, and the body 2518 includes complimentary structures on a face adjacent to the body 2516. When the fasteners 136, 138 are aligned, the faces of the bodies 2516, 2518 are aligned, and conversely, when the faces of the bodies 2516, 2518 are aligned, the fasteners 136, 138 are aligned. The biasing member(s) 142B are arranged to apply a force that urges the body 2518 toward the body 2516, and the faces of the bodies 2516, 2518, when pressed together by the force, tend to generate rotational components of force that tend to align the fasteners 136, 138.

One or more second actuators 112B are coupled to the body 2518 and configured to, when actuated, extend a rod 710 (e.g., in a direction parallel to the rotational axis 108) to oppose the force applied by the biasing member(s) 142B and to disengage the self-centering joint between the bodies 2516, 2518. For example, the second actuator(s) 112B cause the body 2518 to slide along the rotational axis 108 until the face of the body 2518 adjacent to the body 2516 is free to move without engaging the body 2516.

In the implementation illustrated in FIGS. 25B-25D, the components 2502 of the indexing mechanism 110 include a plurality of first fasteners 136 (e.g., the pins 2504) and a plurality of second fasteners 138 (not shown) arranged about a ring that is concentric with the rotational axis 108. In some implementations, a count of the number of second fasteners 138 (e.g., receptacles) is equal to a count of the number of first fasteners 136 (e.g., pins 2504). In other implementations, the count of the number of second fasteners 138 (e.g., receptacles) is not equal to the count of the number of first fasteners 136 (e.g., pins 2504). For example, the count of the number of second fasteners 138 (e.g., pins) may be an integer multiple of the count of the number of first fasteners 136 (e.g., receptacles). Further, the first fasteners 136 (e.g., receptacles) may be arranged to enable engagement of the fasteners 136, 138 at multiple angularly offset, indexed positions between the first position 122 and the second position 124.

FIGS. 25C and 25D illustrate aspects of operation of the components 2502 as the movable airfoil 104 transitions between the second position 124 and the first position 122. FIG. 25C illustrates the components 2502 in the first state 114 and arranged to dispose the movable airfoil 104 in the second position 124. In FIG. 25C, the first fasteners 136 are engaged with the second fasteners 138, thus preventing rotation of the movable airfoil 104 relative to the structure(s) 102. To disengage the fasteners 136, 138, the first actuator 112A retracts a first rod 710A to pull the pin plate 2506 away from the structure 2508 such that the pins 2504 retract from the receptacles through the spar 606. To complete transition to the second state 116, the second actuator 112B extends a second rod 710B to disengage the self-centering joint.

With the components 2502 in the second state 116, the movable airfoil 104 is free to rotate about the hinge member 106 until the movable airfoil 104 is disposed in a different indexed position, such as the first position 122 or an intermediate position between the first and second positions 122, 124. The number of intermediate indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both.

To return from the second state 116 to the first state 114, the second actuator 112B retracts the second rod 710B, and the biasing member(s) 142 push the body 2518 toward the body 2516. The self-centering joint between the bodies 2516, 2518 drives rotation of the movable airfoil 104 until the self-centering joint is seated and the fasteners 136, 138 are aligned. With the fasteners 136, 138 thus aligned, the first actuator 112A extends the rod 710A to engage the fasteners 136, 138 to return to the first state 114.

The position sensor(s) 126, the state sensor(s) 128, the alignment sensor 130, the flight control computer 132, and the control surface 144 are not illustrated in FIGS. 25A-25D; however, the position sensor(s) 126, the state sensor(s) 128, the alignment sensor 130, the flight control computer 132, the control surface 144, or any combination thereof, may be present in an aircraft 100 according to the twentieth example of FIGS. 25A-25D. If present, the position sensor(s) 126, the state sensor(s) 128, the alignment sensor 130, the flight control computer 132 and/or the control surface 144 operate as described with reference to FIGS. 1 and 6A-6C.

FIGS. 26A, 26B, and 26C schematically illustrate operation of a twenty-first example of a movable airfoil 104 of the aircraft of FIG. 1 according to particular aspects. The twenty-first example of the movable airfoil 104 illustrated in FIGS. 26A-26C may correspond to any of the movable airfoils described with reference to FIGS. 1-5B. FIG. 26A illustrates a perspective view of the twenty-first example in the first position 122. FIGS. 26B and 26C illustrate details of operation of components 2602 of a portion of the indexing mechanisms 110 of the twenty-first example. While FIGS. 26B and 26C illustrate only one instance of the components 2602 of the indexing mechanism 110, the twenty-first example of FIGS. 26A-26C may include more than one instance of the components 2602.

In FIGS. 26A-26C, the movable airfoil 104 is coupled, via the hinge member(s) 106, to structure(s) 102 of the aircraft 100. Further, in the twenty-first example of FIGS. 26A-26C, the movable airfoil 104 is coupled to or includes one or more spars 606, and the structure(s) 102 include or correspond to one or more additional spars 1804. In the twenty-first example, the first fastener(s) 136 include or correspond to a set of pins 2604 coupled to the movable airfoil 104 (e.g., to one or more of the spar(s) 606). In the implementation illustrated in FIGS. 26B and 26C, the pins 2604 are arranged in a ring that is concentric with the rotational axis 108. The pins 2604 are not movable relative to the movable airfoil 104. For example, the pins 2604 may be integral with or fixed to the spar 606.

In the twenty-first example, the second fasteners 138 include or correspond to receptacles 2610 for the pins 2604. In the example illustrated in FIGS. 26B and 26C, the receptacles 2610 include through holes in a plate 2608. The plate 2608 is coupled to the actuator(s) 112 via a linkage 2620. The linkage 2620 retains the plate 2608 in fixed orientation about the rotational axis 108 relative to the structure(s) 102 (e.g., relative to the spar 1804) and enables movement of the plate 2608 along a keyed spline 2622 in a direction parallel to the rotational axis 108.

In the implementation illustrated in FIGS. 26A-26C, the biasing member(s) 142 are coupled to the plate 2608 and configured to urge the plate 2608 toward the pins 2604. The actuators 112 are configured to, when actuated, extend a rod 710 (e.g., in a direction parallel to the rotational axis 108) to oppose the force applied by the biasing member(s) 142 and to cause the plate 2608 to slide along the keyed spline 2622 to disengage the pins 2604 from the receptacles 2610. When the fastener(s) 136 (e.g., the pins 2604) are engaged with the second fastener(s) 138 (e.g., the receptacles 2610), the spar 606 (and therefore the movable airfoil 104) is not rotatable relative to the spar 1804 (and therefore the structure(s) 102). Conversely, when the fastener(s) 136 (e.g., the pins 2604) are disengaged from the second fastener(s) 138 (e.g., the receptacles 2610), the spar 606 (and therefore the movable airfoil 104) is rotatable relative to the spar 1804 (and therefore the structure(s) 102).

In the implementation illustrated in FIGS. 26B and 26C, the components 2602 of the indexing mechanism 110 include a plurality of first fasteners 136 (e.g., the pins 2604) and a plurality of second fasteners 138 (e.g., the receptacles 2610) arranged about a ring that is concentric with the rotational axis 108. In some implementations, a count of the number of second fasteners 138 (e.g., the receptacles 2610) is equal to a count of the number of first fasteners 136 (e.g., the pins 2604). In other implementations, the count of the number of second fasteners 138 (e.g., the receptacles 2610) is not equal to the count of the number of first fasteners 136 (e.g., the pins 2604). For example, the count of the number of first fasteners 136 (e.g., the pins 2604) may be an integer multiple of the count of the number of second fasteners 138 (e.g., the receptacles 2610). Further, the fasteners 136, 138 may be arranged to enable engagement of the fasteners 136, 138 at multiple angularly offset, indexed positions between the first position 122 and the second position 124.

FIGS. 26B and 26C illustrate aspects of operation of the components 2602 as the movable airfoil 104 transitions between the second position 124 and the first position 122. FIG. 26B illustrates the components 2602 in the first state 114 and arranged to dispose the movable airfoil 104 in the second position 124. In FIG. 26B, the first fasteners 136 are engaged with the second fasteners 138, thus preventing rotation of the movable airfoil 104 relative to the structure(s) 102. To disengage the fasteners 136, 138, the actuator(s) 112 extend the rod 710. The rod 710 presses against an arm 2612 which causes the arm 2612 and a second arm 2614 of the linkage 2620 to rotate about a pivot point 2616 to move the plate 2608 away from the pins 2604.

With the components 2602 in the second state 116, the movable airfoil 104 is free to rotate about the hinge member 106 until the movable airfoil 104 is disposed in a different indexed position, such as the first position 122 or an intermediate position between the first and second positions 122, 124. The number of intermediate indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both.

To return from the second state 116 to the first state 114, the actuator(s) 112 retract the rod 710, and the biasing member(s) 142 push the plate 2608 toward the pins 2604. Although not shown in FIGS. 26A-26C, in some implementations, the pins 2604 include the curved, beveled, or angled surfaces 704 that facilitate alignment of the fasteners 136, 138.

The position sensor(s) 126, the state sensor(s) 128, the alignment sensor 130, the flight control computer 132, and the control surface 144 are not illustrated in FIGS. 26A-26C; however, the position sensor(s) 126, the state sensor(s) 128, the alignment sensor 130, the flight control computer 132, the control surface 144, or any combination thereof, may be present in an aircraft 100 according to the twenty-first example of FIGS. 26A-26C. If present, the position sensor(s) 126, the state sensor(s) 128, the alignment sensor 130, the flight control computer 132 and/or the control surface 144 operate as described with reference to FIGS. 1 and 6A-6C.

Figure 27A:
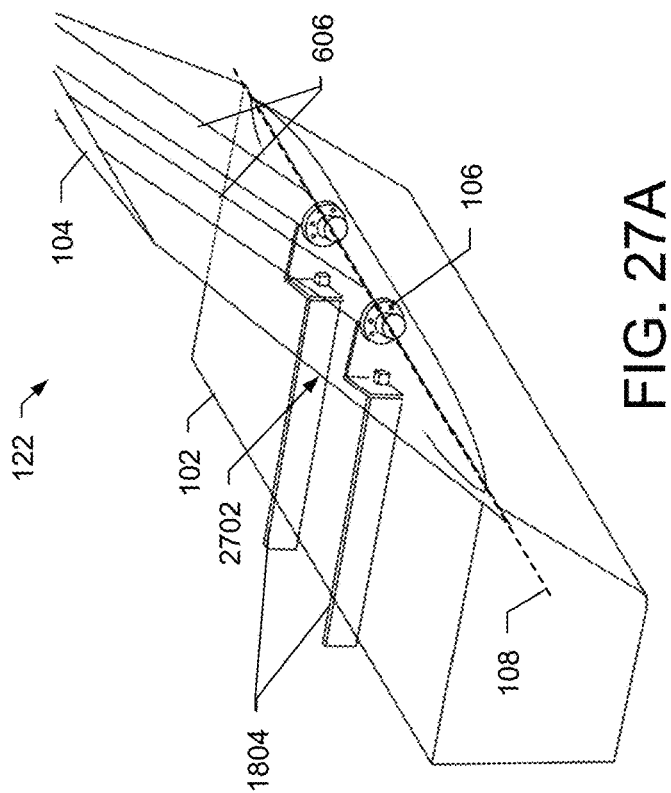
FIG. 27A is a diagram that schematically illustrates a twenty-second example of the movable airfoil of the aircraft of FIG. 1 according to particular aspects.
Figure 27B:
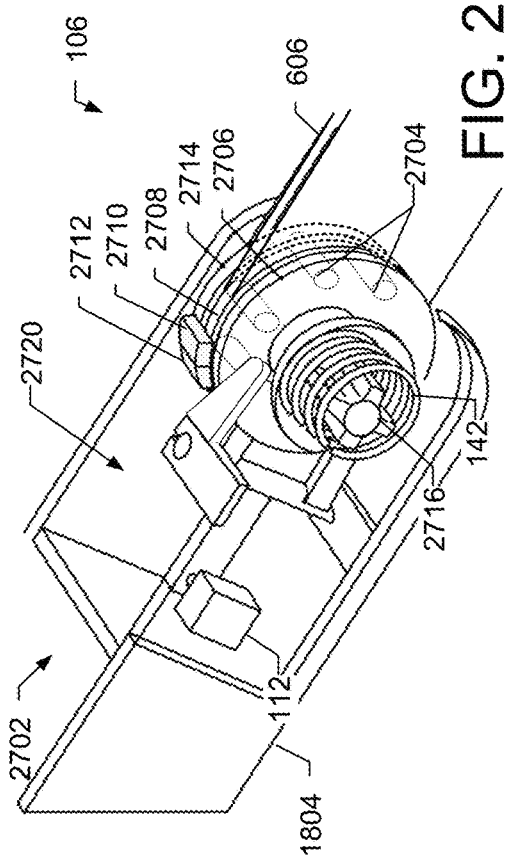
FIGS. 27B and 27C are diagrams that together schematically illustrate aspects of operation of the twenty-second example of the movable airfoil of FIG. 27A.
Figure 27C:
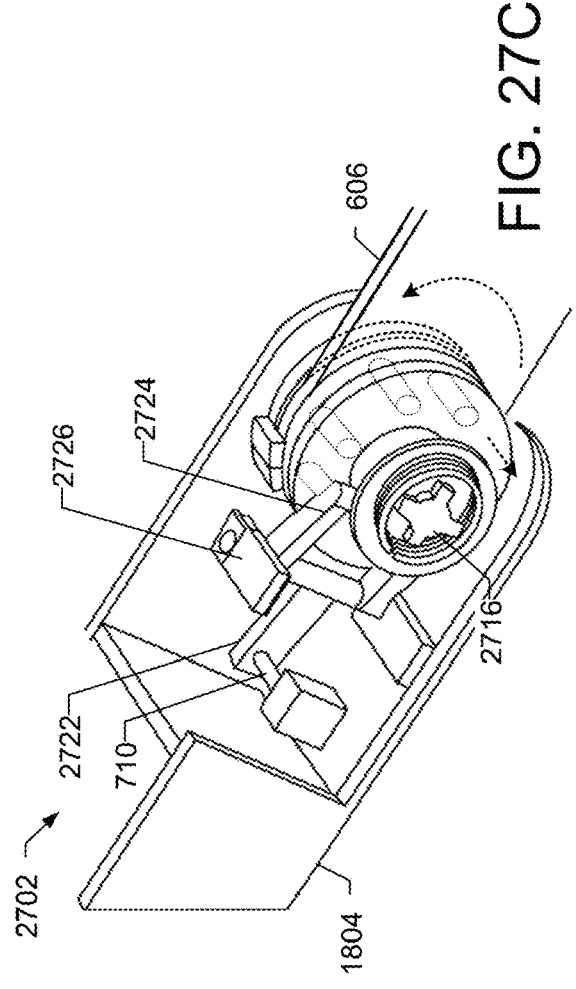

FIGS. 27A, 27B, and 27C schematically illustrate operation of a twenty-second example of a movable airfoil 104 of the aircraft of FIG. 1 according to particular aspects. The twenty-second example of the movable airfoil 104 illustrated in FIGS. 27A-27C may correspond to any of the movable airfoils described with reference to FIGS. 1-5B. FIG. 27A illustrates a perspective view of the twenty-second example in the first position 122. FIGS. 27B and 27C illustrate details of operation of components 2702 of a portion of the indexing mechanisms 110 of the twenty-second example. While FIGS. 27B and 27C illustrate only one instance of the components 2702 of the indexing mechanism 110, the twenty-second example of FIGS. 27A-27C may include more than one instance of the components 2702.

In FIGS. 27A-27C, the movable airfoil 104 is coupled, via the hinge member(s) 106, to structure(s) 102 of the aircraft 100. Further, in the twenty-second example of FIGS. 27A-27C, the movable airfoil 104 is coupled to or includes one or more spars 606, and the structure(s) 102 include or correspond to one or more additional spars 1804. In the twenty-second example, the first fastener(s) 136 include or correspond to a set of pins 2704 coupled to the movable airfoil 104 (e.g., to one or more of the spar(s) 606). In the implementation illustrated in FIGS. 27B and 27C, the pins 2704 are arranged in a ring that is concentric with the rotational axis 108. The pins 2704 are coupled to or integral with a pin plate 2706. The pin plate 2706 is slidable along a keyed spline 2716 but is not rotatable about the rotational axis 108 relative to the structure(s) 102. The pin plate 2706 is coupled to the actuator(s) 112 via a linkage 2720. The linkage 2720 retains the plate 2706 in fixed orientation about the rotational axis 108 relative to the structure(s) 102 (e.g., relative to the spar 1804) and enables movement of the plate 2706 along the keyed spline 2716 in a direction parallel to the rotational axis 108.

In the twenty-second example, the second fasteners 138 include or correspond to receptacles (not visible in the views illustrated in FIGS. 27A-27C, but complementary to the pins 2704 in the view illustrated in FIG. 27B). In the example illustrated in FIGS. 27B and 27C, the receptacles include through holes in a plate 2708. The plate 2708 is integral with or coupled to the spar 606 in a fixed relative position (e.g., the plate 2708 is not rotatable or translatable relative to the spar 606). The plate 2708 is rotatably coupled to a plate 2714 that is coupled to the structure(s) 102.

In the implementation illustrated in FIGS. 27A-27C, the biasing member(s) 142 are coupled to the plate 2706 and configured to urge the plate 2706 toward the plate 2708. The actuators 112 are configured to, when actuated, extend a rod 710 (e.g., in a direction parallel to the rotational axis 108) to oppose the force applied by the biasing member(s) 142 and to cause the plate 2706 to slide along the keyed spline 2716 to disengage the pins 2704 from the receptacles of the plate 2708. When the fastener(s) 136 (e.g., the pins 2704) are engaged with the second fastener(s) 138 (e.g., the receptacles of the plate 2708), the spar 606 (and therefore the movable airfoil 104) is not rotatable relative to the spar 1804 (and therefore the structure(s) 102). Conversely, when the fastener(s) 136 (e.g., the pins 2704) are disengaged from the second fastener(s) 138 (e.g., the receptacles of the plate 2708), the spar 606 (and therefore the movable airfoil 104) is rotatable relative to the spar 1804 (and therefore the structure(s) 102).

In the implementation illustrated in FIGS. 27B and 27C, the components 2702 of the indexing mechanism 110 include a plurality of first fasteners 136 (e.g., the pins 2704) and a plurality of second fasteners 138 (e.g., the receptacles of the plate 2708) arranged about a ring that is concentric with the rotational axis 108. In some implementations, a count of the number of second fasteners 138 (e.g., the receptacles of the plate 2708) is equal to a count of the number of first fasteners 136 (e.g., the pins 2704). In other implementations, the count of the number of second fasteners 138 (e.g., the receptacles of the plate 2708) is not equal to the count of the number of first fasteners 136 (e.g., the pins 2704). For example, the count of the number of first fasteners 136 (e.g., the pins 2704) may be an integer multiple of the count of the number of second fasteners 138 (e.g., the receptacles of the plate 2708). Further, the fasteners 136, 138 may be arranged to enable engagement of the fasteners 136, 138 at multiple angularly offset, indexed positions between the first position 122 and the second position 124. In the twenty-second example, the components include a first stop 2710 coupled to the plate 2714 and a second stop 2712 coupled to the plate 2708. The stops 2710, 2712 are positioned to limit rotation of the movable airfoil 104 about the rotational axis 108 to predefined limits. In some implementations, contact sensors may be coupled to the stops 2710, 2712 to act as position sensors 126. For example, when the stop 2712 contacts the stop 2710, a contact sensor may generate position data indicating that the movable airfoil 104 is at a particular indexed position (e.g., the second position 124).

FIGS. 27B and 27C illustrate aspects of operation of the components 2702 as the movable airfoil 104 transitions between the second position 124 and the first position 122. FIG. 27B illustrates the components 2702 in the first state 114 and arranged to dispose the movable airfoil 104 in the second position 124. In FIG. 27B, the first fasteners 136 are engaged with the second fasteners 138, thus preventing rotation of the movable airfoil 104 relative to the structure(s) 102. To disengage the fasteners 136, 138, the actuator(s) 112 extend the rod 710. The rod 710 presses against an arm 2722 which causes the arm 2722 and a second arm 2724 of the linkage 2720 to rotate about a pivot point 2726 to move the plate 2706 away from the plate 2708.

With the components 2702 in the second state 116, the movable airfoil 104 is free to rotate about the hinge member 106 until the movable airfoil 104 is disposed in a different indexed position, such as the first position 122 or an intermediate position between the first and second positions 122, 124. The number of intermediate indexed positions is based on the counts and distributions of the first and second fasteners 136, 138 and the range of motion allowed by the structure(s) 102 and the movable airfoil 104 or the range of motion allowed by the stops 2710, 2712 (and possibly additional stop). Rotation of the movable airfoil 104 may be driven by an actuator, by the aerodynamic forces 146 of FIG. 1, or both.

To return from the second state 116 to the first state 114, the actuator(s) 112 retract the rod 710, and the biasing member(s) 142 push the plate 2706 toward the plate 2708. Although not shown in FIGS. 27A-27C, in some implementations, the pins 2704 include the curved, beveled, or angled surfaces 704 that are facilitate alignment of the fasteners 136, 138.

The position sensor(s) 126, the state sensor(s) 128, the alignment sensor 130, the flight control computer 132, and the control surface 144 are not illustrated in FIGS. 27A-27C; however, the position sensor(s) 126, the state sensor(s) 128, the alignment sensor 130, the flight control computer 132, the control surface 144, or any combination thereof, may be present in an aircraft 100 according to the twenty-second example of FIGS. 27A-27C. If present, the position sensor(s) 126, the state sensor(s) 128, the alignment sensor 130, the flight control computer 132 and/or the control surface 144 operate as described with reference to FIGS. 1 and 6A-6C.

Figure 28D:
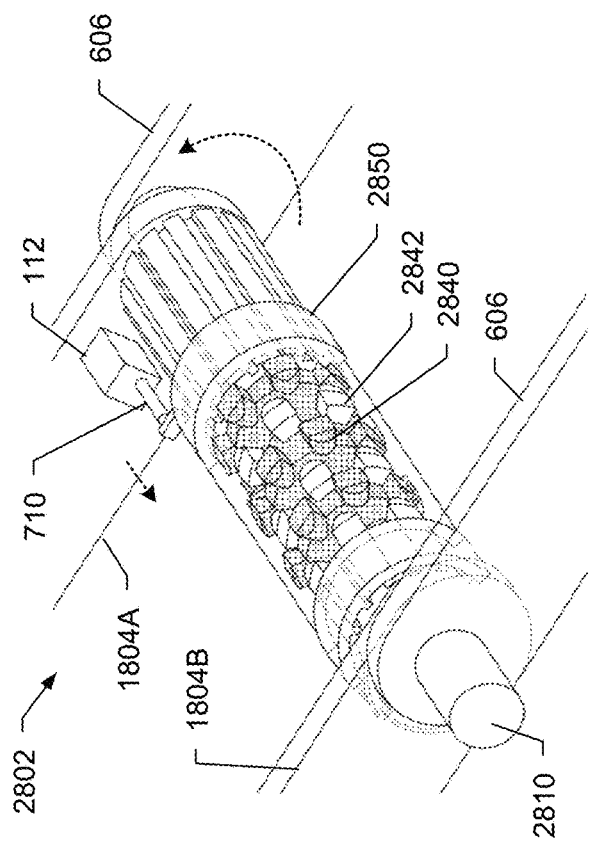
FIGS. 28C and 28D are diagrams that together schematically illustrate aspects of operation of the twenty-third example of the movable airfoil of FIG. 28A.
Figure 28C:
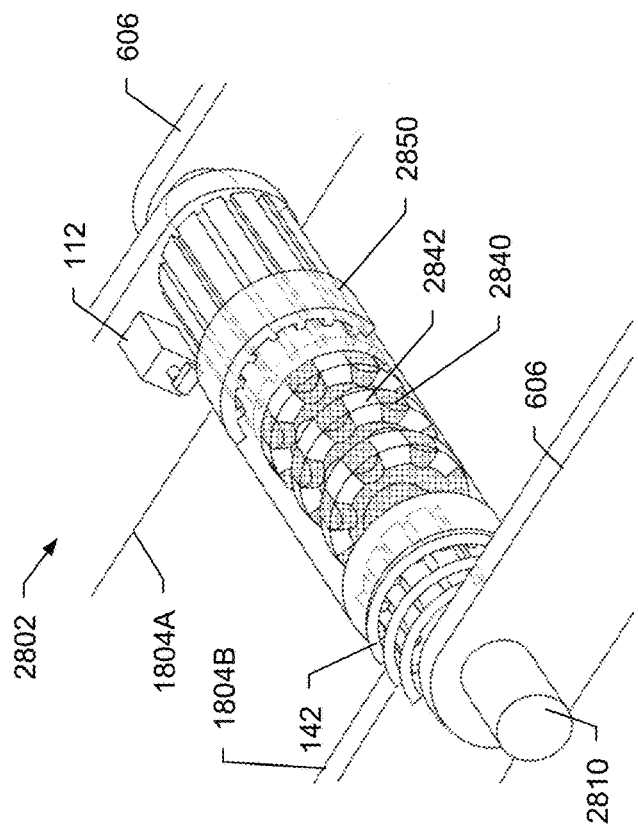

FIGS. 28A, 28B, 28C, and 28D schematically illustrate operation of a twenty-third example of a movable airfoil 104 of the aircraft of FIG. 1 according to particular aspects. The twenty-third example of the movable airfoil 104 illustrated in FIGS. 28A-28D may correspond to any of the movable airfoils described with reference to FIGS. 1-5B. FIG. 28A illustrates a perspective view of the twenty-third example in the first position 122. FIG. 28B illustrates a disassembled view of components 2802 of a portion of the indexing mechanisms 110 of the twenty-third example. FIGS. 28C and 28D illustrate details of operation of the components 2802 of the twenty-third example. While FIGS. 28A-28D illustrate only one instance of the components 2802 of the indexing mechanism 110, the twenty-third example of FIGS. 28A-28D may include more than one instance of the components 2802.

In FIGS. 28A-28D, the movable airfoil 104 is coupled, via the hinge member(s) 106, to structure(s) 102 of the aircraft 100. Further, in the twenty-third example of FIGS. 28A-28D, the movable airfoil 104 is coupled to or includes one or more spars 606, and the structure(s) 102 include or correspond to one or more additional spars 1804.

Referring to FIG. 28B, the components 2802 include a spline 2804 and a spline 2808, each of which is coupled in a fixed position relative to the structure(s) 102. To illustrate, in FIG. 28B, the spline 2804 is coupled to and is not movable relative to the spar 1804A, and the spline 2808 is coupled to and is not movable relative to spar 1804B. An axle 2810 extents through the splines 2804, 2808 and extends through openings 2812 in each for the spars 1804A and 1804B. The axle 2810 is illustrated in multiple separate axle segments (e.g., 2810A, 2810B, 2810C, 2810D, 2810E, and 2810F) in FIG. 28B for convenience of illustration. In general, a single axle 2810 extends between and through the spars 1804A, 1804B; however, multiple axle segments (e.g., 2810A, 2810B, 2810C, 2810D, 2810E, and 2810F) could be used to form the single axle 2810. The axle 2810 is rotatable relative to the structure(s) 102, the spars 1804, and the splines 2804, 2808. As illustrated in FIGS. 28C and 28D, the axle 2810 is coupled to the movable airfoil 104 (e.g., to the spar(s) 606) in a fixed relative position.

One or more gears 2806 (e.g., gears 2806A, 2806B, and 2806C in FIG. 28B) are coupled to the axle 2810 in a fixed relative position. That is, the gears 2806 rotate with the axle 2810 but do not rotate or translate relative to the axle 2810. Each gear 2806 includes a set of teeth 2840 arranged about a periphery of a body of the respective gear 2806. For example, gear 2806A includes teeth 2840A, gear 2806B includes teeth 2840B, and gear 2806C includes teeth 2840C.

When assembled, one or more sleeves 2850 encircle the gears 2806 and portions of the splines 2804. In FIG. 28B, the one or more sleeves 2850 are illustrated as sleeve segments 2820, 2832, and 2826. In some implementations, the sleeve segments 2820, 2832, and 2826 may be jointed as a single sleeve 2850. In other implementations, the sleeve segments 2820, 2832, and 2826 may be coupled together in fixed position relative to one another. Each sleeve segment 2820, 2832, and 2826 includes a set of teeth 2842 coupled to an interior surface of the respective sleeve segment 2820, 2832, and 2826 and configured to engage teeth 2840 of a respective one of the gears 2806. In some implementations, such as illustrated in FIGS. 28A-28D, the teeth 2840 and the teeth 2842 are shaped to facilitate aligned engagement of the teeth 2840 and the teeth 2842. For example, each tooth of the teeth 2840 may include an engagement surface facing the spline 2808, and each tooth of the teeth 2842 may include a corresponding engagement surface facing the spline 2804. The engagement surfaces include curved, beveled, or otherwise shaped surfaces that guide aligned engagement of the teeth 2840, 2842 if the teeth 2840, 2842 are slightly out of alignment as they come together to interlock.

Additionally, the sleeve segments 2820 includes keys 2822 configured to engage keyways 2824 of the spline 2804, and the sleeve segments 2826 includes keys 2828 configured to engage keyways 2830 of the spline 2808. Engagement of the keys 2822, 2828 and respective keyways 2824, 2830 retains the sleeve 2850 (and therefore the teeth 2842) in a fixed rotational position relative to the structure(s) 102 (e.g., relative to the spars 1804) but enables the sleeve 2850 to translate along a direction parallel to the rotational axis 108.

The biasing member(s) 142 encircle the spline 2808 and are coupled to the sleeve 2850 to apply a force that tends to push the sleeve 2850 toward the spar 1804A. The actuator(s) 112 are coupled to the spar 1804A and configured to, when actuated, apply a force to the sleeve 2850 to overcome the force applied by the biasing member(s) 142 and to cause the sleeve 2850 to move toward the spar 1804B.

In the twenty-third example, the first fastener(s) 136 include or correspond to the teeth 2842, and the second fastener(s) 138 include or correspond to the teeth 2840 of the gears 2806. FIG. 28C illustrates the components 2802 assembled and in the first state 114, and FIG. 28D illustrates the components 2802 assembled and in the second state 116. In FIGS. 28C and 28D, the gears 2806 are cross-hatched.

As shown in FIGS. 28C, when the actuator 112 is not actuated, the biasing member(s) 142 urge the sleeve 2850 toward the spar 1804A, which engages the teeth 2840, 2842. When the teeth 2840, 2842 are engaged, the keyed engagement of the sleeve 2850 and splines 2804, 2808 prevents the sleeve 2850 from rotating about the rotational axis 108, and the teeth 2842 of the sleeve 2850 prevent the gears 2806 (and therefore the axle 2810) from rotating about the rotational axis 108. Since the movable airfoil 104 is fixed relative to the axle 2810, the movable airfoil 104 is prevented from rotating about the rotational axis 108 in this position.

As shown in FIGS. 28D, to transition to the second state 116, the actuator 112 extends the rod 710 to push the sleeve 2850 toward the spar 1804B. In this position, the teeth 2840, 2842 are not engaged, and the axle 2810 is free to rotate relative to the structure(s) 102 (e.g., relative to the spars 1804A, 1804B). With the components 2802 in the second state 116 (as illustrated in FIG. 28D), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both. When the second fastener(s) 138 are aligned with the first fastener(s) 136 at a particular indexed position, the actuator(s) 112 retract the rod 710. The force applied by the biasing member(s) 142 drives the first and second fasteners 136, 138 into engagement to lock the movable airfoil 104 in the particular indexed position.

In the implementation illustrated in FIGS. 28A-28D, the components 2802 of the indexing mechanism 110 include a plurality of first fasteners 136 (e.g., the teeth 2842) and a plurality of second fasteners 138 (e.g., the teeth 2840) arranged about a ring that is concentric with the rotational axis 108. In some implementations, a count of the number of second fasteners 138 (e.g., the teeth 2840) is equal to a count of the number of first fasteners 136 (e.g., the teeth 2842). In other implementations, the count of the number of second fasteners 138 (e.g., the teeth 2840) is not equal to the count of the number of first fasteners 136 (e.g., the teeth 2842).

The position sensor(s) 126, the state sensor(s) 128, the alignment sensor 130, the flight control computer 132, and the control surface 144 are not illustrated in FIGS. 28A-28D; however, the position sensor(s) 126, the state sensor(s) 128, the alignment sensor 130, the flight control computer 132, the control surface 144, or any combination thereof, may be present in an aircraft 100 according to the twenty-third example of FIGS. 28A-28D. If present, the position sensor(s) 126, the state sensor(s) 128, the alignment sensor 130, the flight control computer 132 and/or the control surface 144 operate as described with reference to FIGS. 1 and 6A-6C.

Figure 29D:
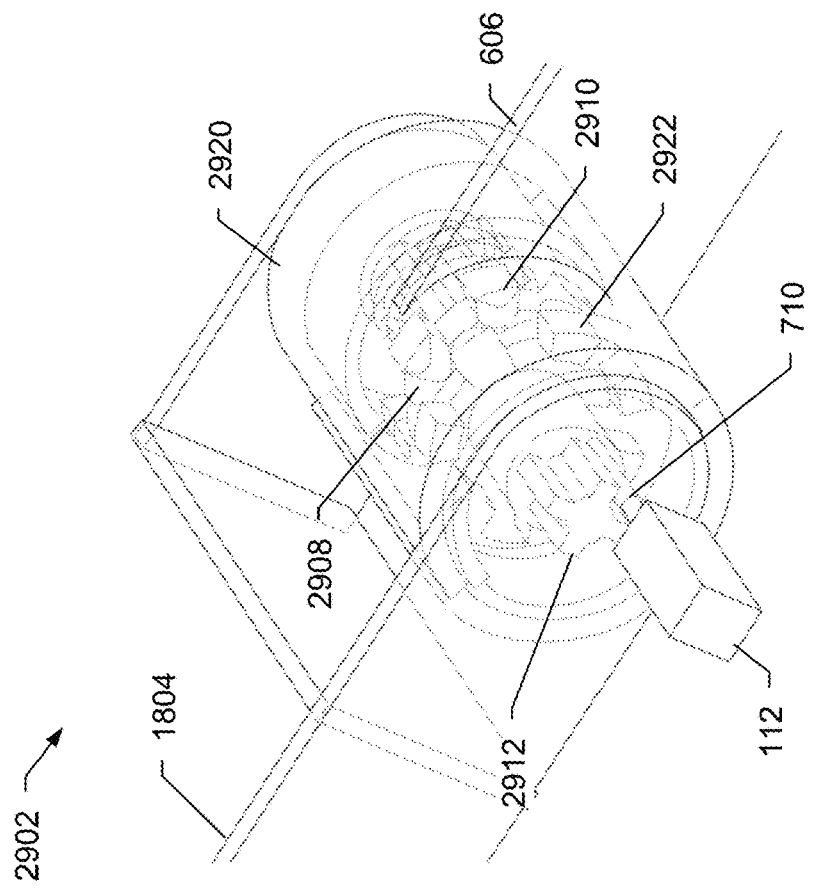
FIGS. 29C and 29D are diagrams that together schematically illustrate aspects of operation of the twenty-fourth example of the movable airfoil of FIG. 29A.
Figure 29C:
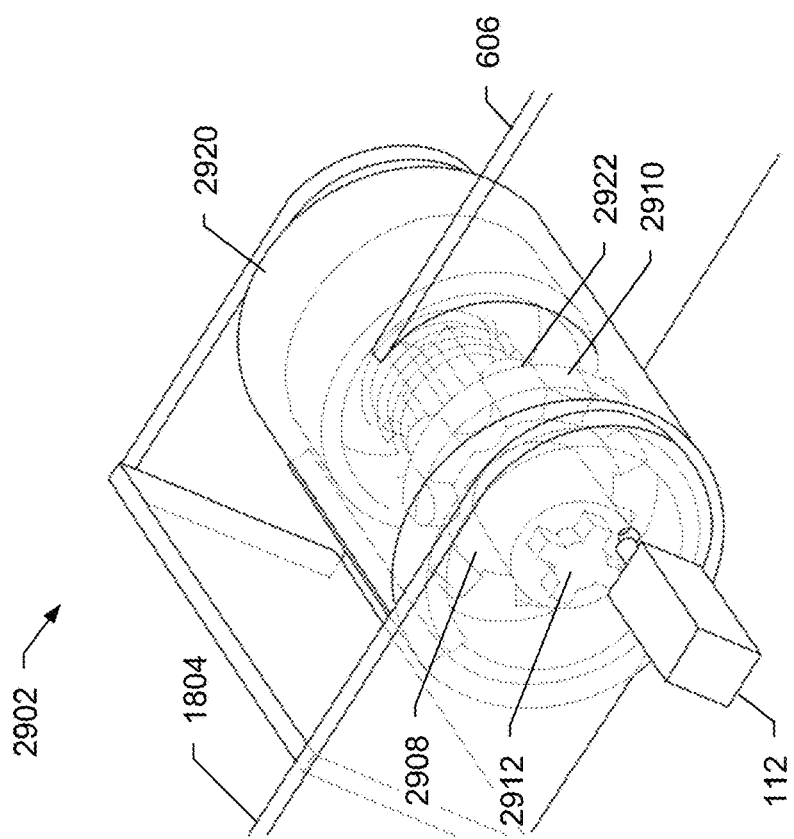

FIGS. 29A, 29B, 29C, and 29D schematically illustrate operation of a twenty-fourth example of a movable airfoil 104 of the aircraft of FIG. 1 according to particular aspects. The twenty-fourth example of the movable airfoil 104 illustrated in FIGS. 29A-29D may correspond to any of the movable airfoils described with reference to FIGS. 1-5B. FIG. 29A illustrates a perspective view of the twenty-fourth example in the first position 122. FIG. 29B illustrates a disassembled view of components 2902 of a portion of the indexing mechanisms 110 of the twenty-fourth example. FIGS. 29C and 29D illustrate details of operation of the components 2902 of the twenty-fourth example. While FIGS. 29A-29D illustrate only one instance of the components 2902 of the indexing mechanism 110, the twenty-fourth example of FIGS. 29A-29D may include more than one instance of the components 2902.

In FIGS. 29A-29D, the movable airfoil 104 is coupled, via the hinge member(s) 106, to structure(s) 102 of the aircraft 100. Further, in the twenty-fourth example of FIGS. 29A-29D, the movable airfoil 104 is coupled to or includes one or more spars 606, and the structure(s) 102 include or correspond to one or more additional spars 1804.

Referring to FIG. 29B, the components 2902 include a spline 2912 that is coupled in a fixed position relative to the structure(s) 102. To illustrate, in FIG. 29B, the spline 2912 is coupled to and is not movable relative to the spar 1804. One or more gears (such as a gear 2908) are coupled to the spline 2912. Keys 2914 of the spline 2912 engage keyways 2916 of the gear 2908 so that the gear 2908 is not able to rotate, relative to the spline 2912, about the rotational axis 108 but is able to translate (e.g., slide) along the spline 2912. Thus, the gear 2908 is retained in a fixed rotational position relative to the structure(s) 102 (e.g., relative to the spar 1804). The gear 2908 includes a set of teeth 2910 arranged about a periphery of a body of the gear 2908.

When assembled, a sleeve 2920 encircles the gear 2908 and the spline 2912. In FIG. 29B, the sleeve 2920 is split for illustrative purposes into a first segment 2920A and a second segment 2920B. In general, the segments 2920A, 2920B are portion of a single sleeve 2920. The sleeve 2920 is coupled to the movable airfoil 104 in a fixed relative position. When in the second state 116 (as described further below), the sleeve 2920 is rotatable about the rotational axis 108 on rotary coupling members 2904, 2906.

An inner surface of the sleeve 2920 includes a set of teeth 2922 that are configured to engage the teeth 2910 of the gears 2908. In some implementations, such as illustrated in FIGS. 29A-29D, the teeth 2910 and the teeth 2922 are shaped to facilitate aligned engagement teeth 2910 and the teeth 2922. For example, each tooth of the teeth 2910 may include an engagement surface, and each tooth of the teeth 2922 may include a corresponding engagement surface on a side adjacent to the engagement surfaces of the teeth 2910. The engagement surfaces include curved, beveled, or otherwise shaped surfaces that guide aligned engagement of the teeth 2910, 2922 if the teeth 2910, 2922 are slightly out of alignment as they come together to interlock.

The biasing member(s) 142 encircle the spline 2912 and are coupled to the gear 2908 to apply a force that tends to push the gear 2908 toward the teeth 2922 of the sleeve 2920. The actuator(s) 112 are coupled to the spar 1804 and configured to, when actuated, apply a force to the gear 2908 to overcome the force applied by the biasing member(s) 142 and to cause the gear 2908 to move along the spline 2912 to disengage the teeth 2910 of the gear 2908 from the teeth 2922 of the sleeve 2920.

In the twenty-fourth example, the first fastener(s) 136 include or correspond to the teeth 2922 of the sleeve 2920, and the second fastener(s) 138 include or correspond to the teeth 2910 of the gears 2908. FIG. 29C illustrates the components 2902 assembled and in the first state 114, and FIG. 29D illustrates the components 2902 assembled and in the second state 116.

As shown in FIGS. 29C, when the actuator 112 is not actuated, the biasing member(s) 142 urge the gear 2908 toward a position corresponding to the first state 114. In the first state 114, the teeth 2910 engage the teeth 2922. When the teeth 2910, 2922 are engaged, the keyed engagement of the gear 2908 and spline 2912 prevents the sleeve 2920 from rotating. Since the movable airfoil 104 is fixed relative to the sleeve 2920, the movable airfoil 104 is prevented from rotating about the rotational axis 108 in the first state 114.

As shown in FIGS. 29D, to transition to the second state 116, the actuator 112 extends the rod 710 to push the gear 2908 along the spline 2912 in a direction that disengages the teeth 2910, 2922. In the second state 116, the sleeve 2920 is free to rotate relative to the structure(s) 102 (e.g., relative to the spar 1804). With the components 2902 in the second state 116 (as illustrated in FIG. 29D), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both. When the second fastener(s) 138 are aligned with the first fastener(s) 136 at a particular indexed position, the actuator 112 retracts the rod 710. The force applied by the biasing member(s) 142 drives the first and second fasteners 136, 138 into engagement to lock the movable airfoil 104 in the particular indexed position.

In the implementation illustrated in FIGS. 29A-29D, the components 2902 of the indexing mechanism 110 include a plurality of first fasteners 136 (e.g., the teeth 2922) and a plurality of second fasteners 138 (e.g., the teeth 2910) arranged about a ring that is concentric with the rotational axis 108. In some implementations, a count of the number of second fasteners 138 (e.g., the teeth 2910) is equal to a count of the number of first fasteners 136 (e.g., the teeth 2922). In other implementations, the count of the number of second fasteners 138 (e.g., the teeth 2910) is not equal to the count of the number of first fasteners 136 (e.g., the teeth 2922).

The position sensor(s) 126, the state sensor(s) 128, the alignment sensor 130, the flight control computer 132, and the control surface 144 are not illustrated in FIGS. 29A-29D; however, the position sensor(s) 126, the state sensor(s) 128, the alignment sensor 130, the flight control computer 132, the control surface 144, or any combination thereof, may be present in an aircraft 100 according to the twenty-fourth example of FIGS. 29A-29D. If present, the position sensor(s) 126, the state sensor(s) 128, the alignment sensor 130, the flight control computer 132 and/or the control surface 144 operate as described with reference to FIGS. 1 and 6A-6C.

FIGS. 30A and 30B schematically illustrate operation of a twenty-fifth example of a movable airfoil 104 of the aircraft of FIG. 1 according to particular aspects. Components 3002 of the twenty-fifth example include each of the components 2902 described with reference to the twenty-fourth example of FIGS. 29A-29D, each of which operates as described with reference to FIGS. 29A-29D.

The components 3002 of the twenty-fifth example also include secondary locking pins 3030, actuator(s) 112B for the secondary locking pins 3030, and receptacles 3032 for the secondary locking pins 3030. The receptacles 3032 are disposed at various locations (associated with indexed positions) around the sleeve 2920. When the movable airfoil 104 is at a particular indexed position, a set of receptacles 3032 is aligned with the secondary locking pins 3030 to enable the actuator(s) 112B to insert the secondary locking pins 3030 through the sleeve 2920.

Figure 31A:
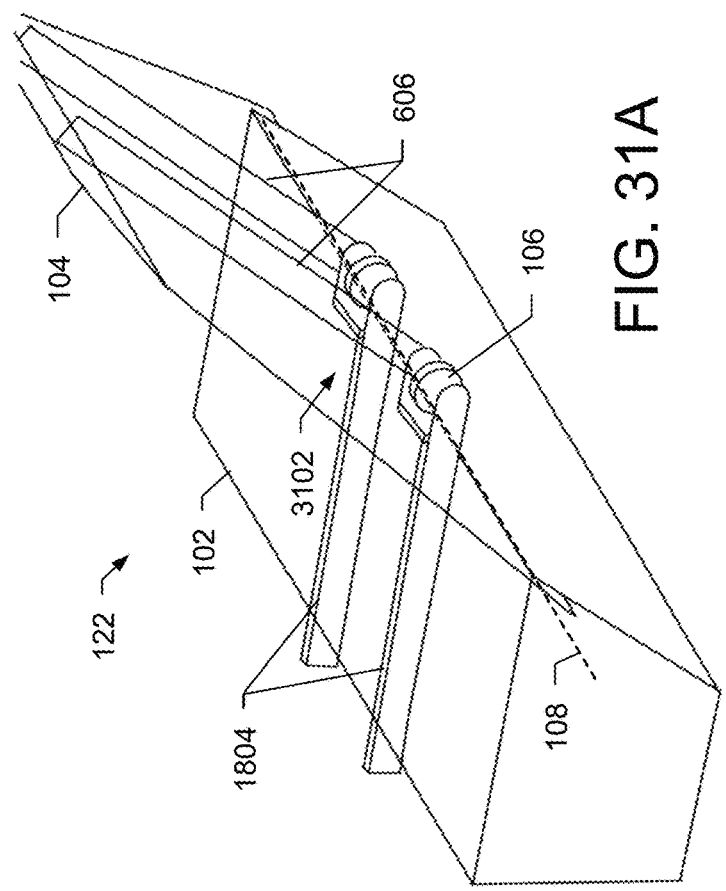
FIG. 31A is a diagram that schematically illustrates a twenty-sixth example of the movable airfoil of the aircraft of FIG. 1 according to particular aspects.
Figure 31B:
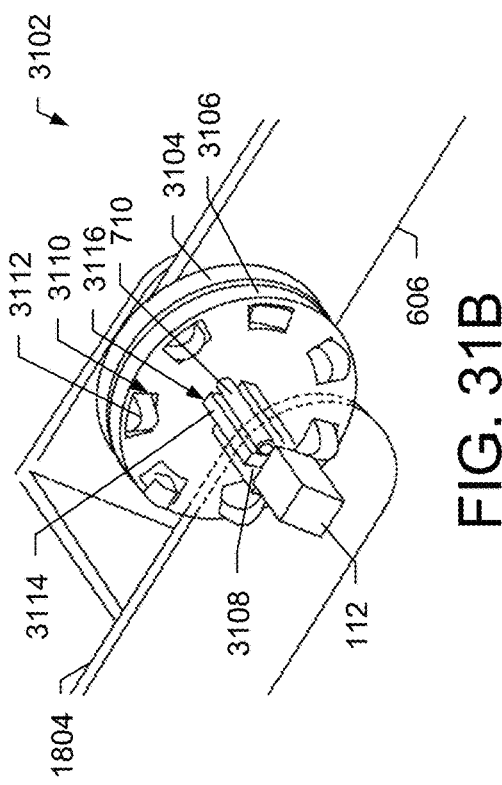
FIGS. 31B and 31C are diagrams that together schematically illustrate aspects of operation of the twenty-sixth example of the movable airfoil of FIG. 31A.
Figure 31C:
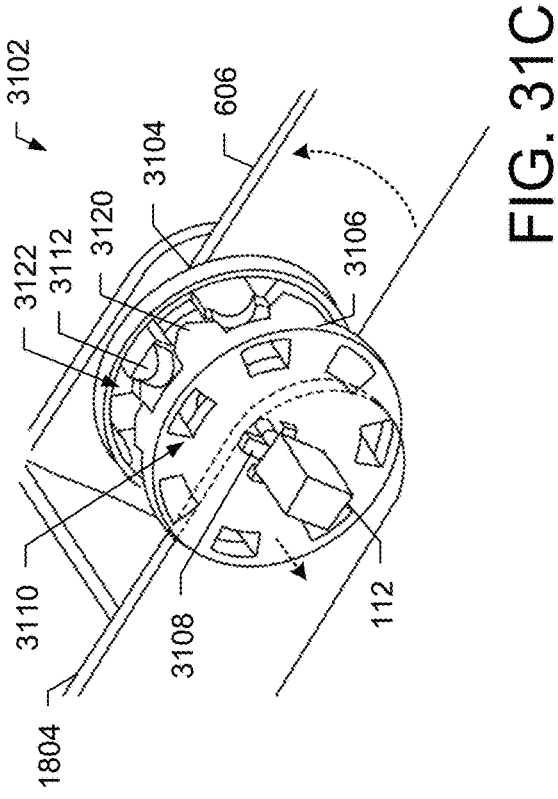

FIGS. 31A, 31B, and 31C schematically illustrate operation of a twenty-sixth example of a movable airfoil 104 of the aircraft of FIG. 1 according to particular aspects. The twenty-sixth example of the movable airfoil 104 illustrated in FIGS. 31A-31C may correspond to any of the movable airfoils described with reference to FIGS. 1-5B. FIG. 31A illustrates a perspective view of the twenty-sixth example in the first position 122. FIGS. 31B and 31C illustrate details of operation of the components 3102 of the twenty-sixth example. While FIGS. 31B and 31C illustrate only one instance of the components 3102 of the indexing mechanism 110, the twenty-sixth example of FIGS. 31A-31C may include more than one instance of the components 3102.

In FIGS. 31A-31C, the movable airfoil 104 is coupled, via the hinge member(s) 106, to structure(s) 102 of the aircraft 100. Further, in the twenty-sixth example of FIGS. 31A-31C, the movable airfoil 104 is coupled to or includes one or more spars 606, and the structure(s) 102 include or correspond to one or more additional spars 1804.

Referring to FIG. 31B, the components 3102 include a spline 3108 that is coupled in a fixed position relative to the structure(s) 102. To illustrate, in FIG. 31B, the spline 3108 is coupled to and is not movable relative to the spar 1804. A plate 3106 is coupled to the spline 3108. Keys 3114 of the spline 3108 engage keyways 3116 of the plate 3106 so that the plate 3106 is not able to rotate, relative to the spline 3108, about the rotational axis 108 but is able to translate (e.g., slide) along the spline 3108. Thus, the plate 3106 is retained in a fixed rotational position relative to the structure(s) 102 (e.g., relative to the spar 1804). The plate 3106 includes a set of receptacles 3110 arranged proximate a peripheral edge of a body of the plate 3106. The plate 3106 may also include a set of teeth 3120 interleaved between the receptacles 3110 and facing a plate 3104.

The plate 3104 is coupled in a fixed position relative to the movable airfoil 104 (e.g., to the spar 606). The spline 3108 does not extend to the plate 3104, and the plate 3104 is rotatable relative to the spline 3108. The plate 3104 includes a set of teeth 3112 arranged proximate a peripheral edge of a body of the plate 3106 and facing the plate 3104. The teeth 3112 are configured to engage the receptacles 3110 of the plate 3106 in the first state 114. In implementations in which the plate 3104 includes the teeth 3120, the plate 3104 also includes receptacles 3122 interleaved between the teeth 3112. In such implementations, the teeth 3120 are configured to engage the receptacles 3122 of the plate 3104 in the first state 114.

In some implementations, such as illustrated in FIGS. 31A-31C, the teeth 3112, the teeth 3120, or both, are shaped to facilitate aligned engagement with the respective receptacles 3110, 3122. For example, each tooth of the teeth 3112 may include an engagement surface on a side adjacent to the plate 3106. Additionally, or alternatively, each tooth of the teeth 3120 may include an engagement surface on a side adjacent to the plate 3104. The engagement surfaces include curved, beveled, or otherwise shaped surfaces that guide aligned engagement of the teeth 3112, 3120 with respective receptacles 3110, 3122 if the teeth 3112, 3120 and respective receptacles 3110, 3122 are slightly out of alignment as they come together to interlock.

In the twenty-sixth example, the first fastener(s) 136 include or correspond to the teeth 3112 of the plate 3104, and the second fastener(s) 138 include or correspond to the receptacles 3110 of the plate 3106. Additionally, or alternatively, the first fastener(s) 136 of the twenty-sixth example include or correspond to the teeth 3120 of the plate 3106, and the second fastener(s) 138 include or correspond to the receptacles 3122 of the plate 3104. FIG. 31B illustrates the components 3102 in the first state 114, and FIG. 31C illustrates the components 3102 in the second state 116.

The actuator(s) 112 are coupled to the spar 1804 and to the plate 3106 and configured to move the plate 3106 along the spline 3108 toward or away from the plate 3104. As shown in FIGS. 31B, the actuator 112 extends the rod 710 to push the plate 3106 toward the plate 3104 in the first state 114. In the first state 114, the teeth 3112 of the plate 3104 engage the receptacles 3110 of the plate 3106. Additionally, or alternatively, the teeth 3120 of the plate 3106 engage the receptacles 3122 of the plate 3104. When the teeth 3112, 3120 are engaged with respective receptacles 3110, 3122, the keyed engagement of the plate 3106 and spline 3108 prevents the plate 3104 from rotating. Since the movable airfoil 104 is fixed relative to the plate 3104, the movable airfoil 104 is prevented from rotating about the rotational axis 108 in the first state 114.

As shown in FIGS. 31C, to transition to the second state 116, the actuator 112 retracts the rod 710 to pull the plate 3106 along the spline 3108 away from the plate 3104. In the second state 116, the plate 3104 is free to rotate relative to the structure(s) 102 (e.g., relative to the spar 1804). With the components 3102 in the second state 116 (as illustrated in FIG. 31C), the movable airfoil 104 is free to rotate about the hinge member 106 until the movable airfoil 104 is disposed in a different indexed position, such as the second position 124. The number of indexed positions is based on the counts and distributions of the first and second fasteners 136, 138 and the range of motion allowed by the structure(s) 102 and the movable airfoil 104. Rotation of the movable airfoil 104 may be driven by an actuator, by the aerodynamic forces 146 of FIG. 1, or both.

In the implementation illustrated in FIGS. 31A-31C, the components 3102 of the indexing mechanism 110 include a plurality of first fasteners 136 (e.g., the teeth 3112 and/or the teeth 3120) and a plurality of second fasteners 138 (e.g., the receptacles 3110 and/or 3122) arranged about a ring that is concentric with the rotational axis 108. In some implementations, a count of the number of second fasteners 138 is equal to a count of the number of first fasteners 136. In other implementations, the count of the number of second fasteners 138 is not equal to the count of the number of first fasteners 136.

The position sensor(s) 126, the state sensor(s) 128, the alignment sensor 130, the flight control computer 132, and the control surface 144 are not illustrated in FIGS. 31A-31C; however, the position sensor(s) 126, the state sensor(s) 128, the alignment sensor 130, the flight control computer 132, the control surface 144, or any combination thereof, may be present in an aircraft 100 according to the twenty-sixth example of FIGS. 31A-31C. If present, the position sensor(s) 126, the state sensor(s) 128, the alignment sensor 130, the flight control computer 132 and/or the control surface 144 operate as described with reference to FIGS. 1 and 6A-6C.

Figure 32A:
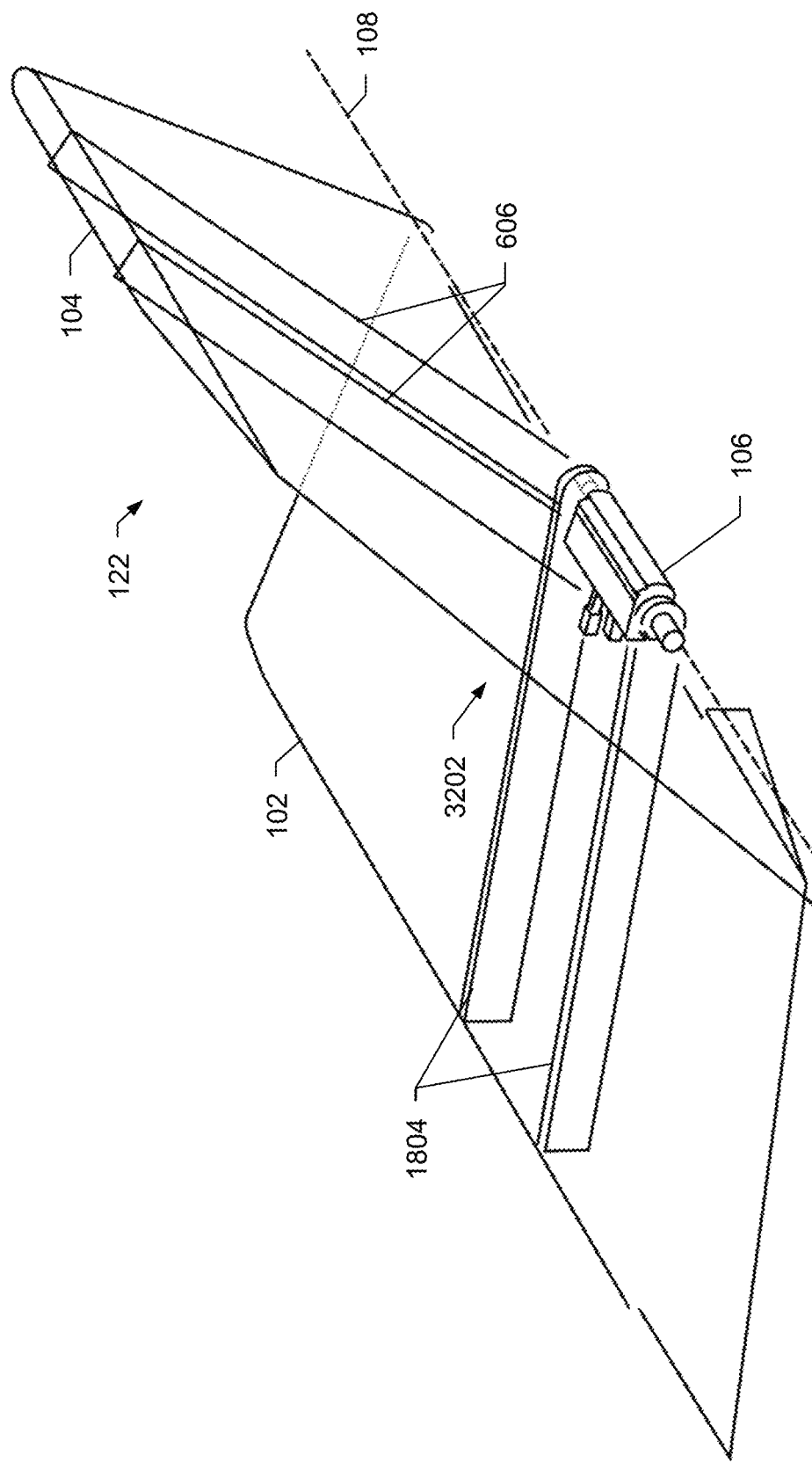
FIG. 32A is a diagram that schematically illustrates a twenty-seventh example of the movable airfoil of the aircraft of FIG. 1 according to particular aspects.
Figure 32B:
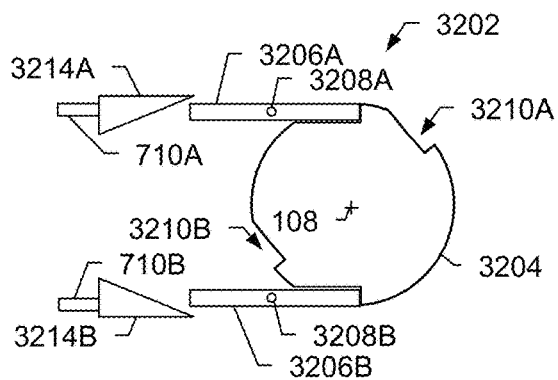
FIGS. 32B, 32C, 32D, 32E, 32F, and 32G are diagrams that together schematically illustrate aspects of operation of the twenty-seventh example of the movable airfoil of FIG. 32A.
Figure 32C:
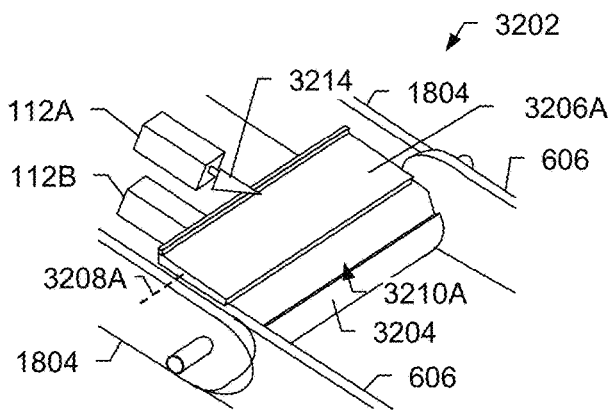

FIGS. 32A, 32B, and 32C schematically illustrate operation of a twenty-seventh example of a movable airfoil 104 of the aircraft of FIG. 1 according to particular aspects. The twenty-seventh example of the movable airfoil 104 illustrated in FIGS. 32A-32G may correspond to any of the movable airfoils described with reference to FIGS. 1-5B.

Figure 32D:
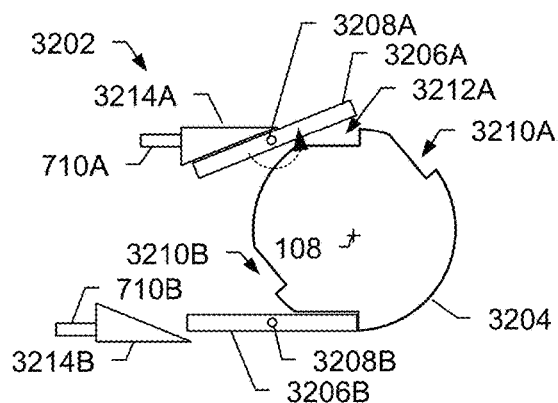
Figure 32E:
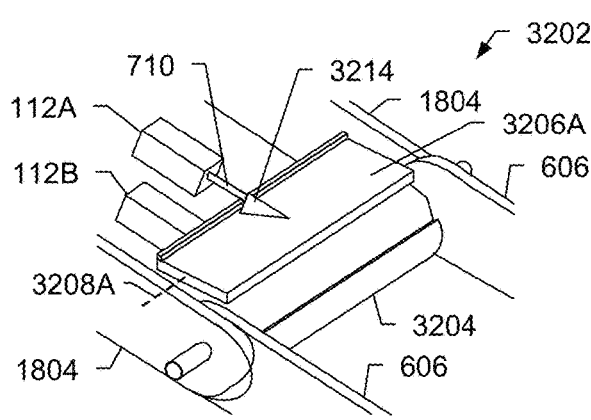
Figure 32F:
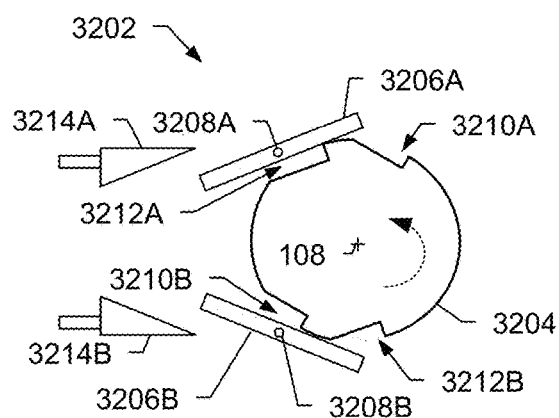
Figure 32G:
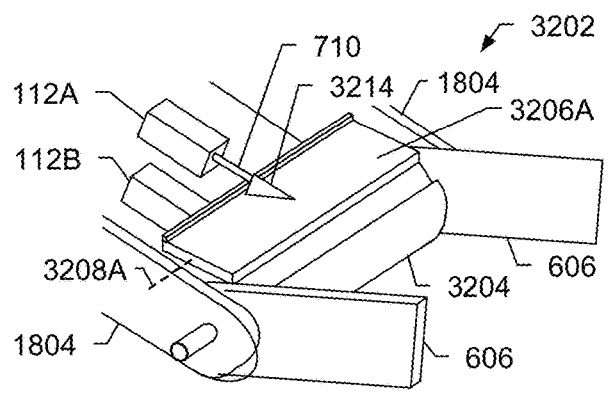

FIG. 32A illustrates a perspective view of the twenty-seventh example in the first position 122. FIGS. 32B-32G illustrate details of operation of the components 3202 of the twenty-seventh example. In particular, FIG. 32B illustrates aspects of the components 3202 in the first state 114 at the second position 124 from a view along the rotational axis, and FIG. 32C is a perspective view corresponding to the view illustrated in FIG. 32B. FIG. 32D illustrates aspects of the components 3202 during transition from the second state 116 at the second position 124 from a view along the rotational axis, and FIG. 32E is a perspective view corresponding to the view illustrated in FIG. 32D. FIG. 32F illustrates aspects of the components 3202 during transition from the second position 124 to the first position 122 from a view along the rotational axis, and FIG. 32G is a perspective view corresponding to the view illustrated in FIG. 32F. While FIGS. 32A-32G illustrate only one instance of the components 3202 of the indexing mechanism 110, the twenty-seventh example of FIGS. 32A-32G may include more than one instance of the components 3202.

In FIGS. 32A-32G, the movable airfoil 104 is coupled, via the hinge member(s) 106, to structure(s) 102 of the aircraft 100. Further, in the twenty-seventh example of FIGS. 32A-32G, the movable airfoil 104 is coupled to or includes one or more spars 606, and the structure(s) 102 include or correspond to one or more additional spars 1804.

Referring to FIGS. 32B and 32C, the components 3202 include a pair of pawls 3206 and a grooved shaft 3204. Biasing members 142 (not shown) are coupled to the pawls 3206 and configured to urge each pawl 3206 into contact with the grooved shaft 3204. The grooved shaft 3204 is coupled in a fixed position relative to the movable airfoil 104 (e.g., relative to the spars 606). The pawls 3206 are coupled in a fixed position relative to the structure(s) 102 (e.g., relative to the spars 1804).

The grooved shaft 3204 includes a set of grooves for each indexed position 120 that is available in the twenty-seventh example. For example, in FIGS. 32B-32G, the grooved shaft 3204 includes a first set of grooves 3210 associated with the first position 122 and a second set of grooves 3212 associated with the second position 124. In implementations with more than two indexed positions, the grooved shaft 3204 includes more than two sets of grooves. In some implementations, such as illustrated in FIGS. 32B-32G, each set of grooves 3210, 3212 includes one groove per pawl 3206. To illustrate, the first set of grooves 3210 include a groove 3210A associated with the pawl 3206A and a groove 3210B associated with the pawl 3206B. Likewise, the second set of grooves 3212 include a groove 3212A associated with the pawl 3206A and a groove 3212B associated with the pawl 3206B. When the pawls 3206 are engaged with a set of grooves 3210 or 3212, engagement of the pawls 3206 with the grooves 3210 or 3212 blocks rotation of the grooved shaft 3204 about the rotational axis 108 relative to the structure(s) 102 (e.g., relative to the spars 1804), thereby preventing rotation of the movable airfoil 104.

The components 3202 of the twenty-seventh example also include an actuator 112 associated with each pawl 3206. Each actuator 112 is coupled to a respective wedge member 3214 via a rod 710. Each wedge member 3214 is configured to cause a corresponding pawl 3206 to rotate about its respective axis 3208 to disengage the pawl 3206 from a groove 3210 or 3212 of the grooved shaft 3204 thereby freeing the grooved shaft 3204 to rotate about the rotational axis 108 relative to the structure(s) 102 (e.g., relative to the spars 1804).

FIGS. 32B and 32C illustrate the components 3202 in the first state 114 with the movable airfoil 104 at the second position 124. In FIGS. 32B and 32C, the pawl 3206A is engaged with the groove 3212A, and the pawl 3206B is engaged with the groove 3212B. As a result, the grooved shaft 3204 and the movable airfoil 104 are not able to rotate in either direction about the rotational axis 108 relative to the structure(s) 102 (e.g., relative to the spars 1804).

FIGS. 32D and 32E illustrate the components 3202 in the second state 116 with the movable airfoil 104 at the second position 124. In FIGS. 32D and 32E, the actuator 112A has extended the rod 710A to push the wedge member 3214A into contact with the pawl 3206A. As a result, the pawl 3206A has rotated about its axis 3208 to that the pawl 3206A is disengaged from the groove 3212A. The pawl 3206B remains engaged with the groove 3212B. Thus, the grooved shaft 3204 in FIGS. 32D and 32E is free to rotate in a first direction (e.g., anticlockwise in the view illustrated in FIG. 32D) and is not able to rotate in a second direction (e.g., clockwise in the view illustrated in FIG. 32D).

FIGS. 32F and 32G illustrate the components 3202 in the second state 116 with the movable airfoil 104 in transition between the first position 122 and the second position 124. In FIGS. 32D and 32E, after the grooved shaft 3204 has rotated sufficiently for the pawl 3206A to clear the groove 3212A, the actuator 112A has retracted the rod 710A. Additionally, the pawl 3206B is disengaged from the groove 3212B due to rotation of the grooved shaft 3204. The biasing members 142 (not shown) are applying a force that tends to rotate each pawl 3206 about its respective axis 3208 to maintain contact between the pawl 3206 and the grooved shaft 3204. As a result, when the grooved shaft 3204 has rotated sufficiently for the pawls 3206 to engage the grooves 3210, the pawls 3206 will snap into place and the movable airfoil 104 will be retained at the first position. With the movable airfoil 104 in the first position 122 and in the first state 114, the actuator 3214B can be actuated to free the grooved shaft 3204 to rotate the movable airfoil 104 to the second position 124.

In the twenty-seventh example, the first fastener(s) 136 include or correspond to the pawls 3206, and the second fastener(s) 138 include or correspond to the grooves 3210, 3212. To illustrate, in the first state 114 at the second position 124 (as illustrated in FIG. 32B), the pawl 3206A is rotated about the axis 3208A so as to block movement of the grooved shaft 3204 in a first direction by engaging a wall of the groove 3212A, and the pawl 3206B is rotated about the axis 3208B so as to block movement of the grooved shaft 3204 in a second direction by engaging a wall of the groove 3212B. Similarly, in the first state 114 at the first position 122, the pawl 3206A is rotated about the axis 3208A so as to block movement of the grooved shaft 3204 in the first direction by engaging a wall of the groove 3210A, and the pawl 3206B is rotated about the axis 3208B so as to block movement of the grooved shaft 3204 in the second direction by engaging a wall of the groove 3210B.

The position sensor(s) 126, the state sensor(s) 128, the alignment sensor 130, the flight control computer 132, and the control surface 144 are not illustrated in FIGS. 32A-32G; however, the position sensor(s) 126, the state sensor(s) 128, the alignment sensor 130, the flight control computer 132, the control surface 144, or any combination thereof, may be present in an aircraft 100 according to the twenty-seventh example of FIGS. 32A-32G. If present, the position sensor(s) 126, the state sensor(s) 128, the alignment sensor 130, the flight control computer 132 and/or the control surface 144 operate as described with reference to FIGS. 1 and 6A-6C.

Figure 33A:
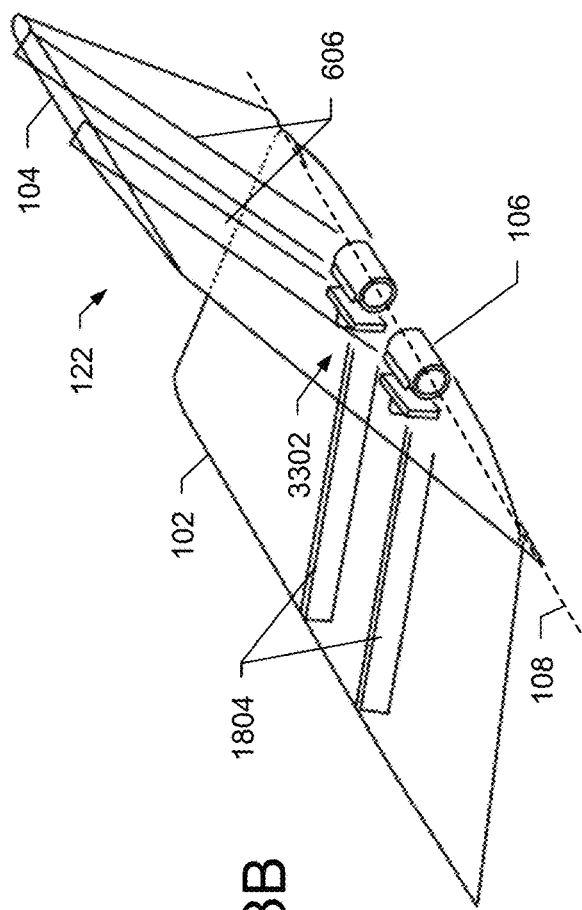
FIG. 33A is a diagram that schematically illustrates a twenty-eighth example of the movable airfoil of the aircraft of FIG. 1 according to particular aspects.
Figure 33B:
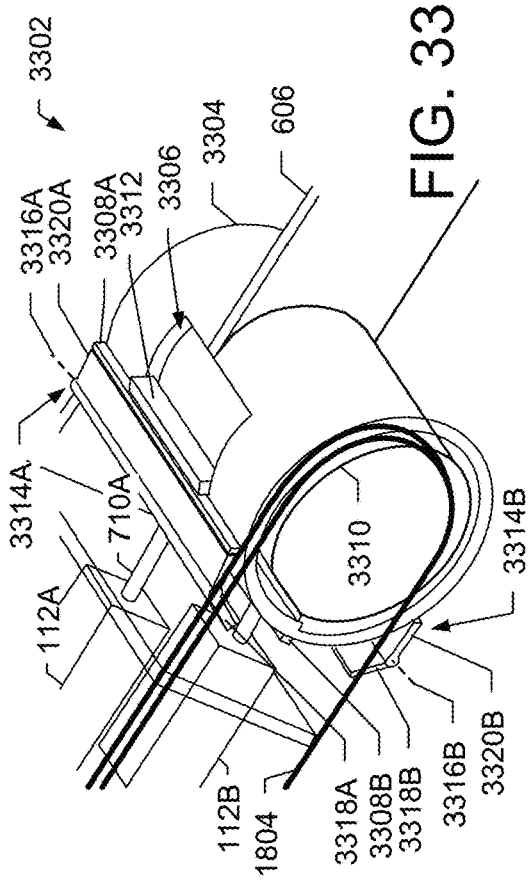
FIGS. 33B and 33C are diagrams that together schematically illustrate aspects of operation of the twenty-eighth example of the movable airfoil of FIG. 33A.
Figure 33C:
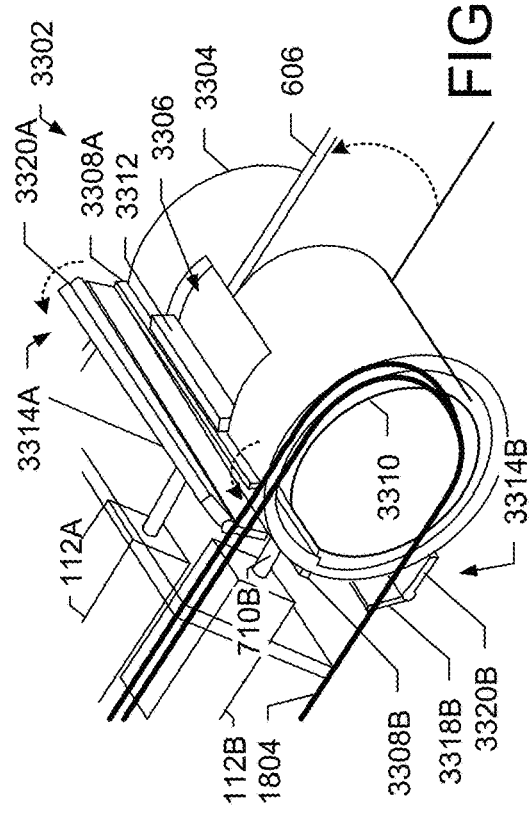

FIGS. 33A, 33B, and 33C schematically illustrate operation of a twenty-eighth example of a movable airfoil 104 of the aircraft of FIG. 1 according to particular aspects. The twenty-eighth example of the movable airfoil 104 illustrated in FIGS. 33A-33C may correspond to any of the movable airfoils described with reference to FIGS. 1-5B. FIG. 33A illustrates a perspective view of the twenty-eighth example in the first position 122. FIGS. 33B and 33C illustrate details of operation of the components 3302 of the twenty-eighth example. While FIGS. 33B and 33C illustrate only one instance of the components 3302 of the indexing mechanism 110, the twenty-eighth example of FIGS. 33A-33C may include more than one instance of the components 3302.

In FIGS. 33A-33C, the movable airfoil 104 is coupled, via the hinge member(s) 106, to structure(s) 102 of the aircraft 100. Further, in the twenty-eighth example of FIGS. 33A-33C, the movable airfoil 104 is coupled to or includes one or more spars 606, and the structure(s) 102 include or correspond to one or more additional spars 1804.

Referring to FIG. 33B, the components 3302 include a pair of nested cylinders, including an outer cylinder 3304 and an inner cylinder 3310. The inner cylinder 3310 is coupled in a fixed position relative to the structure(s) 102 (e.g., relative to the spar 1804). The outer cylinder 3304 is coupled in a fixed position relative to the movable airfoil(s) 104 (e.g., relative to the spar 606). In the second state 116, as described further below, the outer cylinder 3304 is rotatable on the inner cylinder 3310 within particular limits.

In the twenty-eighth example, two openings 3306 (only one of which is visible in the views illustrated in FIGS. 33A-33C) are defined in the outer cylinder 3304. The inner cylinder 3310 includes or is coupled two backstop members 3312 (only one of which is visible in the views illustrated in FIGS. 33A-33C), and each of the backstop members 3312 extends through the outer cylinder 3304 via a respective one of the one or more openings 3306.

In the twenty-eighth example, a pawl 3314A is coupled to an actuator 112A, and a pawl 3314B is coupled to an actuator 112B. The pawl 3314A includes a lever side 3318A on one side of a pivot axis 3316A, and a catch side 3320A on the other side of the pivot axis 3316A. Likewise, the pawl 3314B includes a lever side 3318B on one side of a pivot axis 3316B, and a catch side 3320B on the other side of the pivot axis 3316B. Each actuator 112 is coupled to the lever side 3318 of the corresponding pawl 3314 and configured to cause the pawl 3314 to rotate about the pivot axis 3316 of the pawl 3314.

The outer cylinder 3304 includes or is coupled to two pawl catches 3308A, 3308B. Each of the pawl catches 3308 is disposed on the outer cylinder 3304 in a location associated with a corresponding one of the indexed positions 120 of the indexing mechanism 110. When the movable airfoil 104 is disposed at one of the indexed positions 120, the pawl catch 3308 associated with that indexed position is disposed between one of the backstop members 3312 and the catch side 3320 of the pawl 3314 associated with the index position. To illustrate, in FIG. 33B, the movable airfoil 104 is at the second position 124, and the pawl catch 3308A associated with the second position 124 is disposed between the backstop member 3312 associated with the second position 124 and the catch side 3320A of the pawl 3314A associated with the second position 124. Similarly, when the movable airfoil 104 is at the first position 122, and the pawl catch 3308B associated with the first position 122 is disposed between a backstop member (not shown) associated with the first position 122 and the catch side 3320B of the pawl 3314B associated with the first position 122.

In the twenty-eighth example, the first fastener(s) 136 include or correspond to the pawls 3314, and the second fastener(s) 138 include or correspond to the pawl catches 3308. To illustrate, in the first state 114 at the second position 124 (as illustrated in FIG. 33B), the catch side 3320A of the pawl 3314A is rotated about the pivot axis 3316A so as to block movement of the pawl catch 3308A in a first direction, and the backstop member 3312 prevents rotation of the pawl catch 3308A in a second direction opposite the first direction. Similarly, in the first state 114 at the first position 122, the catch side 3320B of the pawl 3314B is rotated about the pivot axis 3316B so as to block movement of the pawl catch 3308B in the second direction, and a backstop member (not shown) prevents rotation of the pawl catch 3308B in the first direction. Preventing movement of either of the pawl catches 3308 prevents movement of the outer cylinder 3304 and the movable airfoil 104.

In some implementations, each of the pawls 3314 is coupled to a respective biasing member 142 (not shown in FIGS. 33A-33C) that is configured to apply a force that urges the catch side 3320 of the pawl 3314 toward the outer cylinder 3304. In such implementations, the pawl catch 3308 associated with a particular indexed position moves the pawl 3314 out of the way via contact with a lower surface of the catch side 3320A as the pawl catch 3308 moves toward the particular indexed position. However, after the pawl catch 3308 moves past the pawl 3314, the biasing member 142 causes the pawl 3314 to rotate about the pivot axis 3316 to trap the pawl catch 3308, thus entering the first state 114 at the particular position. Alternatively, the actuator 112 associated with a particular pawl 3314 may be configured to retract the rod 710A to pull on the lever side 3318A of the pawl 3314A so that the catch side 3320A rotates about the pivot axis 3316A to contact the pawl catch 3308A to enter the first state 114.

FIG. 33C illustrates a transition from the first state 114 to the second state 116 while the moveable airfoil 104 is at the second position 124. To transition from the first state 114 to the second state 116 while the moveable airfoil 104 is at the second position 124, the actuator 112A extends the rod 710A to push on the lever side 3318A of the pawl 3314A so that the catch side 3320A rotates about the pivot axis 3316A away from the pawl catch 3308A. In the second state (as illustrated in FIG. 33B), the outer cylinder 3304 is free to rotate relative to the inner cylinder 3310 about the rotational axis 108 to another indexed position (e.g., to the first position 122)

The position sensor(s) 126, the state sensor(s) 128, the alignment sensor 130, the flight control computer 132, and the control surface 144 are not illustrated in FIGS. 33A-33C; however, the position sensor(s) 126, the state sensor(s) 128, the alignment sensor 130, the flight control computer 132, the control surface 144, or any combination thereof, may be present in an aircraft 100 according to the twenty-eighth example of FIGS. 33A-33C. If present, the position sensor(s) 126, the state sensor(s) 128, the alignment sensor 130, the flight control computer 132 and/or the control surface 144 operate as described with reference to FIGS. 1 and 6A-6C.

Figure 34A:
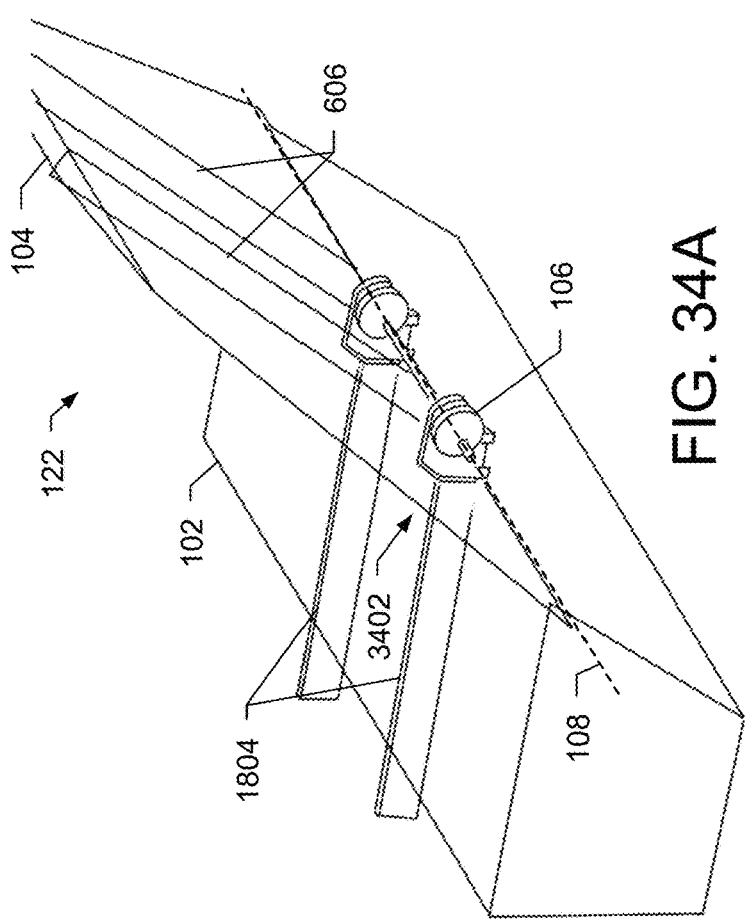
FIG. 34A is a diagram that schematically illustrates a twenty-ninth example of the movable airfoil of the aircraft of FIG. 1 according to particular aspects.
Figure 34B:
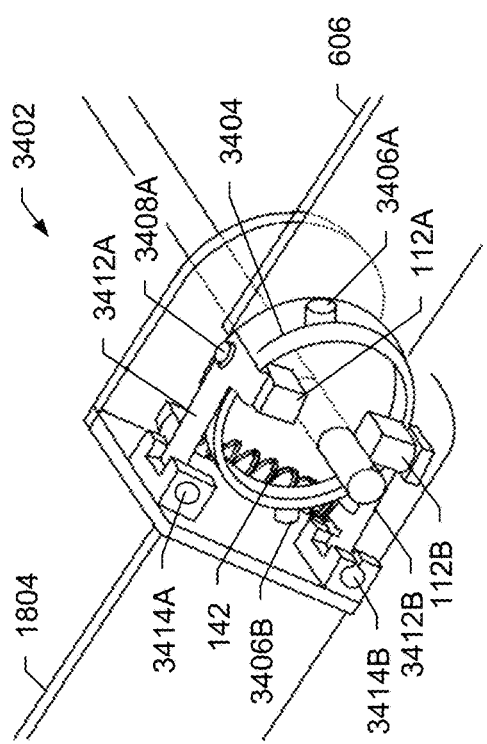
FIGS. 34B and 34C are diagrams that together schematically illustrate aspects of operation of the twenty-ninth example of the movable airfoil of FIG. 34A.
Figure 34C:
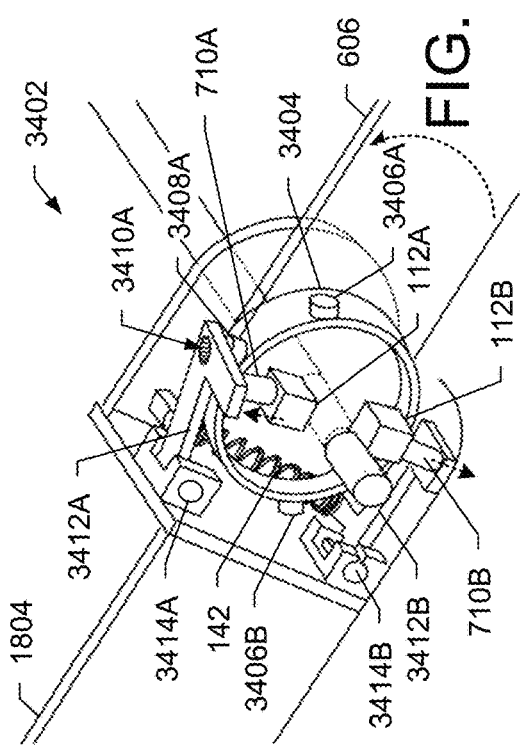

FIGS. 34A, 34B, and 34C schematically illustrate operation of a twenty-ninth example of a movable airfoil 104 of the aircraft of FIG. 1 according to particular aspects. The twenty-ninth example of the movable airfoil 104 illustrated in FIGS. 34A-34C may correspond to any of the movable airfoils described with reference to FIGS. 1-5B. FIG. 34A illustrates a perspective view of the twenty-ninth example in the first position 122. FIGS. 34B and 34C illustrate details of operation of the components 3402 of the twenty-ninth example. While FIGS. 34B and 34C illustrate only one instance of the components 3402 of the indexing mechanism 110, the twenty-ninth example of FIGS. 34A-34C may include more than one instance of the components 3402.

In FIGS. 34A-34C, the movable airfoil 104 is coupled, via the hinge member(s) 106, to structure(s) 102 of the aircraft 100. Further, in the twenty-ninth example of FIGS. 34A-34C, the movable airfoil 104 is coupled to or includes one or more spars 606, and the structure(s) 102 include or correspond to one or more additional spars 1804.

Referring to FIG. 34B, the components 3402 include a cylinder 3404 that includes a plurality of pins projecting in a radial direction from a peripheral edge of the cylinder 3404. For example, the pins include a pin 3406A and a pin 3406B associated with the first position 122 of the movable airfoil 104, and a pin 3408A and another pin (not shown) associated with a second position 124 of the movable airfoil 104. Although FIGS. 34B and 34C illustrate pins associated with two indexed positions 120, in other implementations, the components 3402 may include additional pins associated with indexed positions between the first position 122 and the second position 124.

The components 3402 also include pawls 3412 defining receptacles 3410 (e.g., through holes), each configured to, in the first state 114, retain a respective pin of the plurality of pins. The pawls 3412 are coupled to the biasing member(s) 142, and the biasing member(s) 142 are configured to apply a force that urges each pawl 3412 to rotate about its respective axis 3414 toward the cylinder 3404.

In the twenty-ninth example, a pawl 3412A is coupled to an actuator 112A, and a pawl 3412B is coupled to an actuator 112B. Each actuator 112 is configured to apply a force (e.g., in a direction perpendicular to the rotational axis 108) to the corresponding pawl 3412 to overcome the force applied by the biasing member(s) 142 and cause the pawl 3412 to rotate about its axis 3414 to disengage the receptacle 3410 of the pawl 3412 from a pin with which the pawl 3412 is engaged.

In the twenty-ninth example, the first fastener(s) 136 include or correspond to the pins 3406 and 3408, and the second fastener(s) 138 include or correspond to the receptacles 3410 of the pawls 3412. To illustrate, in the first state 114 at the second position 124 (as illustrated in FIG. 34B), the pin 3408A associated with the second position 124 is engaged with the receptacle 3410A of the pawl 3412A. Although it is not visible in the view shown, another pin associated with the second position 124 is also engaged with a receptacle of the pawl 3412B. Similarly, in the first state 114 at the first position 122, the pin 3406A associated with the first position 122 is engaged with the receptacle 3410A of the pawl 3412A, and the pin 3406B associated with the first position 122 is also engaged with the receptacle of the pawl 3412B.

In the implementation illustrated in FIGS. 34B and 34C, the components 3402 of the indexing mechanism 110 include a plurality of first fasteners 136 (e.g., the pins 3406 and 3408) and a plurality of second fasteners 138 (e.g., the receptacles 3410) arranged about a ring that is concentric with the rotational axis 108. In this implementation, the count of the number of second fasteners 138 (e.g., the receptacles 3410) is not equal to the count of the number of first fasteners 136 (e.g., the pins 3406 and 3408). For example, the count of the number of first fasteners 136 (e.g., the pins 3406 and 3408) may be an integer multiple of the count of the number of second fasteners 138 (e.g., the receptacles 3410).

FIG. 34C illustrates a transition from the first state 114 to the second state 116 while the moveable airfoil 104 is at the second position 124. To transition from the first state 114 to the second state 116 while the moveable airfoil 104 is at the second position 124, the actuator 112A extends the rod 710A to push on the pawl 3412A so that the receptacle 3410A is moved beyond the pin 3408A, and the actuator 112B extends the rod 710B to push on the pawl 3412B so that the receptacle of the pawl 3412B is moved beyond another pin associated with the second position 124. In the second state 116 (as illustrated in FIG. 34C), the cylinder 3404 is free to rotate relative to the structure(s) 102 (e.g., relative to the spar 1804) about the rotational axis 108 to another indexed position (e.g., to the first position 122).

The position sensor(s) 126, the state sensor(s) 128, the alignment sensor 130, the flight control computer 132, and the control surface 144 are not illustrated in FIGS. 34A-34C; however, the position sensor(s) 126, the state sensor(s) 128, the alignment sensor 130, the flight control computer 132, the control surface 144, or any combination thereof, may be present in an aircraft 100 according to the twenty-ninth example of FIGS. 34A-34C. If present, the position sensor(s) 126, the state sensor(s) 128, the alignment sensor 130, the flight control computer 132 and/or the control surface 144 operate as described with reference to FIGS. 1 and 6A-6C.

Aspects of the disclosure are described further with reference to the following interrelated clauses:

According to Clause 1, an aircraft includes: an airfoil; a hinge member to rotatably couple the airfoil to a structure of an aircraft, wherein the hinge member defines at least a portion of a rotational axis; an indexing mechanism coupled to the airfoil and configured to, in a first state, inhibit rotation of the airfoil about the rotational axis, and in a second state, to permit rotation of the airfoil about the rotational axis between a first position and a second position that is angularly indexed relative to the first position; and an actuator to selectively change a state of the indexing mechanism from the first state to the second state, from the second state to the first state, or both.

Clause 2 includes the aircraft of Clause 1, wherein rotation of the airfoil is facilitated by aerodynamic forces acting on the airfoil, to enable rotation of the airfoil between the first position and the second position when the indexing mechanism is in the second state to permit rotation of the airfoil.

Clause 3 includes the aircraft of Clause 1 or Clause 2, wherein, in the first state, the airfoil facilitates a yaw stabilization, yaw control, or both, and in the second state, the airfoil facilitates pitch stabilization, pitch control, or both.

Clause 4 includes the aircraft of any of Clauses 1 to 3, further including a control surface couple to the airfoil.

Clause 5 includes the aircraft of any of Clauses 1 to 4, wherein the airfoil corresponds to or includes a ruddervator or a variable wing tip airfoil.

Clause 6 includes the aircraft any of Clauses 1 to 5, wherein the indexing mechanism includes one or more pairs of friction surfaces.

Clause 7 includes the aircraft of any of Clauses 1 to 5, wherein the indexing mechanism includes a first fastener and a second fastener, wherein, in the first state, the first fastener is engaged with the second fastener, and in the second state, the first fastener is disengaged from the second fastener.

Clause 8 includes the aircraft of Clause 7, wherein a first end of the first fastener is beveled, contoured, or pointed to facilitate aligned engagement of the first fastener and the second fastener.

Clause 9 includes the aircraft of Clause 7, wherein a first end of the first fastener includes a roller to facilitate aligned engagement of the first fastener and the second fastener.

Clause 10 includes the aircraft of any of Clauses 7 to 9, wherein the first fastener is configured to move along a first direction to transition from the first state to the second state and wherein the first direction is substantially perpendicular to the rotational axis.

Clause 11 includes the aircraft of any of Clauses 7 to 9, wherein the first fastener is configured to move along a first direction to transition from the first state to the second state and wherein the first direction is substantially parallel to the rotational axis.

Clause 12 includes the aircraft of any of Clauses 7, 8, or 11, wherein the indexing mechanism includes a plurality of first fasteners including the first fastener, wherein the plurality of first fasteners are arranged about a ring that is concentric with the rotational axis.

Clause 13 includes the aircraft of any of Clauses 7 to 12, wherein the indexing mechanism includes a plurality of first fasteners including the first fastener and a plurality of second fasteners including the second fastener.

Clause 14 includes the aircraft of Clause 13, wherein a count of fasteners of the plurality of first fasteners is not equal to a count of fasteners of the plurality of second fasteners.

Clause 15 includes the aircraft of Clause 13, wherein a count of fasteners of the plurality of first fasteners is equal to a count of fasteners of the plurality of second fasteners.

Clause 16 includes the aircraft of any of Clauses 7 to 11 or Clauses 13 to 15, further including a structural member coupled to the airfoil in a cantilevered arrangement about the rotational axis, wherein the first fastener is disposed on the structural member.

Clause 17 includes the aircraft of any of Clauses 7 to 16, wherein the first fastener includes a pin, and the second fastener includes a receptacle for the pin.

Clause 18 includes the aircraft of any of Clauses 7, 8, 11, 12, 13, or 15, wherein the first fastener includes a key, and the second fastener includes a keyway for the key.

Clause 19 includes the aircraft of any of Clauses 7, 8, 10, 11, 12, 13, or 16 wherein the first fastener includes a pawl, and the second fastener includes a catch for the pawl.

Clause 20 includes the aircraft of any of Clauses 7, 8, 11, 12, 13, 15, or 18 wherein the first fastener includes a first gear, and the second fastener includes a second gear.

Clause 21 includes the aircraft of any of Clauses 7 to 20, wherein the indexing mechanism includes one or more biasing members configured to cause engagement of the first fastener and the second fastener when the first fastener is aligned with the second fastener, and wherein the actuator is configured to oppose the one or more biasing members to disengage the first fastener and the second fastener.

Clause 22 includes the aircraft of any of Clauses 1 to 21, wherein the indexing mechanism is configured to permit rotation the airfoil about the rotational axis between a plurality of angularly indexed positions, the plurality of angularly indexed positions including the first position, the second position, and one or more additional angularly indexed positions.

Clause 23 includes the aircraft of any of Clauses 1 to 22, further including one or more position sensors configured to generate position data indicating an indexed position of the airfoil about the rotational axis.

Clause 24 includes the aircraft of any of Clauses 1 to 23, further including one or more state sensors configured to generate state data indicating whether the indexing mechanism is in the first state or the second state.

Clause 25 includes the aircraft of any of Clauses 1 to 24, further including one or more alignment sensors configured to generate alignment data indicating whether a first fastener of the indexing mechanism is aligned with a second fastener of the indexing mechanism.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   an airfoil including a controllable control surface;
   a hinge member to rotatably couple the airfoil to a structure of an aircraft, wherein the hinge member defines at least a portion of a rotational axis;
   an indexing mechanism coupled to the airfoil and configured to, in a first state, inhibit rotation of the airfoil about the rotational axis, and in a second state, to permit rotation of the airfoil about the rotational axis between a first position and a second position that is angularly indexed relative to the first position, wherein rotation of the airfoil is caused by aerodynamic forces acting on the airfoil that enables rotation of the airfoil between the first position and the second position when the indexing mechanism is in the second state, wherein the controllable control surface operates as a rudder while the airfoil is in the first position, and wherein the controllable control surface operates as an elevator while the airfoil is in the second position; and
   an actuator to selectively change a state of the indexing mechanism from the first state to the second state, from the second state to the first state, or both,
   wherein the indexing mechanism comprises a first fastener and a second fastener, wherein, in the second state, the first fastener is disengaged from the second fastener such that the airfoil is free to rotate about the hinge member until the airfoil is disposed in a first indexed position or in a different second indexed position, and in the first state the first fastener is engaged with the second fastener to lock the airfoil in a particular indexed position, and
   wherein the indexing mechanism comprises one or more biasing members configured to cause engagement of the first fastener and the second fastener when the first fastener is aligned with the second fastener, and the actuator is configured to oppose the one or more biasing members to disengage the first fastener and the second fastener, wherein the one or more biasing members are configured to cause engagement of the first fastener and the second fastener toward a position corresponding to the first state, to lock the airfoil in the particular indexed position.

2. The aircraft of claim 1, further comprising a second airfoil, wherein the airfoil is rotatably coupled to the second airfoil, and wherein the rotational axis is parallel with an edge of the second airfoil.

3. The aircraft of claim 1, wherein, in the first position, the airfoil facilitates a yaw stabilization, yaw control, or both, and in the second position, the airfoil facilitates pitch stabilization, pitch control, or both.

4. The aircraft of claim 1, further comprising a flight control computer configured to adjust the aerodynamic forces acting on the airfoil by changing a position of the controllable control surface while the indexing mechanism is in the second state.

5. The aircraft of claim 1, wherein the airfoil corresponds to or includes a ruddervator or a variable wing tip airfoil.

6. The aircraft of claim 1, wherein moving the controllable control surface to the second position from the first position increases an effect on pitch stabilization by movement of the controllable control surface.

7. The aircraft of claim 1, wherein a first end of the first fastener is beveled, contoured, or pointed to facilitate aligned engagement of the first fastener and the second fastener.

8. The aircraft of claim 1, wherein a first end of the first fastener comprises a roller to facilitate aligned engagement of the first fastener and the second fastener.

9. The aircraft of claim 1, wherein the second fastener is configured to move along a first direction to transition from the first state to the second state and wherein the first direction is substantially parallel to the rotational axis.

10. The aircraft of claim 1, wherein the first fastener is configured to move along a first direction to transition from the first state to the second state and wherein the first direction is substantially perpendicular to the rotational axis.

11. The aircraft of claim 1, wherein the indexing mechanism comprises a plurality of first fasteners including the first fastener, wherein the plurality of first fasteners are arranged about a ring that is concentric with the rotational axis.

12. The aircraft of claim 1, wherein the indexing mechanism comprises a plurality of first fasteners including the first fastener and a plurality of second fasteners including the second fastener.

13. The aircraft of claim 12, wherein a count of fasteners of the plurality of first fasteners is not equal to a count of fasteners of the plurality of second fasteners.

14. The aircraft of claim 12, wherein a count of fasteners of the plurality of first fasteners is equal to a count of fasteners of the plurality of second fasteners.

15. The aircraft of claim 1, further comprising a structural member coupled to the airfoil in a cantilevered arrangement about the rotational axis, wherein the first fastener is disposed on the structural member.

16. The aircraft of claim 1, wherein the first fastener comprises a pin and the second fastener comprises a receptacle for the pin.

17. The aircraft of claim 1, wherein the first fastener comprises a key and the second fastener comprises a keyway for the key.

18. The aircraft of claim 1, wherein the first fastener comprises a pawl and the second fastener comprises a catch for the pawl.

19. The aircraft of claim 1, wherein the first fastener comprises a first gear and the second fastener comprises a second gear.

20. The aircraft of claim 1, further comprising a second actuator configured to assist movement of the airfoil, and wherein the second actuator is configured to be active responsive to a determination that the aerodynamic forces are insufficient to move the airfoil between the first position and the second position.

21. The aircraft of claim 1, wherein the indexing mechanism is configured to permit rotation of the airfoil about the rotational axis between a plurality of angularly indexed positions, the plurality of angularly indexed positions including the first position, the second position, and one or more additional angularly indexed positions.

22. The aircraft of claim 1, wherein the indexing mechanism comprises one or more pairs of friction surfaces.

23. The aircraft of claim 1, further comprising one or more position sensors configured to generate position data indicating an indexed position of the airfoil about the rotational axis.

24. The aircraft of claim 1, further comprising one or more state sensors configured to generate state data indicating whether the indexing mechanism is in the first state or the second state.

25. The aircraft of claim 1, further comprising one or more alignment sensors configured to generate alignment data indicating whether a first fastener of the indexing mechanism is aligned with a second fastener of the indexing mechanism.

* * * * *